(12) United States Patent
Kamiya

(10) Patent No.: US 7,769,636 B1
(45) Date of Patent: Aug. 3, 2010

(54) CONTENTS DISTRIBUTING APPARATUS

(75) Inventor: Mitsuharu Kamiya, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 1251 days.

(21) Appl. No.: 09/696,095

(22) Filed: Oct. 25, 2000

(30) Foreign Application Priority Data

Oct. 29, 1999 (JP) ................... 11-309989
Jan. 26, 2000 (JP) ................... 2000-017464

(51) Int. Cl.
*G06Q 30/00* (2006.01)
*G06K 15/00* (2006.01)
*G06F 17/30* (2006.01)

(52) U.S. Cl. ............ 705/26; 705/14.51; 358/1.14; 726/26

(58) Field of Classification Search .......... 705/14, 705/26, 14.51; 713/200, 201; 101/494; 358/1.14; 726/26

See application file for complete search history.

(56) References Cited

U.S. PATENT DOCUMENTS

| | | | | | |
|---|---|---|---|---|---|
| 5,210,824 | A | * | 5/1993 | Putz et al. | 715/201 |
| 5,587,740 | A | | 12/1996 | Brennan | |
| 5,737,729 | A | * | 4/1998 | Denman | 705/401 |
| 5,813,348 | A | * | 9/1998 | Zingher | 101/494 |
| 5,873,073 | A | * | 2/1999 | Bresnan et al. | 705/410 |
| 5,892,900 | A | * | 4/1999 | Ginter et al. | 713/200 |
| 5,930,810 | A | * | 7/1999 | Farros et al. | 715/506 |
| 6,078,406 | A | * | 6/2000 | Nickerson | 358/468 |
| 6,116,505 | A | * | 9/2000 | Withrow | 235/381 |
| 6,330,068 | B1 | * | 12/2001 | Matsuyama | 358/1.14 |
| 6,389,541 | B1 | * | 5/2002 | Patterson | 713/201 |

(Continued)

FOREIGN PATENT DOCUMENTS

EP 0 924 920 A1 12/1997

(Continued)

OTHER PUBLICATIONS

Longworth, David, "E for Enterprise: The Web gets a personal touch", The Independent, Sunday, May 26, 2001, p. 6.*

(Continued)

*Primary Examiner*—Donald L Champagne
(74) *Attorney, Agent, or Firm*—Frishauf, Holtz, Goodman & Chick, P.C.

(57) ABSTRACT

A printing service system comprises a portal site computer connected to a portable terminal and a print station via a network. The portal site computer transmits the contents of which reservation for printing has been made by the portable terminal to the print station via the network, and prints out them. The portal site computer establishes a printing reservation site for reserving printing of contents via the network, and stores reservation information on contents in which the portable terminal accesses to the printing reservation site, thereby making a reservation for printing, corresponding to user identification information on the portable terminal. When the portal site computer receives the user identification information transmitted from the print station, it reads the reservation information on the contents corresponding to the received user identification information. Then, the portal site computer transmits the contents corresponding to the read reservation information to the print station. Thus, a place for requesting contents and a place for reserving contents printout are not constrained.

3 Claims, 36 Drawing Sheets

U.S. PATENT DOCUMENTS

| | | | |
|---|---|---|---|
| 6,397,261 B1 * | 5/2002 | Eldridge et al. | 713/171 |
| 6,421,716 B1 * | 7/2002 | Eldridge et al. | 709/219 |
| 6,982,804 B2 * | 1/2006 | Frolik et al. | 358/1.15 |

FOREIGN PATENT DOCUMENTS

| | | |
|---|---|---|
| JP | 3-225592 | 10/1991 |
| JP | 07-56888 | 3/1995 |
| JP | 9-116657 | 2/1997 |
| JP | 9-114755 | 5/1997 |
| JP | 10-320314 | 12/1998 |
| JP | 11-031243 | 2/1999 |
| JP | 11-146118 | 5/1999 |
| JP | 11-192760 | 7/1999 |
| JP | 11-224291 | 8/1999 |
| JP | 11-252257 | 9/1999 |
| JP | 2000-003394 | 1/2000 |

OTHER PUBLICATIONS

Japanese Office Action (Notification of Reasons for Rejection) mailed Jan. 9, 2007 in counterpart Japanese Patent Application No. 2000-017464 and English translation thereof.

Japanese Office Action (Notification of Reasons for Rejecion) dated Aug. 29, 2006 in a counterpart Japanese patent application and English translation thereof.

Japanese Office Action (Notification of Reasons for Rejection) mailed Sep. 26, 2006 in a counterpart Japanese patent application and English translation thereof.

Communication (Examination Report) dated Oct. 15, 2008 issued by the European Patent Office in counterpart European Patent Application No. 00 969 992.7.

* cited by examiner

FIG.8

MEMBERS FILE

| | | |
|---|---|---|
| MEMBER CODE | 00000001 | 00000002 |
| USER RESERVATION ID | AB10001 | AB10002 |
| PORTABLE USER ID | D5686AAB869 | C78SDS789694 |
| USER ID (CELLULAR TELEPHONE NUMBER) | 09078954710 | 09012050022 |
| PASSWORD | 8500 | 1230 |
| NAME | NAOYA TAKAHASHI | YOKO IMAMURA |
| GENDER | MALE | FEMALE |
| DATE OF BIRTH | DECEMBER 15, 1964 | FEBRUARY 23, 1979 |
| POSTAL CODE | 105-0025 | 207-8501 |
| ADDRESS | GINZA 4-15-23, CHO-KU, TOKYO JAPAN | SAKURAGAOKA 45-789 HIGASHI YAMATO SHI, TOKYO JAPAN |
| E-MAIL ADDRESS | takahasi@△△△.ne.jp | iwamura@○○○.ne.jp |
| CLASSIFICATION OF OCCUPATION | OFFICE WORKER | STUDENT |
| CLASSIFICATION OF REASONS FOR ENROLLMENT | INTRODUCTION FROM FRIENDS | CONTENTS UTILIZATION GUIDANCE |
| INTRODUCER'S CELLULAR TELEPHONE NUMBER | 09012354987 | |
| DATE OF REGISTRATION FOR ENROLLMENT | MAY 20, 1999 | MAY 22, 1999 |
| AMOUNT OF MONEY FOR ENROLLMENT COUPON | 70 | 20 |
| AMOUNT OF MONEY FOR INTRODUCTION COUPON | 0 | 100 |
| AMOUNT OF MONEY FOR ADVERTISEMENT COUPON | 180 | 0 |
| AMOUNT OF MONEY FOR SURVEY COUPON | 0 | 0 |
| AMOUNT OF MONEY FOR URTILIZATION COUPON | 250 | 120 |
| RESERVATION PRINTING SERVICE CHARGE | 180 | 0 |
| RESERVATION INFORMATION SERVICE CHARGE | 200 | 0 |
| AMOUNT OF MONEY FOR COIN ENTRY DURING UTILIZATION | 200 | 0 |
| AMOUNT OF MONEY FOR NEXT TRANSFER COUPON | 70 | 120 |

UTILIZATION RESERVATION INFORMATION FILE

| | | |
|---|---|---|
| MEMBER CODE | 000000001 | 000007852 |
| INFORMATION COMPANY ID | QA4568AB | ASD700RF3 |
| CONTENTS URL | http://www.ooo.△△△.html | http://www.○○abc.qac.△△.html |
| CLASSIFICATION OF CONTENTS TYPE | PART-TIME JOB INFORMATION | FORTUNE TELLING BY NAME |
| NAME OF CONTENTS | GUIDANCE TO PART-TIME JOB EMPLOYMENT | FORTUNE TELLING |
| INFORMATION SERVICE CHARGE | 200 | 250 |
| PRINTING SERVICE CHARGE | 180 | 80 |
| PRINTING MEDIUM (FORM) | PLAIN PAPER A4 (DOUBLE-SIDED) | MINIATURE REFILL (FORU-SIDED) |
| NUMBER OF PRINTING SURFACES | 5 | 4 |
| NUMBER OF PRINTING PIECES | 3 | 1 |
| NUMBER OF COPIES | 1 | 1 |
| CONTINUOUS PRINTING SPECIFICATION | NONE | NONE |
| ADVERTISEMENT PRINTING SPECIFICATION | NONE | NONE |
| DATE AND TIME OF RESERATION REGISTRATION | HOUR: 10 MINUTES: 3 SECONDS:20, DECEMBER 9, 1999 | HOUR: 10 MINUTES: 5 SECONDS:4, DECEMBER 9, 1999 |

FIG.9B

PRINTING SERVICE UNIT PRICE FILE

| | | |
|---|---|---|
| PRINTING MEDIUM CODE | 01 | 02 |
| PRINTING MEDIUM (FORM) | PLAIN PAPER A4 (DOUBLE-SIDED) | BIBLE VERSION REFILL (TRIPLE-SIDED) |
| NUMBER OF PRINTABLE SURFACES | 2 | 4 |
| ONE-PIECE PRINTING SERVICE UNIT PRICE | 60 | 80 |
| DATE AND TIME OF SERVICE UNIT PRICE CHANGE | | |
| SERVICE UNIT PRINCE AFTER CHANGED | | |
| DATE AND TIME OF UNIT PRICE REGISTRATION | HOUR: 8 MINUTES: 15 SECONDS 1, APRIL 12, 1999 | HOUR: 8 MINUTES: 15 SECONDS: 5, APRIL 12, 1999 |

FIG.10A

PRINT FORMAT FILE 2H

| MEMBER CODE | 00000001 |
|---|---|
| PRINTING MEDIUM CODE | 01 |
| PRINTING MEDIUM (FORM) | PLAIN PAPER A4 (DOUBLE-SIDED) |
| NUMBER OF PRINTING PIECES | 3 |
| NUMBER OF PRINTING SURFACES | 5 |
| FINAL NUMBER OF SIDES FOR CURRENT PAGE | 1 |
| | 00007852 |
| | 03 |
| | MINIATURE VERSION REFILL (FOUR-SIDED) |
| | 1 |
| | 4 |
| | 4 |
| DATE AND TIME WHEN PRINTING HAS COMPLETED | HOUR: 13 MINUTES: 10 SECONDS: 8, APRIL 12, 1999 |

FIG.10B

CONTENTS HISTORY FILE 2I

| CONTENTS HISTORY URL | http://www.○○○.△△△.html | http://www.○○abc.qgc.△△.html |
|---|---|---|
| CLASSIFICATION OF CONTENTS TYPE | PART-TIME JOB INFORMATION | FORTUNE TELLING BY NAME |
| NAME OF CONTENTS | GUIDANCE TO PART-TIME JOB EMPLOYMENT | FORTUNE TELLING |
| INFORMATION SERVICE CHARGE | 200 | 250 |
| STANDARD MEDIUM CODE SPECIFICATION | 01, 03 | 03 |
| NUMBER OF STANDARD PRINTING SURFACES | | 4 |
| AGE LIMITATION TO UTILIZATION OF CONTENTS | NONE | NONE |
| LIMITATION TO UTILIZATION OF SHOP THAT PLACES PRINT STATION | NONE | NONE |
| DATE AND TIME OF CONTENTS UPDATE | HOUR: 10 MINUTES: 3 SECONDS: 20, DECEMBER 9, 1999 | HOUR: 10 MINUTES: 5 SECONDS: 4, DECEMBER 9, 1999 |
| DATE AND TIME OF VALIDITY PERIOD OF CONTENTS | HOUR: 0 MINUTES: 0 SECONDS: 0, DECEMBER 18, 1999 | HOUR: 0 MINUTES: 0 SECONDS: 0, DECEMBER 18, 1999 |

FIG. 11

USER HISTORY FILE  2K

| | | |
|---|---|---|
| MEMBER CODE | 00000001 | 00000001 |
| YEAR, MONTH, AND DAY OF UTILIZATION | DECEMBER 7, 1999 | DECEMBER 9, 1999 |
| DATE OF UTILIZATION | HOUR 13 MINUTES: 45 SECONDS: 15 | HOUR 15 MINUTES: 16 SECONDS: 20 |
| AMOUNT OF MONEY FOR ENROLLMENT COUPON | 300 | 250 |
| AMOUNT OF MONEY FOR INTRODUCTION COUPON | 20 | 0 |
| AMOUNT OF MONEY FOR ADVERTISEMENT COUPON | 0 | 0 |
| AMOUNT OF MONEY FOR SURVEY COUPON | 0 | 0 |
| AMOUNT OF MONEY FOR UTILIZATION COUPON | 320 | 250 |
| RESERVATION PRINTING SERVICE CHARGE | 60 | 180 |
| RESERVATION INFORMATION SERVICE CHARGE | 10 | 200 |
| AMOUNT COIN ENTRY DURING UTILIZATION | 0 | 200 |
| AMOUNT OF MONEY FOR NEXT TRANSFER COUPON | 250 | 70 |
| UTILIZATION STATION CODE | 00456 | 00456 |

FIG.12

CONTENTS UTILIZATION HISTORY FILE  2L

| | | |
|---|---|---|
| INFORMATION COMPANY ID | QA4568AB | ASD7000RF3 |
| YEAR, MONTH, AND DAY OF UTILIZATION | DECEMBER 7, 1999 | DECEMBER 9, 1999 |
| DATE AND TIME OF UTILIZATION | HOUR 13 MINUTES: 45 SECONDS: 15 | HOUR 15 MINUTES: 16 SECONDS: 20 |
| CONTENTS URL | http://www.○○○.△△△.html | http://www.○○abc.qac.△△.html |
| CLASSIFICATION OF CONTENTS TYPE | PART-TIME JOB INFORMATION | FORTUNE TELLING BY NAME |
| NAME OF CONTENTS | GUIDANCE TO PART-TIME JOB EMPLOYMENT | FORTUNE TELLING |
| INFORMATION SERVICE CHARGE | 200 | 250 |
| PRINTING SERVICE CHARGE | 180 | 80 |
| PRINTING MEDIUM (FORM) | PLAIN PAPER A4 (DOUBLE-SIDED) | MINIATURE VERSION REFILL (FOUR-SIDED) |
| NUMBER OF PRINTING SURFACES | 5 | 4 |
| NUMBER OF PRINTING PIECES | 3 | 1 |
| NUMBER OF COPIES | 1 | 1 |
| CONTINUOUS PRINTING SPECIFICATION | NONE | NONE |
| ADVERTISEMENT PRINTING SPECIFICATION | NONE | NONE |
| UTILIZATION STATION CODE | 00456 | 00456 |
| USER'S MEMBER CODE | 00000001 | 00000001 |

FIG.13

ADVERTISING HISTORY FILE 2M

| | | |
|---|---|---|
| ADVERTISING COMPANY ID | AD0002789 | AD0002789 |
| YEAR, MONTH, AND DAY OF ADVERTISING | DECEMBER 7, 1999 | DECEMBER 9, 1999 |
| DATE AND TIME OF ADVERTISING | HOUR 13 MINUTES: 45 SECONDS: 15 | HOUR 15 MINUTES: 16 SECONDS: 20 |
| ADVERTISEMENT CONTENTS URL | http://www.○○○.△△△.html | http://www.○○abc.qac.△△.html |
| CLASSIFICATION OF ADVERTISEMENT CONTENTS TYPE | ADVERTISEMENT OF TRANSPORT SERVICE COMPANIES | ADVERTISEMENT OF PACHINKO SHOP |
| NAME OF ADVERTISEMENT CONTENTS | GUIDANCE TO TRANSPORT SERVICE | GUIDANCE TO NEW OPENING |
| ADVERTISING SERVICE CHARGE | 100 | 80 |
| AMOUNT OF MONEY FOR ADVERTISEMENT COUPON | 50 | 40 |
| ADVERTISEMENT PRINTING MEDIUM (FORM) | PLAIN PAPER A4 (DOUBLE-SIDED) | BIBLE VERSION REFILL (TRIPLE-SIDED) |
| NUMBER OF ADVERTISING SURFACES | 1 | 1 |
| NUMBER OF ADVERTISING COPIES | 1 | 1 |
| UTILIZATION STATION CODE | 00456 | 00456 |
| USER'S MEMBER CODE | 00000001 | 00000001 |

FIG. 14

ADVERTISEMENT CONTENTS FILE

| | | |
|---|---|---|
| ADVERTISING COMPANY ID | AD0002789 | AD0002789 |
| ADVERTISEMENT CONTENTS URL | http://www.○○○.△△△.html | http://www.○○abc.qac.△△.html |
| CLASSIFICATION OF ADVERTISEMENT CONTENTS TYPE | ADVERTISEMENT OF TRANSPORT SERVICE COMPANIES | ADVERTISEMENT OF PACHINKO SHOP |
| NAME OF ADVERTISEMENT CONTENTS | GUIDANCE TO TRANSPORT SERVICE | GUIDANCE TO NEW OPENING |
| ADVERTISING SERVICE CHARGE | 100 | 80 |
| AMOUNT OF MONEY FOR ADVERTISEMENT COUPON | 50 | 40 |
| ADVERTISEMENT PRINTING MEDIUM (FORM) | PLAIN PAPER A4 (DOUBLE-SIDED) | PLAIN PAPER A4 (DOUBLE-SIDED) |
| NUMBER OF ADVERTISING SURFACES | 1 | 1 |
| NUMBER OF COPIES FOR ADVERTISING LIMITATION | 1000 | 500 |
| REMAINDER OF ADVERTISING ISSUES | 236 | 145 |
| DATE AND TIME WHEN ADVERTISING STARTS | HOUR 8 MINUTES: 30 DECEMBER 1, 1999 | HOUR 8 MINUTES: 30 DECEMBER 1, 1999 |
| DATE AND TIME WHEN ADVERTISING ENDS | HOUR: 20 MINUTES: 30, DECEMBER 31, 1999 | HOUR: 20 MINUTES: 30, DECEMBER 31, 1999 |
| ADVERTISING AREA CLASSIFICATION 1 | TOKYO, JAPAN | HIGASHI YAMATO-SHI |
| ADVERTISING AREA CLASSIFICATION 2 | MACHIDA-SHI | HIGASHI MURAYAMA-SHI |
| ADVERTISING USER'S GENDER | INELIGIBLE | MALE |
| LOWER LIMIT OF ADVERTISING USER'S AGE | 20 YEARS OLD | 18 YEARS OLD |
| UPPER LIMIT OF ADVERTISING USER'S AGE | 40 YEARS OLD | 70 YEARS OLD |
| ADVERTISING USER'S DATE OF BIRTH | INELIGIBLE | INELIGIBLE |
| ADVERTISING USER'S OCCUPATION CLASSIFICATION 1 | STUDENT | INELIGIBLE |
| ADVERTISING USER'S OCCUPATION CLASSIFICATION 2 | FEMALE OFFICE WORKER | INELIGIBLE |
| ADVERTISING USER'S CONTENTS 1 | PART-TIME JOB INFORMATION | INELIGIBLE |
| ADVERTISING USER'S CONTENTS 2 | RENTAL APARTMENT HOUSE INFORMATION | INELIGIBLE |
| ADVERTISING LIMITATION AREA CLASSIFICATION 1 | INELIGIBLE | INELIGIBLE |
| ADVERTISING LIMITATION AREA CLASSIFICATION 2 | INELIGIBLE | INELIGIBLE |
| ADVERTISING LIMITATION SHOP CLASSIFICATION 1 | INELIGIBLE | INELIGIBLE |
| ADVERTISING LIMITATION SHOP CLASSIFICATION 2 | INELIGIBLE | FAST FOOD SHOP OR ITS ASSOCIATE |
| ADVERTISING LIMITATION CONTENTS TYPE 1 | TRANSPORT SERVICE COMPANY INFORMATION | INELIGIBLE |
| ADVERTISING LIMITATION CONTENTS TYPE 2 | INELIGIBLE | INELIGIBLE |
| ADVERTISING LIMITATION CONTENTS COMPANY 1 | **TRANSPORT COMPANY | INELIGIBLE |
| ADVERTISING LIMITATION CONTENTS COMPANY 2 | INELIGIBLE | INELIGIBLE |

PORTAL SITE MENU SCREEN FOR PORTABLE TERMINAL

PORTAL SITE MEMBER REGISTRATION SCREEN FOR PORTABLE

FIG. 16A xyz PART-TIME JOB INFORMATION
WE ARE PLEASED TO INFORM YOU OF YOUR DESIRED JOBS LISTED BELOW

NUMBER OF REGISTRIES: 15
CONDITIONS WORK SITE: SHINJUKU
OCCUPATION: OFFICE CLERK

PRINT    RETURN

INFORMATION SEARCH SCREEN FOR PORTABLE TERMINAL

FIG. 16B

UTILIZATION RESERVATION CHECK
xyz PART-TIME JOB INFORMATION
INFORMATION SERVICE CHARGE: 200 yen
PRINTING SERVICE CHARGE: 60 yen
(NUMBER OF PIECES AND UNIT PRICE)
STANDARD PRINTING MEDIUM
PLAIN PAPER A4 (DOUBLE-SIDED)
ESTIMATED NUMBER OF PRINTS: THREE
UTILIZE CANCEL

UTILIZE    RETURN

UTILIZATION RESERVATION CHECK SCREEN FOR PORTABLE TERMINAL

FIG. 16C

SELECTION OF PRINT FORMAT
NUMBER OF COPIES [ONE]
PRINTING MEDIUM (FORM)
[PLAIN PAPER A4 (DOUBLE-SIDED)]
MULTIPLE-SIDED MEDIUM
PRINTING METHOD
  ☐CONTINUOUS  ☐SINGLE
ADVERTISING PRINT
  ☐YES  ☐NO

RESERVE    RETURN

PRINT FORMAT SELECTION SCREEN FOR PORTABLE TERMINAL

FIG. 16D xyz PART-TIME JOB INFORMATION
PRINTING MEDIUM (FORM)
[PLAIN PAPER A4 (DOUBLE-SIDED)]
MULTIPLE-SIDED MEDIUM
CONTINUOUS PRINTING
ADVERTISEMENT PRINTING: NONE
WE WILL NOTIFY YOU UTILIZATION CHARGE WHEN PRINTING IS READY VIA E-MAIL

RETURN

PRINTING RESERVATION CHECK SCREEN FOR PORTABLE TERMINAL

FIG. 16E

GUIDANCE TO UTILIZATION CHARGE
BALANCE OF COUPON: 250 yen
PRINTING SERVICE CHARGE: 180 yen
(PLAIN PAPER A4 X 3)
INFORMATION SERVICE CHARGE: 200 yen
AMOUNT OF MONEY FOR COIN ENTRY: 200 yen
NEXT COUPON: 70 yen

CANCEL    RETURN

UTILIZATION CHARGE GUIDANCE MAIL SCREEN FOR PORTABLE TERMINAL

TOP MENU SCREEN FOR PRINT STATION

TOP MENU SCREEN FOR UTILIZATION RESERVATION PRINTING SERVICE

SCREEN FOR DISPLAYING AN AMOUNT OF MONEY FOR PURCHASE FOR PRINT STATION

FIG.18A

UTILIZATION RESERVATION CONTENTS PRINTING

| NAME OF CONTENTS | PRINTING MEDIUM | NUMBER OF PIECES | COMMUNICATION | EDIT | PRINT |
|---|---|---|---|---|---|
| XYZ PART-TIME JOB INFORMATION | PLAIN PAPER A4 | THREE | ▓▓▓ | ▓▓▓ | ☐ |

| COUPON BALANCE | PRINTING SERVICE CHARGE | INFORMATION SERVICE CHARGE |
|---|---|---|
| 250 YEN | 180 YEN | 200 YEN |

PLEASE WAIT UNTIL PRINTING HAS FINISHED

SCREEN DISPLAY FOR PRINTING UTILIZED AND/OR RESERVED CONTENTS

FIG.18B

UTILIZATION RESERVATION CONTENTS PRINTING

| NAME OF CONTENTS | PRINTING MEDIUM | NUMBER OF PIECES | COMMUNICATION | EDIT | PRINT |
|---|---|---|---|---|---|
| XYZ PART-TIME JOB INFORMATION | PLAIN PAPER A4 | THREE | ▓▓▓ | ▓▓▓ | ▓▓▓ |

| COUPON BALANCE | PRINTING SERVICE CHARGE | INFORMATION SERVICE CHARGE |
|---|---|---|
| 250 YEN | 180 YEN | 200 YEN |

PRINTING HAS FINISHED.
AN AMOUNT OF MONEY FOR ADVERTISEMENT COUPON IN THIS UTILIZATION IS 0 YEN.
AN AMOUNT OF MONEY FOR THE NEXT TRANSFER COUPON IS 70 YEN.
THANK YOU.  [END]

ADVERTISEMENT COUPON GUIDANCE SCREEN FOR ENDING PRINTING OF CONTENTS

CONTENTS DISTRIBUTING APPARATUS

CROSS-REFERENCE TO RELATED APPLICATIONS

This application is based upon and claims the benefit of priority from the prior Japanese Patent Applications No. 11-309989, filed Oct. 29, 1999; and No. 2000-017464, filed Jan. 26, 2000.

BACKGROUND OF THE INVENTION

The present invention relates to a contents distributing apparatus that is connected to an information processing terminal and an output device via a network, and which transmits and prints out to the output device the contents of which printing has been reserved by means of the information processing terminal via the network.

Recently, with the advent of digital cameras, printing services for printing data acquired by digital cameras is becoming popular. In addition, a service environment in which contents are provided to an information processing terminal user by utilizing a communication network is also becoming popular, and printing service via such a communication network is provided. Such conventional printing services are classified into types as the following:

(1) print data is brought into a print shop, and printing service is received;

(2) contents are printed by network search of a multimedia terminal installed at a shop or the like;

(3) specified information is printed from facsimile information service by means of a facsimile machine;

(4) printing service is received by a user's personal computer through the Internet; and (5) image data or the like that the user has brought is printed on the spot by means of a printing service exclusive machine installed at shop or the like.

In the above mentioned printing service types (1) to (5), any of the information search place, printing place, print contents, printing medium, charge and the like is limited.

In addition, there is proposed a conventional printing and/or accounting system that is applicable to providing printing services utilizing a network. In such a printing and/or accounting system, the accounting by departments or sections in a company is assumed, and print data such as the number of prints, the number of printing surfaces, printing time intervals, or toner or fonts required for printing is targeted for such accounting.

However, in the above printing service types (1) to (5), any of the information search place, printing place, print contents, printing medium, or charge is limited, and there have been problems (1) to (5) described below.

(1) Printing Service in which an Information Search Place is Limited

In a printing service such as multimedia terminal, an information search place is limited. Thus, there are many cases in which the user does not go to a place at which the printing service is provided unless any substantial print request has been made. Therefore, a service provider that provides printing service needs to advertise the contents of printing services to the users. An advertisement cost associated with advertising activities occurs. As a result, types or quantity of services that can be provided are limited.

In addition, for the service provider that provides printing services, if an information search place is limited, there have occurred many instances in which only an information search is performed, and the printing service is not finally performed. Thus, the profitability of the printing service is greatly impinged due to a loss of the other user's opportunities caused by an increased search wait time.

(2) Printing Service in which a Printing Place is Limited

Internet information search service using a portable information processing terminal such as a cellular telephone does not limit the place at which information is searched while the user is moving. However, if one brings a printer, its size and weight are limited.

Further, there does not exist any printing service provider for a portable information processing terminal such as cellular telephone. Thus, one cannot receive a printing service for information searched while one is moving by holding a cellular phone or the like.

(3) Print Service in which Print Contents are Limited

Mobile contents with high real-time properties are provided to a portable information terminal such as a cellular telephone. However, an image with a large amount of information and high visual properties is not acceptable because of limited terminal display screen size or communication infrastructure performance.

In addition, in a printing service exclusive machine that does not have an information search function via a network, only printing is provided in the range of predetermined contents, and limited types of the contents can be provided.

(4) Printing Service in which a Printing Medium is Limited

In a printing service in which contents distributed from a network are printed, a printing medium is determined depending on the contents or printing devices, and there does not exist a printing service provided in accordance with a printing medium that the user arbitrarily selects.

Examples of print media include plain paper, refills of a notebook, printed stickers, greeting cards, post cards, posters and the like, which differ from each other depending on printing size, material, mode and the like. Furthermore, a printing service which prints out website contents on such media as stickers, cards, or notebook refill surfaces—wherein both sides of the individual sheets are to be printed—does not exist.

(5) Printing Service in which a Printing Service Charge is Limited

The charge for the printing service in which contents distributed from a network is printed is not compatible with a fixed charge system at a print shop.

The charge for the printing service greatly depends on the contents charge provided, and the cost of the printing medium and the toner cost for color printing also greatly varies depending on the contents. Further, in response to a case in which a plurality of contents are printed onto a single printing medium, it is required to establish a system for computing the charge in a printing service in which contents distributed via a network are printed.

On the other hand, a printing and/or accounting system via a network assumes a system for accounting and computing the number of prints, the number of printing surfaces, printing time intervals, quantity of toner used, or fonts used based on print data, but comprises the following problems:

(1) the charge of contents with their high rate at a cost of utilizing a printing service is not targeted for accounting:

(2) a system for computing and accounting the printing cost per printing matter is not provided;

(3) a system for causing accounting upon the completion of printing per printing matter is not provided; and (4) an amount of data transferred to a printing service terminal is increased because of accounting based on print data.

BRIEF SUMMARY OF THE INVENTION

Accordingly, it is an object of the present invention to provide contents distribution type printing service via a network in which there is no limitation to a place at which contents are requested and a place at which the contents printout are received.

According to the present invention, there is provided a contents distributing apparatus that is connected to an information processing terminal and an output device via a network, and that transmits and prints out to the output device the contents of which printing has been reserved by means of the information processing terminal via the network.

The contents distributing apparatus comprising:

storage means for storing reservation information on contents of which the information processing terminal has provided an access to a printing reservation site of the network and has reserved printing, the reservation information being associated with user identification information on the information processing terminal; and communication means for receiving user identification information transmitted from the output device, reading reservation information on contents corresponding to the received user identification information from the storage means, and transmitting the contents corresponding to the read reservation information to the output device.

According to the present invention, therefore, there can be provided printing service in which the reservation information on contents in which an information processing terminal including communication functions such as cellular telephone or PHS (personal handy-phone system) terminal has provided an access to the printing reservation site of the network, and has reserved printing can be stored to be associated with the user identification information; and the contents corresponding to the user identification information can be transmitted and printed out to the output device, and thus, a place at which printing of contents is reserved is separated from a place at which the contents are printed out.

In addition, site means for opening a printing reservation site at which printing of contents are reserved is provided in a network so that printing can be reserved smoothly.

Further, in the case where a balance relevant to contents printouts is stored corresponding to the user identification information on the information processing terminal, and the contents of which printing has been reserved are printed out, the print charge according to the contents printouts is subtracted from the balance. Thus, the user can settle the payment relevant to contents printouts easily, thus making it possible to promote utilization of contents.

In addition, there are provided an input device for inputting user identification information; a cash entry device for entering a cash; communication means for transmitting the inputted user identification information, and receiving the transmitted contents and print charge; and print means for, in the case where the received print charge is inputted from the cash entry device, printing the received contents. Thus, the user can settle the payment relevant to contents printouts easily, thus making it possible to promote utilization of contents.

Further, in the case where a user registration site for newly registering a user is set at a printing reservation site, the information processing terminal accesses to the user registration site, and a user is newly registered, an amount of money for the corresponding bonus is stored in the user identification information on the newly registered information processing terminal. Thus, a privilege is provided to such newly membership registered user, thereby making it possible to promote utilization of printing service.

In the case where a prospect user input item for inputting another user who has introduced a new user is set at a printing reservation site, the information processing terminal accesses to the printing reservation site, and another user who has introduced a new user is inputted, an amount of money for the corresponding bonus is stored in user identification information on such another user. Thus, a privilege is provided to the user who has introduced such another user, thereby making it possible to promote utilization of printing service.

In the case where a questionnaire item for inputting answers to questions is set at a printing reservation site, and the answers to the questions are inputted at the printing reservation site by means of the information processing terminal, an amount of money for the corresponding bonus is stored in the user identification information on the information processing terminal at which such answers to questions have been inputted. Thus, a privilege is provided to the user who has answered such questions, thereby making it possible to promote utilization of printing service.

In the case where a specification item for specifying printing of advertisement contents is set at a printing reservation site, the information processing terminal accesses to the printing reservation site, and printing of such advertisement contents is specified, an amount of money for the corresponding bonus is stored in the user identification information on the information processing terminal. Thus, a privilege is provided to the user that has printed the advertisement contents, thereby making it possible to promote utilization of printing service.

Further, in the case where user attribute information corresponding to the user identification information is stored, limitation information on which printing reservation is limited by contents according to the user attribute information is stored, and the information processing terminal accesses to a printing reservation site, thereby reserving the printing of contents, the printing reservation is limited based on the user attribute information corresponding to the user identification information on the information processing terminal and the limitation information corresponding to contents. Thus, there can be provided printing service in which printing reservation can be limited according to the user attributes such as user's age or gender.

In the case where distribution limitation information on contents corresponding to output means is stored, and contents are transmitted to an output device, the distribution of contents to the output device is limited based on the distribution limitation information. Thus, there can be provided distribution limitation service for the contents that reflect preference of a party at which the output device is installed.

Further, in the case where user attribute information corresponding to the user identification information is stored, advertising conditions based on the user attribute information is stored corresponding to the advertisement contents put in contents, and the information processing terminal accesses to a printing reservation site, thereby reserving the printing of contents, the advertisement contents put in contents are determined based on the user attribute information and advertising conditions. Thus, there can be provided advertising service in which proper advertisement can be advertised according to the user attribute.

In the case where advertising conditions specified for an output device is stored corresponding to advertisement contents put in contents, and contents are transmitted to the output device, the advertisement contents put in contents are determined based on the advertising conditions. Thus, there can be provided advertising service in which the advertisement that reflects the preference of a party at which the output device is installed can be put in contents.

Further, the advertising limitation information specified for an output device is stored corresponding to advertisement contents put in contents, and contents are transmitted to the output device, the advertisement contents put in contents is limited base on the advertising limitation information. Thus, there can be provided advertising service in which the advertisement that reflects the preference of a party at which the output device is installed can be put in contents.

In the case where advertising limitation information specified for a contents provider is stored corresponding to the advertisement contents put in contents, and contents are transmitted to the output device, the advertisement contents put in contents are limited based on the advertising limitation information.

Thus, there can be provided advertising service in which the advertisement that reflects the preference of the contents provider can be put in contents.

Further, in the case where user attribute information corresponding to the user identification information is stored, the advertising limitation information based on the user attribute information is stored corresponding to the advertisement contents put in contents, and the information processing terminal accesses to a printing reservation site, thereby reserving the printing of contents, the advertisement contents put in contents are limited based on the user attribute information and the advertising limitation information. Thus, there can be provided an advertising limitation service in which the advertisement put in contents can be limited according to the user attributes such as user's age or gender.

In the case where advertising period information is stored corresponding to the advertisement contents put in contents, and the contents are transmitted to an output device, the advertising relevant to the contents of the advertisement contents that exceeds the advertising period is limited based on the advertising period information. Thus, there can be provided more efficient advertising service in which the same advertisement can be prevented from being advertised for the same user at a short time.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 8 is a view showing a specific example of a utilization member file 2B stored in a storage device 26 shown in FIG. 5;

FIG. 9A is a view showing a specific example of a utilization reservation information file 2F stored in the storage device shown in FIG. 5;

FIG. 9B is a view showing a specific example of a printing service unit price file G stored in the storage device 26 shown in FIG. 5;

FIG. 10A is a view showing a specific example of a print format file 2H stored in the storage device 26 shown in FIG. 5;

FIG. 10B is a view showing a specific example of a contents history file 2I stored in the storage device 26 shown in FIG. 5;

FIG. 11 is a view showing a specific example of a user history file 2K stored in the storage device shown in FIG. 5;

FIG. 12 is a view showing a specific example of a contents user history file 2L stored in the storage device 26 shown in FIG. 5;

FIG. 13 is a view showing a specific example of an advertising history file 2M stored in the storage device 26 shown in FIG. 5;

FIG. 14 is a view showing a specific example of an advertisement contents file 2O stored in the storage device 26 shown in FIG. 5;

FIG. 16A to FIG. 16E are views showing a variety of screens displayed at the portable terminal 3, wherein FIG. 16A is a view showing an information search screen, FIG. 16B is a view showing a utilization reservation check screen, FIG. 16C is a view showing a print format selection screen, FIG. 16D is a view showing a printing reservation check screen, and FIG. 16E is a view showing a charge guidance mail screen;

FIG. 18A is a view showing a contents printing screen displayed at the print station 6 shown in FIG. 7;

FIG. 18B is a view showing an advertisement coupon guidance screen;

DETAILED DESCRIPTION OF THE INVENTION

A preferred embodiment of a contents distributing apparatus according to the present invention will now be described with reference to the accompanying drawings.

FIG. 1 to FIG. 36 are views each showing one embodiment of a printing service system that applies a contents distributing apparatus according to the present invention. First, a configuration thereof will be described here.

Figure 1:
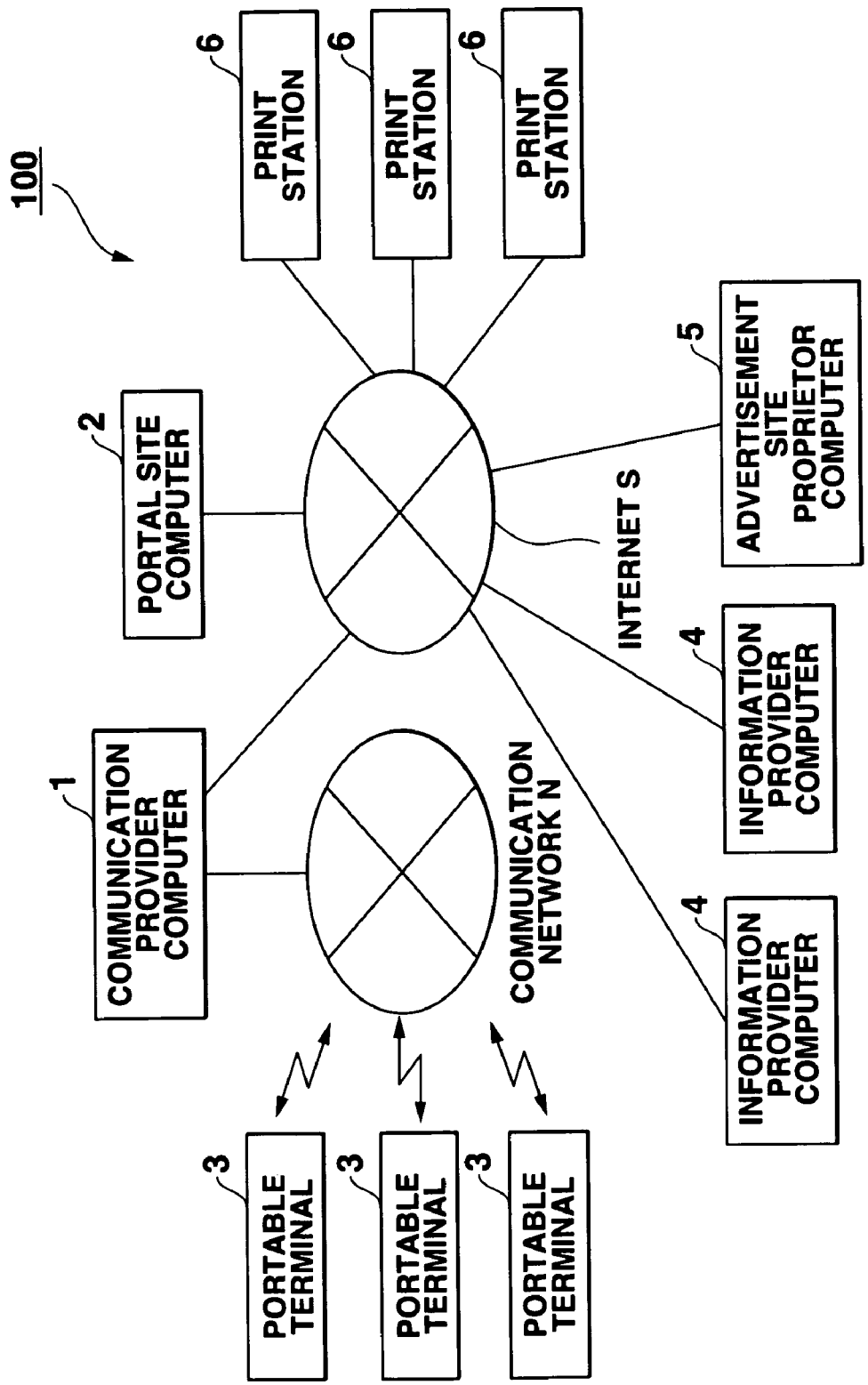
FIG. 1 is a view showing a system configuration of a printing service system of an embodiment according to the present invention.

FIG. 1 is a view showing a system configuration of a printing service system according to the present embodiment. In FIG. 1, a printing service system 100 comprises a communication provider computer 1 for controlling communication with a plurality of portable terminals (information processing terminals) 3 via a wireless communication network N and for connecting the portable terminals 3 to an internet S; a portal site computer (contents distributing apparatus) 2 connected to the internet S; the portable terminals (information processing terminals) 3 connected to the communication network N and having communication functions such as cellular telephones and PHS terminals; a plurality of information provider computers 4 connected to the internet S; an advertisement site proprietor computer 5; and printing stations (output devices) 6 installed at plural sites.

In FIG. 1, there is shown a case in which three portable terminals 3, two information provider computers 4, and print stations 6 installed at three sites are connected. The number of these computers or stations or the number of sites to be installed is not particularly limited. In addition, a plurality of advertisement site proprietor computers 5 may be connected.

The communication provider computer 1 provides communications environment concerning printing service among the portable terminal 3 connected to the communication network N and the portal site computer 2, the information provider computer 4, the advertisement site proprietor computer 5, and print station 6 connected to the internet S. This communication provider computer 1 controls data communication procedures according to a communication request therebetween.

An outline of control functions of the portal site computer 2, portable terminal 3, information provider computer 4, advertisement site proprietor computer 5, and print station 6 that configure the printing service system 100 shown in FIG. 1, will be described with reference to FIG. 2 to FIG. 4.

Figure 2:
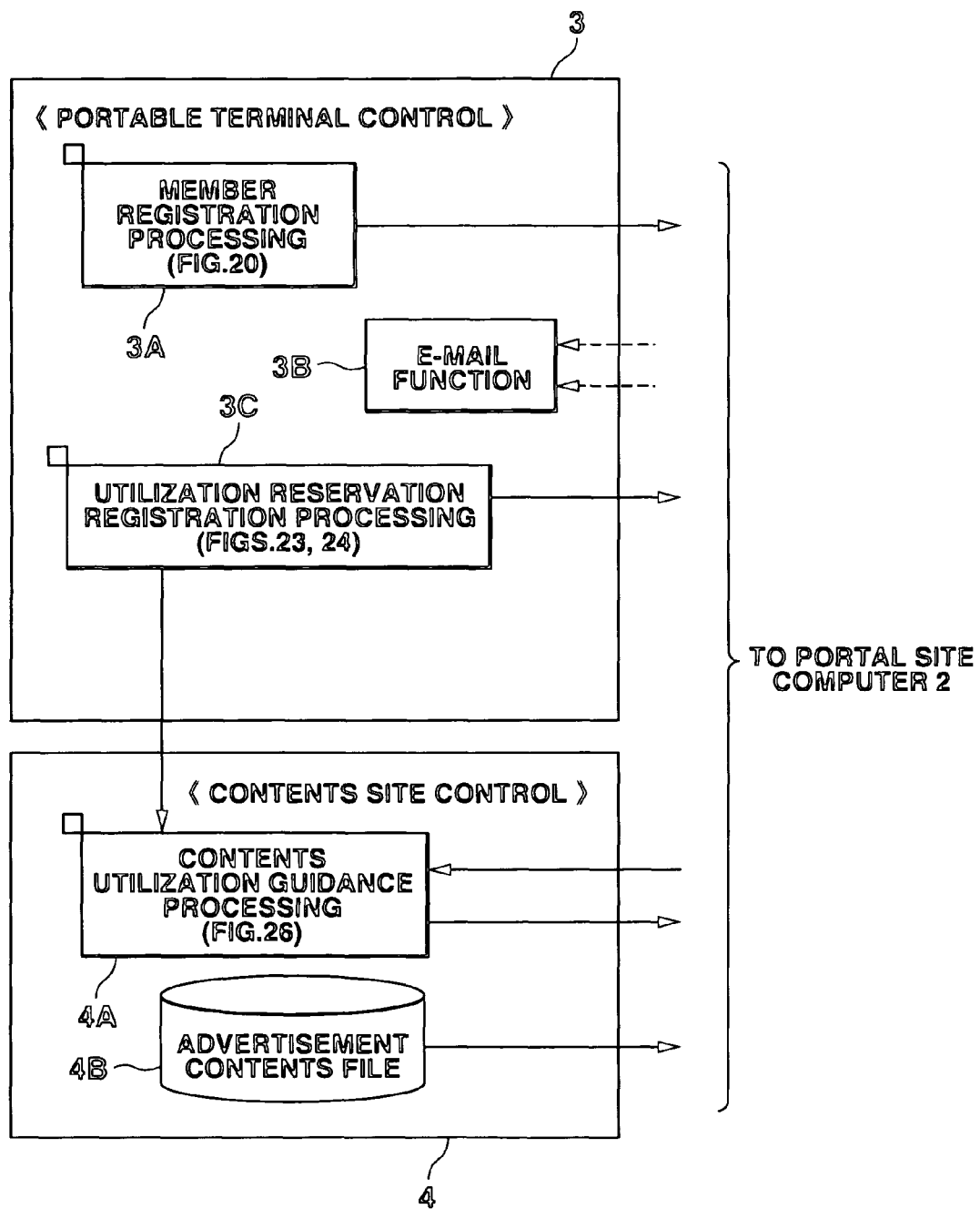
FIG. 2 is a view showing a schematic configuration of each control system of a portable terminal 3 and an information provider computer 4 shown in FIG. 1.

FIG. 2 is a block diagram depicting an outline of control functions that the portable terminal 3 and information provider computer 4 have.

In FIG. 2, the portable terminal 3 comprises a member registration processing section 3A for executing member registration processing described later (refer to FIG. 20) and for providing an access to the portal site computer 2, thereby performing member registration processing for printing service; an E-mail function section 3B for receiving guidance of coupon or guidance of charge from the portal site computer 2 when printing service is utilized; and a utilization reservation processing section 3C for executing utilization reservation registration processing described later (refer to FIG. 23 and FIG. 24), thereby reserving utilization of printing service via the portal site computer 2 or directly via the information provider computer 4.

In FIG. 2, the information provider computer 4 comprises a contents utilization guidance processing section 4A for, when the information provider computer 4 executes contents utilization guidance processing described later (refer to FIG. 26), and receives a user reservation ID of the portable terminal 3 reserved via the portal site computer 2, transmitting a link parameter relevant to such utilization reservation, thereby performing authentication of the user; and a contents file 4B for storing contents data concerning printing service.

Figure 3:
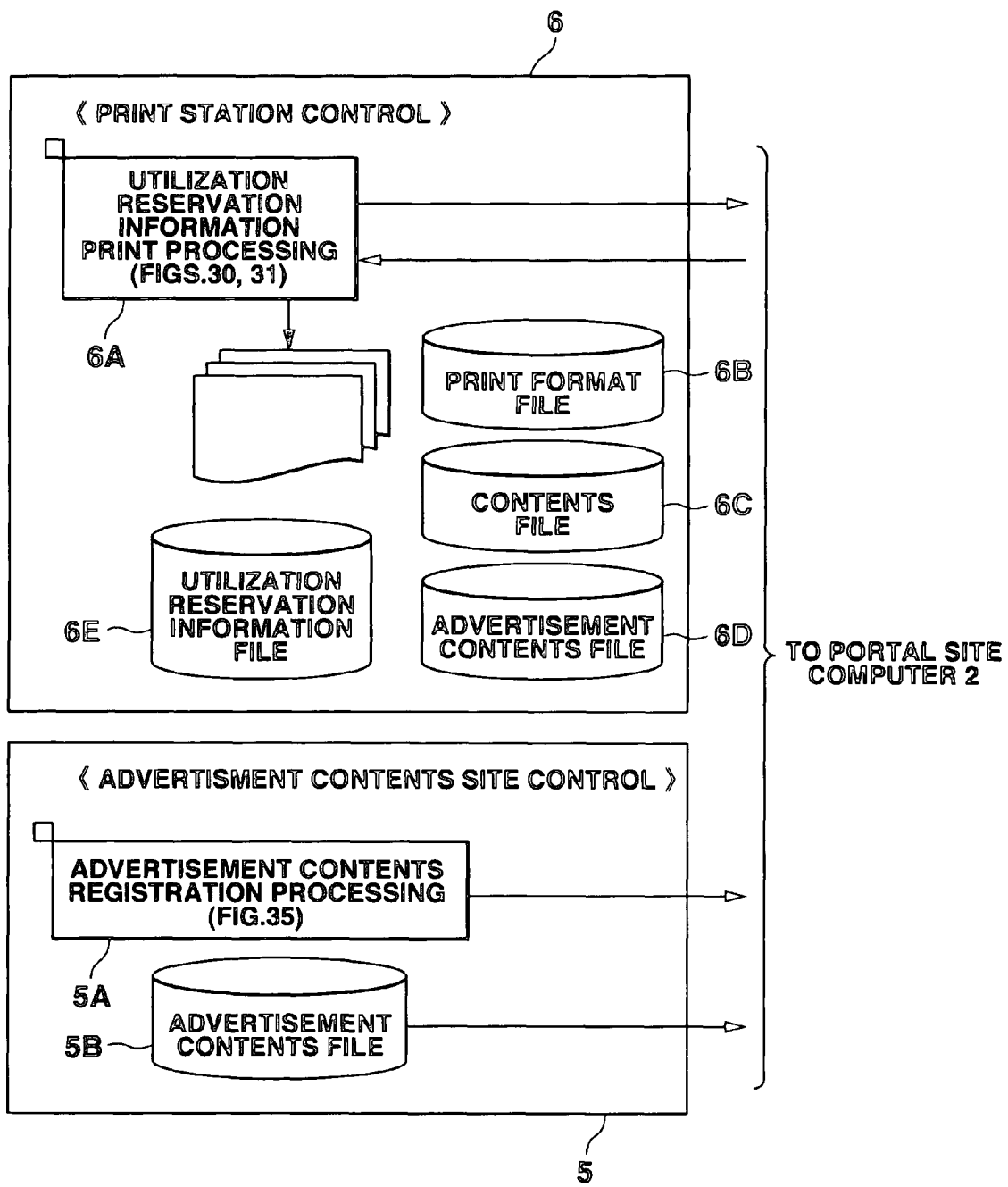
FIG. 3 is a view showing a schematic configuration of each control system of an advertisement site proprietor computer 5 and a print station 6 shown in FIG. 1.

FIG. 3 is a block diagram depicting an outline of control functions that the print station 6 and the advertisement site proprietor computer 5 have.

In FIG. 3, the print station 6 comprises a utilization reservation information print processing section 6A for executing utilization reservation information print processing described later (refer to FIG. 30 and FIG. 31) to provide an access to the portal site computer 2, and performing authentication processing of a user who has reserved utilization, utilization reservation information acquisition processing, processing for acquiring a contents history file and a print format file, contents and advertisement print processing, processing for computing an amount of money for coupon; a print format file 6B utilized by the utilization reservation information print processing section 6A; a contents file 6C, an advertisement contents file 6D, and a utilization reservation information file 6E.

The advertisement site proprietor computer 5 comprises an advertisement contents registration processing section 5A for executing advertisement contents registration processing described later (FIG. 35), creating advertisement contents in which a variety of utilization conditions are set, and registering them in an advertisement contents file 5B; and the advertisement contents file 5B utilized by the advertisement contents registration processing section 5A.

Figure 4:
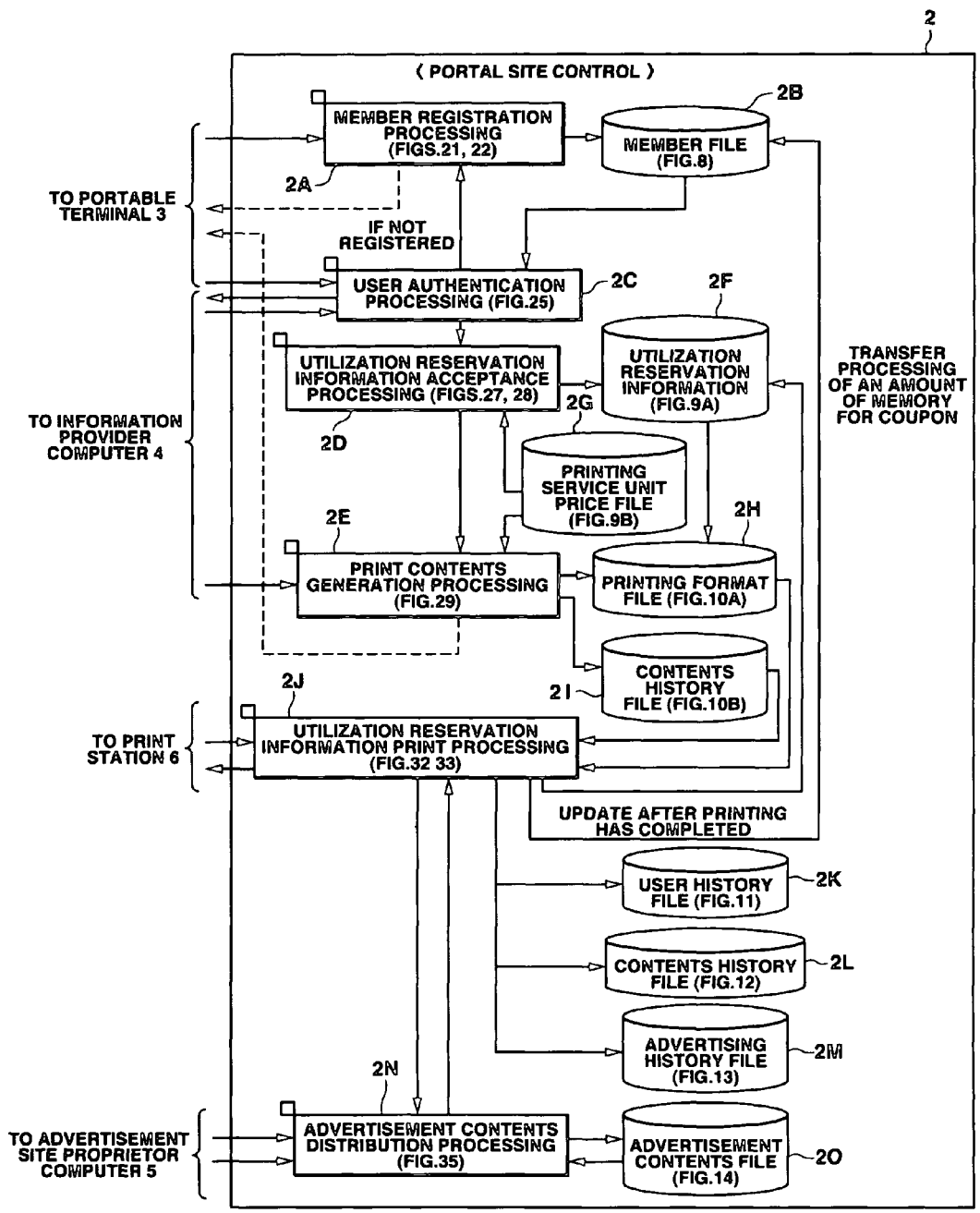
FIG. 4 is a view showing a schematic view of a control system of a portal site computer 2 shown in FIG. 1.

FIG. 4 is a block diagram depicting an outline of control functions that the portal site computer 2 has.

In FIG. 4, the portal site computer 2 comprises a member registration processing section 2A for executing member registration processing described later (refer to FIG. 21 and FIG. 22), thereby performing registration processing of member information according to a member registration request from the portable terminal 3; a member file 2B utilized by the member registration processing section 2A (refer to FIG. 8); a user authentication processing section 2C for performing reservation processing from the portable terminal 3 caused by executing user authentication processing described later (refer to FIG. 25), transmission of the user reservation ID to the information provider computer 4 and contents introduction processing, link parameter reception from the information provider computer 4 and utilization reservation processing or the like; and a utilization reservation information acceptance processing section 2D for performing link parameter acquisition processing from the user authentication processing section 2C by executing utilization reservation information acceptance processing described later (FIG. 27 and FIG. 28), setting processing of distribution contents and advertisement utilization contents based on the link parameters, and update processing of utilization reservation information or the like.

Further, the portal site computer 2 comprises a print contents generation processing section 2E for executing correlation of contents history from the information provider computer 4 by executing print contents generation processing described later (refer to FIG. 29) and contents download processing, print contents generation processing based on the distribution contents set by the utilization reservation information acceptance processing section 2D and the contents of utilizing advertisement, and charge notification processing for the portable terminal 3 or the like; a utilization reservation information file 2F (refer to FIG. 9A) and a printing service unit price file 2G (refer to FIG. 9B) that are utilized by the utilization reservation information acceptance processing section 2D; and a print format file 2H (refer to FIG. 10A) and a contents history file 2I (refer to FIG. 10B) that are utilized by the print contents generation processing section 2E.

In addition, the portal site computer 2 comprises a utilization reservation information print processing section 2J for performing utilization reservation information transmission processing according to a utilization reservation information request from the print station 6 by executing utilization reservation information print processing described later (refer to FIG. 32 and FIG. 33) and update processing of user history contents utilization history and advertising history; a user history file 2K (refer to FIG. 11); a contents utilization history file 2L (refer to FIG. 12); an advertisement contents distribution processing section 2N for receiving advertisement contents according to an advertisement distribution request from the advertisement site proprietor computer 5 by executing an advertisement contents distribution processing described later (refer to FIG. 34), and discriminating a distribution area or advertising conditions or the like based on utilization conditions set in the advertisement contents to perform an advertisement contents distribution; and an advertisement contents file 2O utilized by the advertisement contents distribution processing section 2N (refer to FIG. 14).

Now, a description will be given below to the internal configuration of each of the portal site computer 2, the portable terminal 3, the information provider computer 4, and the advertisement site proprietor computer 5 that configure the printing service system 100 shown in FIG. 1.

Figure 5:
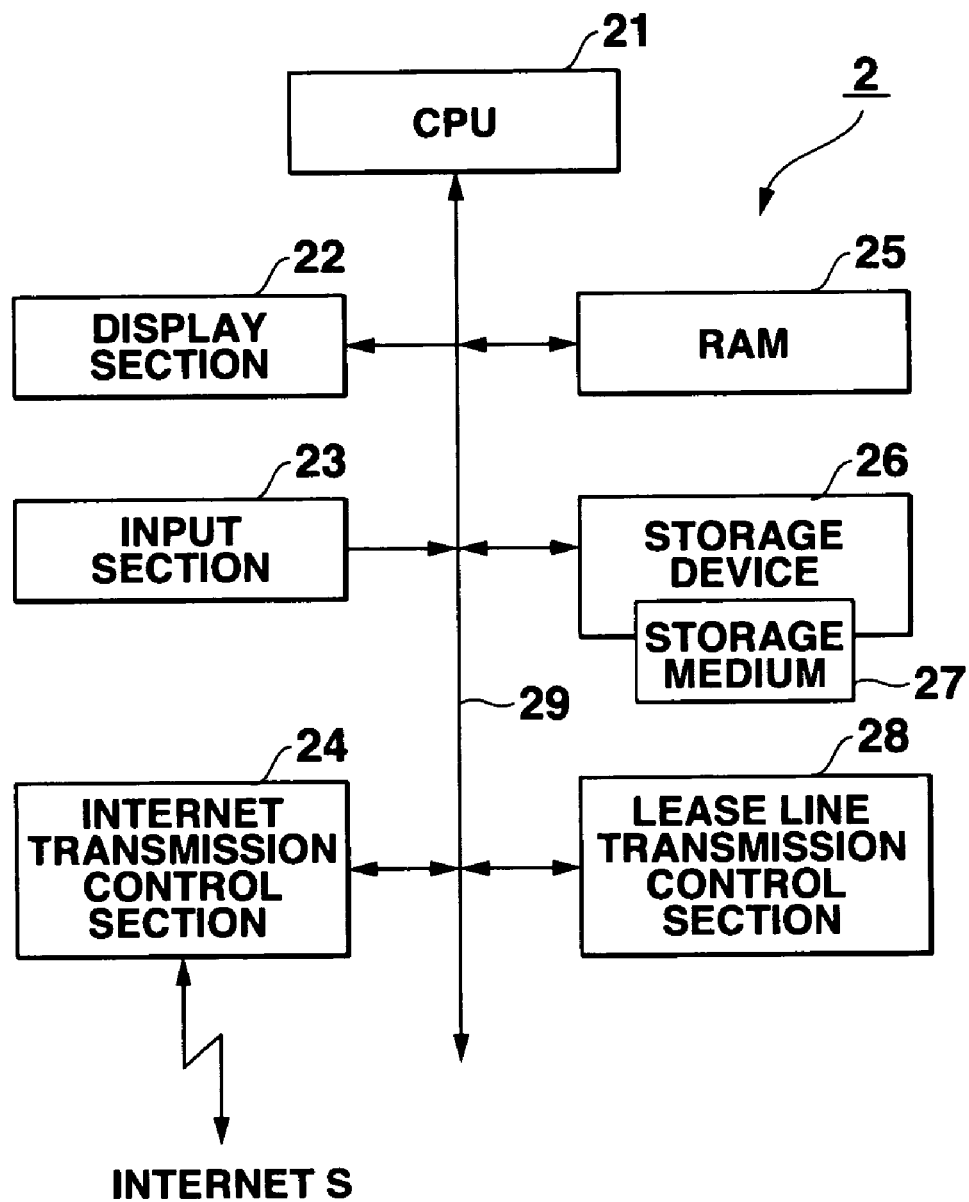
FIG. 5 is a block diagram depicting a configuration of essential portions of the portal site computer 2 shown in FIG. 1.

The portal site computer 2 comprises a CPU 21, a display section 22, an input section 23, an internet transmission control section 24, a RAM 25, a storage device 26, a storage medium 27, and a leased line transmission control section 28, as in the block diagram depicted in FIG. 5, and each section excluding the storage medium 27 is connected to a bus 29.

This portal site computer 2 comprises a portal site function associated with printing service. This portal site function sets a portal site page in a menu format, for example, in order to indicate to the portable terminal 3 the contents of printing service provided by the information provider computer 4 and the advertisement site proprietor computer 5 that are connected to the internet S; displays the portal site page for printing service on the portable terminal 3 accessed via the communication provider computer 1; issues a one-time password for print reservation check in response to the contents of a printing service request from the portable terminal 3.

That is, the portal site computer 2, as described above in an outline of control functions in FIG. 4, comprises the member registration processing section 2A; the user authentication processing section 2C; the utilization reservation information acceptance processing section 2D; the print contents generation processing section 2E; the utilization reservation information print processing section 2J; and the advertisement contents distribution processing section 2N. These control functions are achieved by the following program processing executed mainly in the CPU 21 incorporated in the portal computer 2.

The CPU (central processing unit) 21 executes member registration processing (refer to FIG. 21 and FIG. 22) in order to provide a member registration function for printing service to the portable terminal 3 accessed via the communications proprietor computer 1.

In this member registration processing, when a member registration menu is selected from the menu screen transmitted to an access request from the portable terminal 3, the CPU 21 transmits a member registration screen. Further, in the case where a new registration is selected from the member registration screen, the CPU 21 performs new registration processing of member information. In the case where modification of registration information is selected, the CPU 21 reads the corresponding registration information, and perform modification according to the associated instruction.

In addition, the CPU 21 executes a user authentication processing (refer to FIG. 25) described later for a printing service reservation request from the information provider computer 4.

In this user authentication processing, the CPU 21 acquires a link parameter from the information provider computer 4. If a user reservation ID and a portable user ID is set in that link parameter, the CPU 21 performs authentication processing through a member file. If such user reservation IF and portable user ID is not set, the CPU 21 acquires a portable user ID from the communication provider computer 1, thereby performing authentication processing. Then, the CPU 21 acquires a user reservation ID from the member file, transmits link destination menu information on the utilization contents to the portable terminal 3, and links the user reservation ID as a parameter with a contents site selected by the portable terminal 3.

In addition, the CPU 21 executes a utilization reservation information acceptance processing described later (refer to FIG. 27 and FIG. 28) based on the link parameter acquired in the above user authentication processing.

In this utilization reservation information acceptance processing, the CPU 21 executes setting processing of distribution contents and advertisement utilization contents, update processing of utilization reservation information or the like based on the acquired link parameter.

In addition, the CPU 21 executes print contents generation processing described later (refer to FIG. 29) based on utilization reservation information updated in the above utilization reservation information acceptance processing.

In this print contents generation processing, the CPU 21 executes correlation of contents history from the information provider computer 4 and contents download processing based on the updated utilization reservation information; print contents generation processing based on the distribution contents and advertisement utilization contents set in the user utilization reservation information acceptance processing; and charge notification processing for the portable terminal 3 or the like.

In addition, the CPU 21 executes utilization reservation information print processing (refer to FIG. 32 and FIG. 33) described later according to a utilization reservation information request from the print station 6.

In this utilization reservation information print processing, the CPU 21 executes utilization reservation information transmission processing according to a utilization reservation information request from the print station 6 and update processing of the user history, contents utilization history, and advertising history or the like.

In addition, the CPU 21 executes advertisement contents distribution processing described later (refer to FIG. 34) according to an advertisement distribution request from the advertisement site proprietor computer 5.

In this advertisement contents distribution processing, the CPU 21 receives advertisement contents according to an advertisement distribution request from the advertisement site proprietor computer 5, and determines a distribution area or advertising conditions or the like based on the utilization conditions set in the advertisement contents, thereby distributing the advertisement contents.

Further, the CPU 21 executes advertisement contents registration processing described later (refer to FIG. 36) based on the advertisement contents transmitted from the advertisement site proprietor computer 5.

In this advertisement contents registration processing, the CPU 21 executes registration check processing and update processing based on the advertisement contents received from the advertisement site proprietor computer 5, and sets an amount of money for advertisement coupon, the classification of the user contents, limitation to putting an advertisement or the like relevant to the advertisement contents targeted for update.

The display section 22 comprises a CRT (cathode ray tube) display device and a liquid crystal display device or the like, and displays the screen based on display data inputted from the CPU 21.

The input section 23 comprises a keyboard including cursor keys, numeric input keys, and various function keys or the like; and a mouse that is a pointing device. The input section outputs a signal of a key pressed from the keyboard to the CPU 21, and outputs an operation signal by the mouse to the CPU 21.

The internet transmission control section 24 comprises a modem (modulator/demodulator), a terminal adapter, or router and the like. This control section 24 performs communication control for making communication with each of a plurality of the information provider computers 4, the information provider computer 5, and a plurality of the print stations 6 that are connected to the internet S.

The RAM 25 (random access memory) 25 comprises a program storage area for storing programs or a variety of application programs that are executed by the CPU 21 and a work area for temporarily storing an input command, input data, and processing results or the like.

The storage device 26 comprises the storage medium 27 for storing programs or data and the like in advance. This storage medium 27 comprises a magnetic or optical recording medium or a semiconductor memory. This storage medium 27 is fixedly provided at the storage device 26 or is removably mounted thereto. This storage medium 27 stores a variety of application programs corresponding to the portal site computer 2, a member registration processing program, a user authentication processing program, a utilization reservation information acceptance processing program, a print contents generation processing program, a utilization reservation information print processing program, an advertisement contents distribution processing program, an advertisement contents registration processing program, and data or the like processed by each of these processing program.

In addition, an arrangement may be made such that all or part of the programs, data and the like stored in the storage medium 27 may be stored to be received from the internet transmission control section 24 via a transmission medium such as network line through another device such as server or client's device. Further, the storage medium 27 may be a storage medium of a server constructed on a network. Furthermore, an arrangement may be made such that the programs are transmitted to the server or client via a transmission medium such as network line, and are installed in these devices.

In addition, the storage medium 26 comprises a variety of memory areas associated with printing service. As shown in FIG. 4, the storage device 26 comprises the member file 2B, the utilization reservation information file 2F, the print service unit price file 2G, the print format file 2H, the contents history file 2I, the user history file 2K, the contents utilization history file 2L, the advertising history file 2M, and the advertisement contents file 2O.

The member file 2B stores member information by each user of the portable terminal 3 who utilizes printing service. The storage items, as shown in FIG. 8, comprises a member code, a user reservation ID, a portable user ID, a user ID (cellular telephone number), a password, name, gender, the date of birth, postal code, address, E-mail address, classification of occupation, classification of reasons for enrollment, introducer's cellular telephone number, the date of registration for enrollment, an amount of money for enrollment coupon, an amount of money for introduction coupon, an amount of money for advertisement coupon, an amount of money for survey coupon, the balance of utilization coupon, service charge for reservation printing, service charge for reservation information, an amount of money for coin entry during utilization, and an amount of money for the next transferred coupon.

Here, an amount of money for enrollment coupon is automatically set as service (an amount of money for bonus) provided to newly user-registered members during enrollment by means of the portal site computer 2. An amount of money for introduction coupon is an amount of money for coupon to be automatically added as service (an amount of money for bonus) provided to members who have introduced another member from the portal site computer 2 when one member has introduced another member.

In addition, an amount of money for advertisement coupon is an amount of money for coupon to be automatically added as service (an amount of money for bonus) provided to members from the portal site computer 2 in the case where advertisement contents are printed to contents subjected to printing services. An amount of money for survey coupon is an amount of money for coupon to be automatically added as service (an amount of money for bonus) provided to members from the portal site computer 2 in the case where one has participated in a questionnaire survey.

In addition, the utilization coupon balance indicates a total amount of money for the above enrollment coupon, introduction coupon, advertisement coupon, and survey coupon as an amount of money for coupon (an amount of money for balance) available for use in printing service.

A reservation printing service charge indicates a print cost of the utilization charges computed according to the contents of printing service accepted by members. A reservation information charge indicates an information providing cost of the utilization charges computed according to the contents of printed service accepted by members. These charges are displayed after being transmitted to the member's portable terminal 3 during reservation for printing service.

An amount of money for coin entry during utilization is such that an amount of money for insufficiency obtained by subtracting the utilization coupon balance from the utilization charge (reservation print service charge+reservation information service charge) computed according to the contents of printing service accepted by members is computed in units of 100 yen. An amount of money for coin entry during this utilization is displayed after being transmitted to the member's portable terminal 3 during reservation for printing service.

The utilization reservation information file 2F stores printing service reservation information (contents printing reservation information). The storage items include, as shown in FIG. 9A, a member code, an information company ID, a contents URL, a classification of contents type, a contents name, an information service charge, a printing service charge, a printing medium (form) type, the number of printing surfaces, the number of prints, the number of copies, a continuous printing specification, an advertisement printing specification, and the date and time of reservation and registration.

The printing service unit price file 2G stores information on printing service unit prices during printing service. The storage items, as shown in FIG. 9B, include a printing medium code, a printing medium (form) type, the number of printable surfaces, a printing service unit price per form, the date and time of service unit price change, a service unit price after being changed, and the date and time of unit price registration.

The print format file 2H stores print format information during printing service. The storage items, as shown in FIG. 10A, include a member code, a printing medium code, a printing medium (form) type, the number of prints, the number of printing surfaces, the final number of surfaces on the current page, and the date and time when printing has been completed.

The contents history file 2I stores history information on contents provided through printing service. The storage items, as shown in FIG. 10B, include a contents history URL, a classification of contents type, a contents name, an information service charge, a specification of standard medium code, the number of standard printing surfaces, a limitation of age for contents utilization, a limitation of utilization of shops placed at station, the date and time of contents update, and the effective date and time of contents.

The user history file 2K stores utilization history information by each user of the portable terminal 3 who has utilized printing service. The storage items, as shown in FIG. 11, include a user member code, the date and time of utilization, an enrollment coupon charge, an introduction coupon charge, an advertisement coupon charge, a survey coupon charge, an utilization coupon balance, a reservation printing service charge, a reservation information service charge, an amount of money for coin entry during utilization, an amount of money for the next transferred coupon, and a utilization station code.

The contents utilization history file 2L stores utilization history information by each information provider computer 4 that provides the contents for printing service. The storage items, as shown in FIG. 12, include an information company ID, the year, month, and days of utilization, the date and time of utilization, a contents URL, a classification of contents type, the name of contents, an information service charge, a printing service charge, a printing medium (form) type, the number of printing surfaces, the number of prints, the number of printed copies, continuous printing specification, an advertisement printing specification, a utilization station code, and a user member code.

The advertising history file 2M stores utilization history information by each advertisement site proprietor computer 5 that provides the advertisement contents for printing service. The storage items, as shown in FIG. 13, include an advertisement company ID, the year, month and days of advertising, the date and time of putting an advertisement, an advertisement contents URL, a classification of advertisement contents type, the name of advertisement contents, advertising service charge, an amount of money for advertisement coupon, an advertisement printing medium (form) type, the number of advertising surfaces, the number of advertising copies, a utilization station code, and a user member code.

The advertisement contents file 2O stores information concerning advertisement contents for printing service. The storage items, as shown in FIG. 14, include an advertisement company ID, an advertisement contents URL, a classification of advertisement contents type, the name of advertisement contents, an advertising service charge, an amount of money for advertisement coupon, an advertisement printing medium (form) type, the number of advertising surfaces, the limited number of copies for putting an advertisement, the remaining number of advertising issues, the starting date and time of putting an advertisement, the closing date and time of putting an advertisement, an advertising area classification 1, an advertising area classification 2, an advertiser gender, a lower limit of advertiser's age, an upper limit of advertiser's age, the date of advertiser's birth, an advertiser's occupation classification 1, an advertiser's occupation classification 2, an advertiser's content 1, an advertiser's content 2, an advertising limitation area classification 1, an advertising limitation area classification 2, an advertising limitation shop classification 1, an advertising limitation shop classification 2, an advertising limitation contents type 1, an advertising limitation contents type 2, an advertising limitation contents company 1, and an advertising limitation contents company 2.

Figure 6:
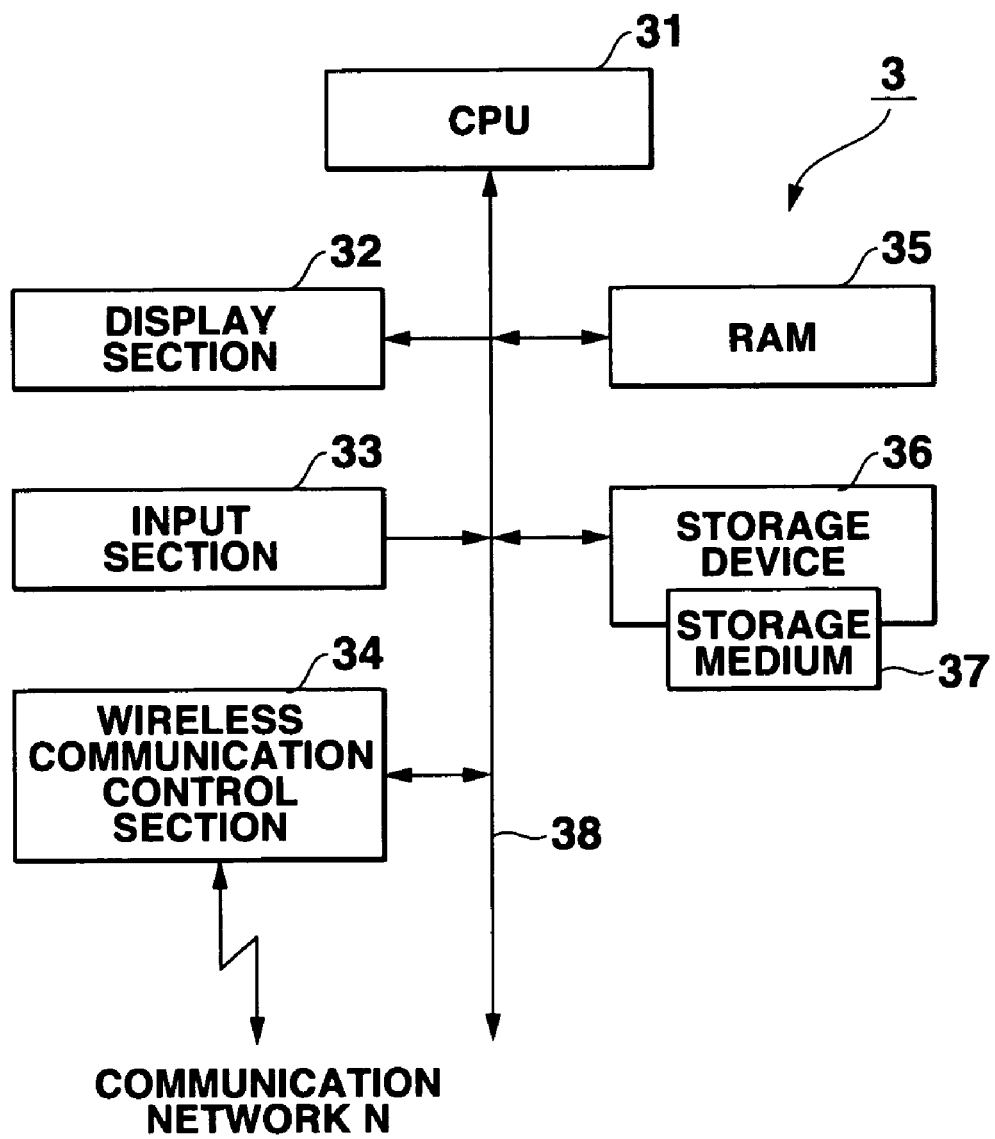
FIG. 6 is a block diagram depicting a configuration of essential portions of a portable terminal 3 shown in FIG. 1.

Now, a configuration of the portable terminal 3 shown in FIG. 1 will be described with reference to a block diagram depicted in FIG. 6. In FIG. 6, the portable terminal 3 comprises a CPU 31, a display section 32, an input section 33, a wireless communication control section 34, a RAM 35, a storage device 36, and a storage medium 37. Each section excluding the storage medium 37 is connected to a bus 38.

This portable terminal 3 incorporates a cellular telephone function, wherein printing service is made available by providing an access to the portal site computer 2 via the communication provider computer 1 through the communication network N.

That is, the portable terminal 3 comprises the member registration processing section 3A and the reservation processing section 3C as described above in an outline of control functions by referring to FIG. 1. These control functions are achieve by the following program processing executed mainly in the CPU 31 incorporated in the portable terminal 3.

The CPU 31 develops a system program stored in the storage device 36 and an application program specified from among a variety of application programs corresponding to the system into a program storage region (not shown) provided in the RAM 35. The CPU 31 temporarily stores a variety of commands or data inputted from the input section 33 in the RAM 35, and executes a variety of processings in accordance with the application programs stored in the storage device 36 in response to these input commands and input data. Then, the CPU 31 stores the processing result in the RAM 35, and displays it on the display section 32. Then, the CPU 31 saves the processing result stored in the RAM 35 in a save destination provided in the storage device 36 instructed to be inputted from the input section 33.

In addition, the CPU 31 executes member registration processing described later (refer to FIG. 20) when printing service is made available by providing an access to the portal site computer 2 over the internet S via the communications provider computer 1 through the communication network N wirelessly connected by means of the wireless communication control section 34.

In this member registration processing, the CPU 31 is connected to a printing service site set at the portal site computer 2 over the internet S, receives the menu screen from the portal site computer 2, and displays it on the display section 32. When one makes a menu selection from the menu screen, the CPU transmits the contents of the selected command to the portal site computer 2. Then, the CPU 31 receives a member registration screen from the portal site computer 2.

In the case where a "modification mode" is selected from the member registration screen, the CPU 31 checks user authentication by transmitting the inputted user ID and password to the portal site computer 2. Then, the CPU 31 receives a member information registration screen including registered member information, and prompts the user to modify and input the registered member information.

In addition, in the case where a "new registration mode" is selected from the member registration screen, the CPU 31 performs new user registration by transmitting the inputted user ID (cellular telephone number) to the portal site computer 2. Then, the CPU 31 receives a member information registration screen, and prompts the user to input the member information.

Further, the CPU 31 executes reservation registration processing described later (refer to FIG. 23 and FIG. 24) in the case where printing service is reserved after member registration has been completed.

In this reservation registration processing, the CPU 31 provide an access to a portal site of the portal site computer 2 over the internet S, an official site of the information provider computer 4, or a general site of the information provider computer 4 via the communication provider computer 1 through the communication network N wirelessly connected by means of the wireless communication control section 34, thereby reserving utilization of the printing service.

In the case where an access is provided to a portal site of the portal site computer 2, the CPU 31 receives a reservation information menu from the portal site computer 2, and displays the menu. Then, the CPU 31 performs user authentication, and prompts the user to select contents. Then, the CPU 31 receives and displays the contents of utilization of printing service, and checks the print command. The CPU 31 receives and displays a reservation check screen for further selected contents, and prompts the user to reserve and input the contents of printing reservation (the number of printing copies, printing medium (form), continuous printing, advertisement insertion print or the like). Then, the CPU 31 displays the printing reservation contents to be reserved and inputted by the user.

In the case where an access is provided to an official site of the information provider computer 4, a specific user ID assigned to the portable terminal 3 at such official site is automatically authenticated. Thus, the CPU 31 receives the contents of the official site information menu from the information provider computer 4, and displays it. After a desired printing information has been selected, the CPU 31 receives and displays the contents of utilization of printing service, and checks the print command. Then, the CPU 31 receives a user authentication screen from the portal site computer 2, displays the screen, and executes member registration check. When such member registration is acceptably checked, the CPU 31 goes to contents reservation processing in a manner similar to the above. If the member registration is unacceptably checked, the CPU 31 goes to the above member registration processing because new member registration is required.

In addition, in the case where an access is provided to a general site of the information provider computer 4, the CPU 31 receives a general site information menu from the information provider computer 4, and displays the menu. After desired printing information has been selected, the CPU 31 receives and displays the contents of utilization of printing service, and checks the print command. Then, the CPU 31 receives a user authentication screen from the portal site computer 2, displays the screen, and executes member registration check. When such member registration is acceptably checked, the CPU 31 goes to contents reservation processing in a manner similar to the above. If the member registration is unacceptably checked, the CPU 31 goes to the above member registration processing because new member registration is required.

The display section 32 comprises a liquid crystal panel or the like. This display section 32 displays the screen based on display data inputted from the CPU 31.

The input section 33 comprises a keyboard including cursor keys, numeric input keys, and a variety of function keys or the like; and a mouse that is a pointing device. This input section 33 outputs a signal of a key pressed from the keyboard to the CPU 31, and outputs an operation signal by the mouse to the CPU 31.

The wireless communication control section 34 comprises a wireless modem or the like. This communication control section 34 performs communication control for making wireless communication with the communications provider computer 1 connected to the communication network N.

The RAM 35 comprises a program storage area for storing programs executed by the CPU 31 or a variety of applications program and a work area for temporarily storing input data and processing result or the like.

The storage device 36 comprises the storage medium 37 in which programs or data and the like are stored in advance. This storage medium 37 comprises a magnetic or optical recording medium or a semiconductor memory. This storage medium 37 is fixedly provided at the storage device 36 or is removably mounted thereto. This storage medium 37 stores a variety of application programs corresponding to the portable terminal 3, a member registration processing program, a utilization reservation registration processing program, and data or the like processed by each of these processing programs.

In addition, an arrangement may be made such that all or part of the programs, data and the like stored in the storage medium 37 may be stored to be received from the internet transmission control section 34 via a transmission medium such as network line through another device such as server or client's device. Further, the storage medium 37 may be a storage medium of a server constructed on a network. Furthermore, an arrangement may be made such that the programs are transmitted to the server or client via a transmission medium such as network line, and are installed in these devices.

Now, a configuration of the print station (output device) 6 shown in FIG. 1 will be described with reference to the block diagram shown in FIG. 7. This print station 6 is placed at shop or the like, and provides printing service to the user of the portable terminal 3. The print station comprises a function for issuing a prepaid document for that printing service and a function for providing a service coupon caused by advertisement printing and the like.

Figure 7:
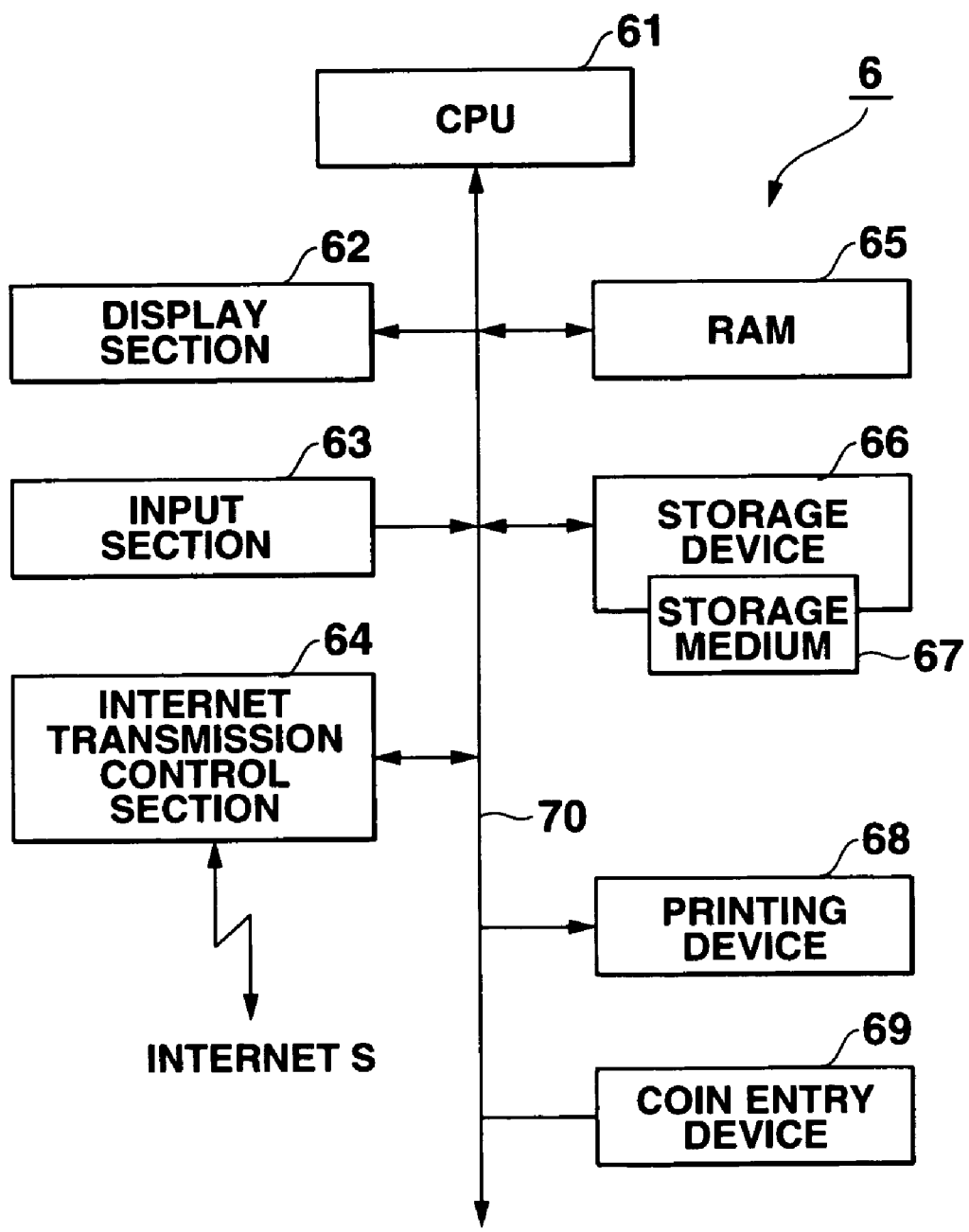
FIG. 7 is a block diagram depicting a configuration of essential portions of a print station 6 shown in FIG. 1.

In FIG. 7, the print station 6 comprises a CPU 61, a display section 62, an input section 63, an internet transmission control section 64, a RAM 65, a storage device 66, a storage medium 67, a printing device 68, and a coin entry device 69. Each section excluding the storage device 67 is connected to a bus 70.

The CPU 61 executes utilization reservation information print processing described later (refer to FIG. 30 and FIG. 31) in order to provide printing service to the user of the portable terminal 3 who has reserved printing of the above printing service.

In this utilization reservation information print processing, the CPU 61 displays a printing service menu. When one makes a utilization reservation printing menu selection, the CPU 61 prompts the user to input a user ID (cellular telephone number) and a password. The CPU transmits the inputted user ID (cellular telephone number) and password to the portal site computer 2, and executes authentication processing of the utilization reservation user.

When the utilization reservation user is authenticated, the CPU 61 acquires utilization reservation information from the portal site computer 2 and displays the information. In the case where the coupon balance for the printing service is insufficient, the CPU 61 displays an amount of money for purchase required for utilization, and waits for coin entry.

When the CPU 61 checks the coin corresponding to such amount of money for purchase for entry into the coin entry device 69, the CPU 61 acquires a contents history file for utilization reservation information and a print format file from the portal site computer 2, and checks to see if advertising is specified. When the above advertising is specified, the CPU 61 further receives advertisement contents from the portal site computer 2. Then, the CPU 61 generates contents and advertisement contents print data in accordance with the print format file, and prints the data on its specified form through the printing device 68. Then, the CPU 61 displays a total amount of money for advertisement coupon that has been printed when it checks the completion of printing.

The display section 62 comprises a CRT display device, a liquid crystal display device or the like. This display section displays the screen based on display data inputted from the CPU 61.

The input section 63 comprises a touch panel configured integrally with the display screen of the display section 62; and a keyboard including numeric input keys and various function keys or the like. The input section 63 outputs a signal of a key pressed from the keyboard to the CPU 61, and outputs an operation signal by the mouse to the CPU 61.

The internet transmission control section 64 comprises a modem, a terminal adapter, or router and the like. This control section 64 performs communication control for making communication with each of the portal site computer 2 connected to the internet S, the information provider computer 4, and the advertisement site proprietor computer 5.

The RAM 65 comprises a program storage area for storing programs executed by the CPU 61 and a variety of application programs and a work area for temporarily storing an input command, input data, processing result the like.

The storage device 66 comprises the storage medium 67 for storing programs, data and the like in advance. This storage medium 67 comprises a magnetic or optical recording medium or a semiconductor memory. This storage medium 67 is fixedly provided at the storage device 66 or is removably mounted thereto. This storage medium 67 stores a variety of utilization reservation information print processing programs corresponding to the print station 6 and data or the like processed by each of these processing program.

In addition, the storage device 66 comprises a variety of memory areas associated with printing service. As shown in FIG. 4, the storage device 66 comprises the print format file 6B, the contents file 6C, the advertisement contents file 6D, and the utilization reservation information file 6E.

In addition, an arrangement may be made such that all or part of the programs, data and the like stored in the storage medium 67 may be stored to be received from the internet transmission control section 64 via a transmission medium such as network line through another device such as server or client's device. Further, the storage medium 67 may be a storage medium of a server constructed on a network. Furthermore, an arrangement may be made such that the programs are transmitted to the server or client via a transmission medium such as network line, and are installed in these devices.

The printing device 68 comprises a color print mode and a monochrome print mode in which a variety of printing forms (a plain paper (A4 and A3), a refill of a notebook (B6), an elongated paper, a sticker (2×4), a trading card, a post card, a prepaid document form or the like) is available. During utilization reservation information print processing executed by the CPU 61, the printing device 68 prints print data inputted from the CPU 61 to a printing medium and ejects the printing medium.

In addition, the printing device 68 prints advertisement print data inputted from the CPU 61 on a vacant space of the printing medium by means of utilization reservation information print processing executed by the CPU 61.

When an amount of money (fare-adjusted amount of money) for purchase required for utilization of printing service is displayed, the coin entry device 69 comprises a function that identifies and counts a coin entered by the user (for example, a 100 yen coin) by means of the utilization reservation information print processing executed by the CPU 61, and then, notifies the count value to the CPU 61.

The configuration and functions of each of the information provider computer 4 and advertisement site proprietor computer 5 have been described in the schematic configuration shown in FIG. 2 and FIG. 3. An illustration and description of its internal configuration will be omitted here.

Now, an operation according to the present embodiment will be described here.

First, the member registration processing (FIG. 21) executed at the portable terminal 3 will be described with reference to a flow chart shown in FIG. 20.

Figure 20:
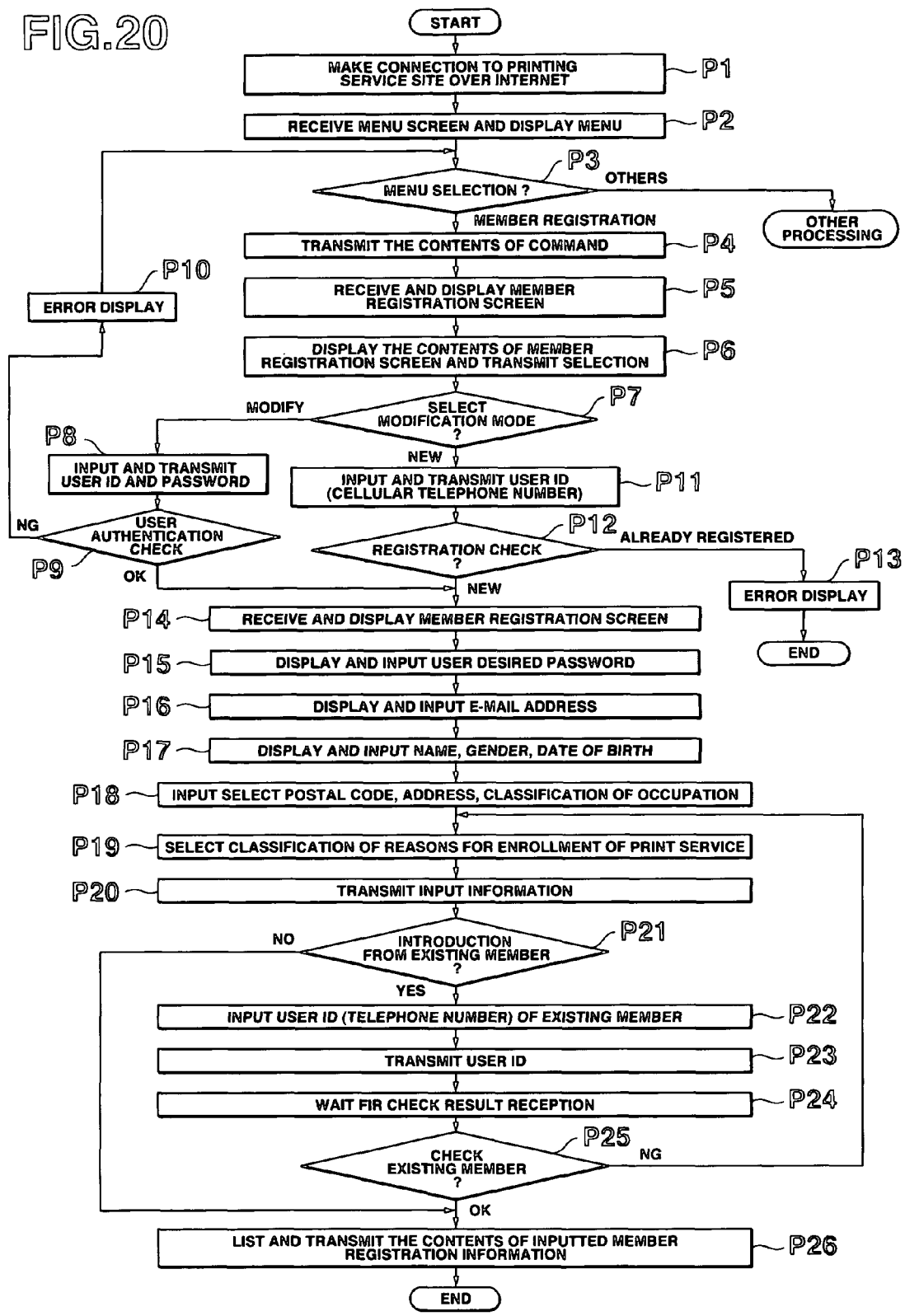
FIG. 20 is a flow chart showing member registration processing executed at the portable terminal 3 shown in FIG. 6.

At the portable terminal 3, when the user instructs an access to a portal site, the CPU 31 starts member registration processing (FIG. 21) shown in FIG. 20, and makes connection to the portal site computer 2 via the communication provider computer 1 from the communication network N wirelessly connected by means of a wireless communication control section 34. Then, the CPU receives a portal site menu screen from the portal site computer 2, and displays the menu on the display section 32 wherein a printing service site that exists on the portal site menu makes a selection.

Figure 15A:
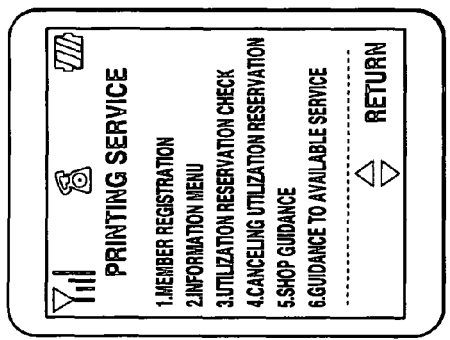
FIG. 15A is a view showing a portal site menu screen displayed at the portable terminal 3 shown in FIG. 6.

In FIG. 20, the CPU 31 first makes connection to a printing service site at which the portal site computer 2 is established at the internet S (step P1). Then, the CPU 31 receives a printing service menu screen from the portal site computer 2, and displays the printing service menu as shown in FIG. 15A, for example (step P2).

Next, the CPU 31 determines whether or not a menu item is selected on the displayed printing service menu "1. Member registration" (step S3). In the case where another printing service menu is selected, it goes to the thus selected other processing. In the case where "1. Member registration" is selected, the selected contents are transmitted to the portal site computer 2 (step P4).

Figure 15C:
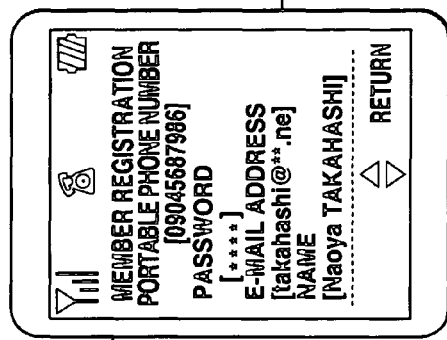
FIG. 15B to FIG. 15D are views each showing a transition state of a member registration screen.
Figure 15D:
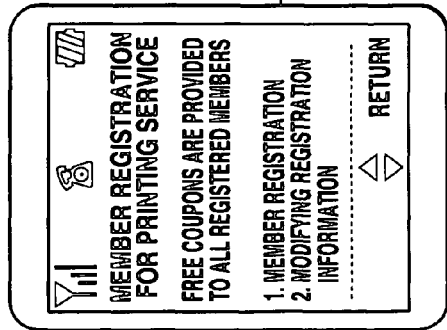
Figure 15B:

The CPU 31 receives a member registration screen as shown in FIG. 15B, for example (step P5). In this case, "1. Member registration" or "2. Modification of registration information" can be selected as a menu item.

The CPU 31 transmits a menu item number 1 or 2 selected on the member registration screen to the portal site computer 2 (step P6). Then, the CPU 31 determines whether or not "2. Modification of registration information" has been selected (step P7).

In the case where "2. Modification of registration information" is selected, the CPU 31 prompts the user to input a user ID (cellular telephone number) and password, and transmits the inputted ID and password to the portal computer 2 (step P8). Then, the CPU 31 waits for user authentication check from the portal site computer 2 (step P9). In the case where user authentication check is NG, the CPU 31 displays an error (step P10). Then, the CPU 31 returns to the step P3. In the case where user authentication check is OK, it goes to the step P14.

In the case where "1. Member registration" is selected, the CPU 31 prompts the user to input a user ID (cellular telephone number), and transmits the inputted ID to the portal site computer 2 (step P11). Then, the CPU 31 waits until the presence or absence of "registered" has been received from the portal site computer 2 (step P12). If "registered" is received, the CPU 31 displays an error (step P13), and terminates this processing.

If new registration is received instead of such "registered", the CPU 31 receives a member information registration screen from the portal site computer 2, and displays a member registration screen as shown in FIG. 15C and FIG. 15D, for example (step P14). Then, the CPU 31 displays and inputs a cellular telephone number, a password, an E-mail address, name, address, and the date of birth (steps P15 to P17). Then, the CPU 31 inputs and selects a postal code, address, and classification of occupation (step P18). The CPU 31 further inputs and selects classification of reasons for enrollment into printing service (step P19).

During password input, as shown in FIG. 15C, the "****" is displayed to ensure security.

When inputs concerning member information at the foregoing steps P15 to P19 have been terminated, the CPU 31 transmits a variety of inputted information to the portal site computer 2 (step P20). Then, the CPU 31 checks to see if the selected classification of reasons for enrollment into printing service is "introduction from the existing member" (step P21).

If the classification for reasons for such enrollment is not "introduction from the existing member", the CPU 31 goes to step P26. When the above classification is "introduction from the existing member", the CPU 31 prompts the existing member to input his or her user ID (phone number) (step P22). Then, the CPU 31 transmits the thus inputted user ID to the portal site computer 2 (step P23), and waits until the check result has been received from the portal site computer 2 relevant to the existing member (step P24).

When the check result of the existing member has been received from the portal site computer 2, the CPU 31 determines whether the check result is OK or NG (step P25). If it is NG, the CPU returns to step P19 at which the classification for reasons for enrollment is selected. When OK, the CPU goes to step P26. Then, the CPU 31 lists the contents of the inputted member registration information, transmits the contents of the member registration information to the portal computer 2, and terminates the member registration processing (FIG. 21).

Now, the member registration processing (FIG. 21) executed by the CPU 21 incorporated in the portal site computer 2 according to the member registration processing (FIG. 21) caused by the above portable terminal 3 will be described with reference to the flow charts shown in FIG. 21 and FIG. 22.

Figure 21:
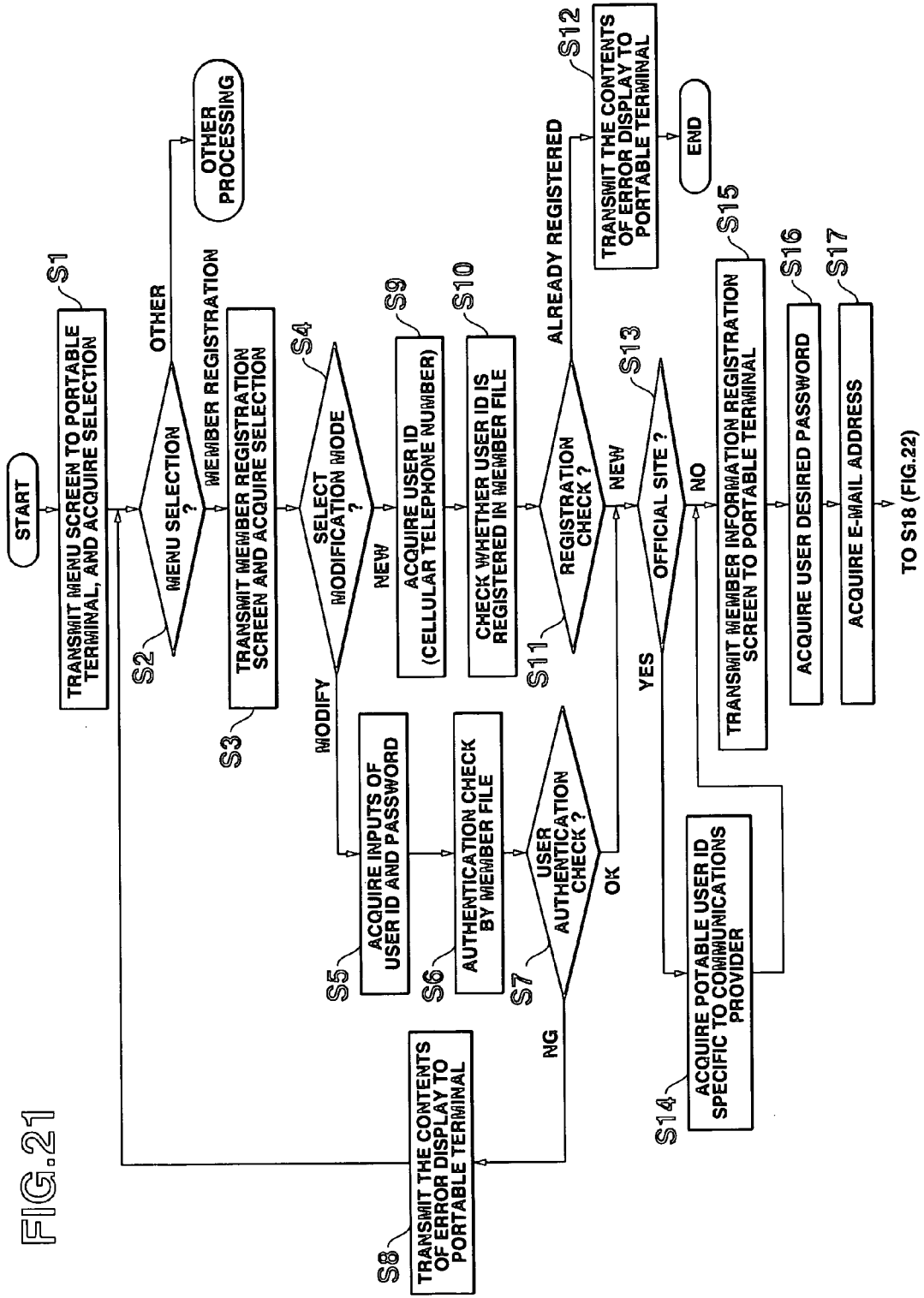
FIG. 21 is a flow chart showing a part of the member registration processing executed by the portal site computer 2 shown in FIG. 5.

In FIG. 21, when the portable terminal 3 accesses to a printing service site, the CPU 21 incorporated in the portal site computer 2 transmits a printing service menu screen (refer to FIG. 15A) to the portable terminal 3, and acquires a menu selection number transmitted from the portable terminal 3 (step S1). Then, the CPU 21 determines whether the selection number is of the member registration menu or another menu (step S2).

If the discrimination result is "another menu", the CPU 21 goes to another processing. When the discrimination result is a "member registration menu", the CPU 21 transmits the member registration screen (refer to FIG. 15B) to the portable terminal 3, and acquires a menu selection number transmitted from the portable terminal 3 (step S3). Then, the CPU 21 determines whether the selection is a modification mode or a new member registration mode (step S4).

In the case of the modification mode, the CPU 21 acquires the input value of each of the user ID (cellular telephone number) and password transmitted from the portable terminal 3 (step S5). Then, the CPU 21 performs user authentication check by referring to the member data stored in the member file 2B (refer to FIG. 8) based on each input value (step S6). If the user authentication result is NG (step S7), the CPU 21 transmits the contents of error display to the portable terminal 3 (step S8), and returns to the step S2 at which a menu selection number is discriminated.

When the user authentication result is OK (step S7), the CPU 21 goes to the step S13.

At the step S4, in the case where a new member registration mode is selected, the CPU 21 acquires a user ID (cellular telephone number) transmitted from the portable terminal 3 (step S9). Then, the CPU 21 performs user ID registration check for the member file 2B (refer to FIG. 8) (step S10), and determines whether or not the user ID has been registered (step S11).

When the user ID exists (has been registered), the CPU 21 transmits the contents of error display to the portable terminal 3 (step S12). If the user ID is not registered yet, the CPU 21 determines whether or not the user of the portable terminal 3 is at an official site (step S13).

In the case where the user of the portable terminal 3 accesses to somewhere via the official site of the communications provider computer 1, the CPU 21 acquires from the communication provider computer 1 the portable user ID that the communications provider sets by each portable terminal 3 (step S14), and goes to step S15. In the case where the user of the portable terminal 3 accesses to somewhere via a site other than the official site, the CPU 21 goes to the step S15 immediately.

At the step S15, the CPU 21 transmits a member information registration screen (refer to FIG. 15C and FIG. 15D) to the portable terminal 3, and then, acquires a user's desired password transmitted from the portable terminal 3 (step S16). Then, the CPU 21 acquires an E-mail address (step S17).

Figure 22:
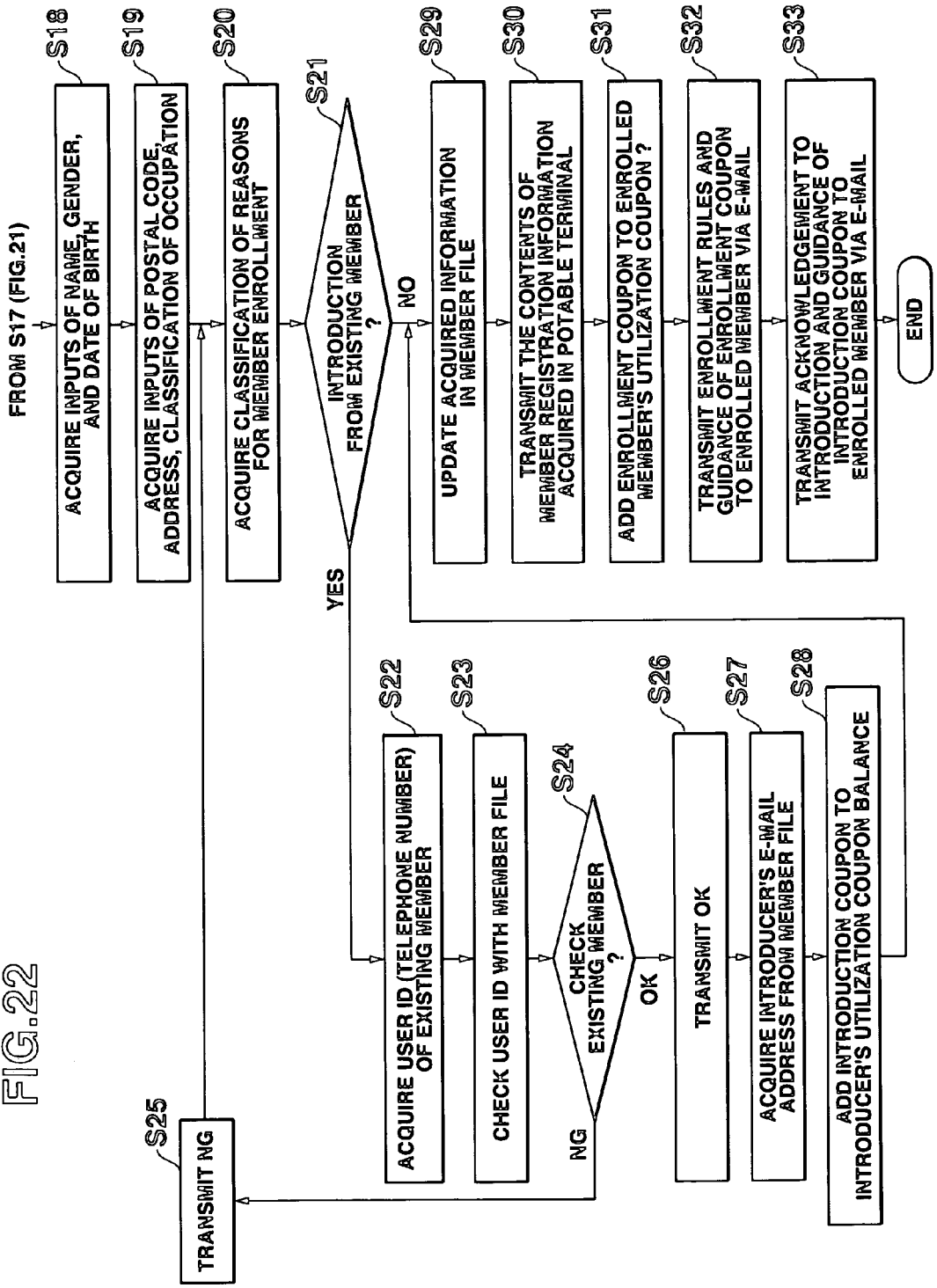
FIG. 22 is a flow chart showing the member registration processing following that shown in FIG. 21.

Further, the CPU 21 acquires each of the input values such as user's name, gender, date of birth, postal code, address, classification of occupation, and classification of reasons for enrollment into the members that are transmitted from the portable terminal 3 (steps S18 to S20 shown in FIG. 22).

Then, if the acquired classification of reasons for such enrollment is "introduction from the existing member", the CPU 21 acquires the user ID of the existing member (phone number) transmitted from the portable terminal 3 (step S22). Then, the CPU 21 checks to see if the user ID of the existing member has been registered in the member file 2B (refer to FIG. 8) (step S23), and checks to see if such person is the existing member (step S24).

If the above person is not the existing member, i.e., NG, the CPU 21 transmits the fact to the portable terminal 3 (step S25). Then, the CPU 21 returns to the step 20 at which the classification of reasons for enrollment is acquired. When the person is the existing member, i.e., OK, the CPU 21 transmits the fact to the portable terminal 3 (step S26).

Next, the CPU 21 acquires the introducer's mail address from the member file 2B (step S27), adds a correlation coupon (an amount of money for bonus) to the introducer's coupon balance (step S28), and goes to step S29. In this case, an amount of correlation coupon is predetermined, for example, 100 yen.

At the step S21, in the case where the acquired classification of reasons for enrollment is not "introduction from the existing member", the CPU 21 updates the member file 2B based on the information acquired at the steps S16 to S20. The CPU 21 transmits the contents of the acquired member registration information to the portable terminal 3 (step S30), and adds an enrollment coupon (an amount of money for bonus) to the participant's coupon balance (step S31). In this case, an amount of money for such enrollment coupon is predetermined, 100 yen, for example.

Then, the CPU 21 transmits enrollment rules and guidance of such enrollment coupon to the enrolled person via E-mail (step S32), transmits acknowledgment to introduction and guidance of the introduction coupon via E-mail (step S33), and terminates member registration processing (FIG. 21).

As described above, the user of the portable terminal 3 accesses to the portal site computer 2 by means of member registration processing (FIG. 21) so that member registration for printing service can be easily performed.

At the portal site computer 2, an enrollment coupon (an amount of money for bonus) is automatically assigned as an enrollment privilege to the enrolled user of the portable terminal 3. In the case where the reason for enrollment is introduction from the existing member, the introduction coupon (an amount of money for bonus) is added as an introduction privilege to the existing member being an introducer that has introduced a newly enrolled user.

According to such system, in the printing service system 100 of the present embodiment, enrollment of new members, introduction to new members or the like can be promoted, and utilization of the member printing service can be promoted.

Now, the utilization reservation registration processing of printing service executed at the portable terminal 3 will be described herewith reference to the flow charts shown in FIG. 23 and FIG. 24.

The user of the portable terminal 3 can employ access methods for registering the utilization reservation for printing services. The above access methods include providing a direct access to the portal site computer 2 that provides printing service, thereby causing a link, and providing an access to an official site or a general site that the communication provider computer 1 provides over the internet S, thereby causing a link with printing service.

Figure 23:
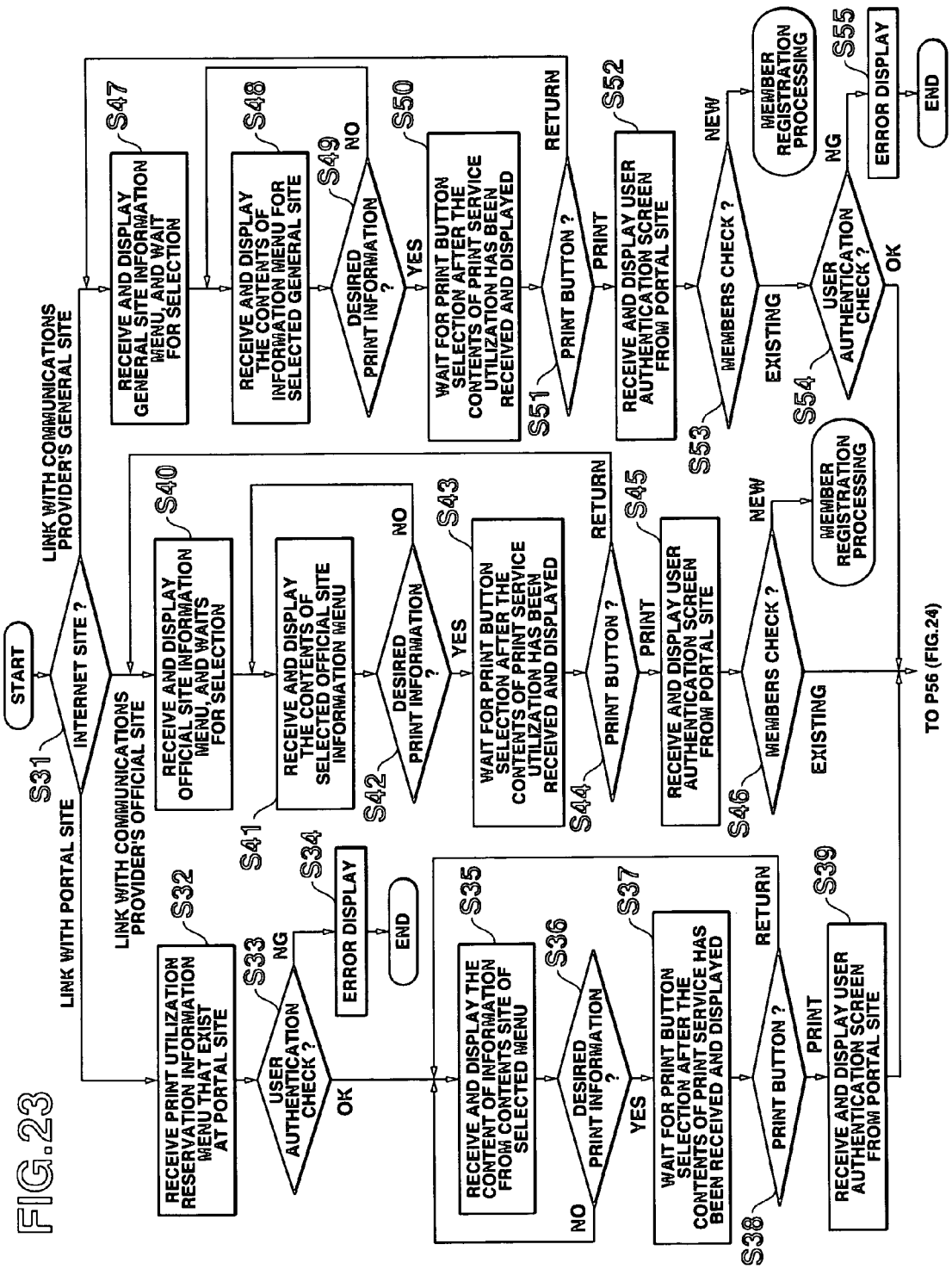
FIG. 23 is a flow chart showing a part of utilization reservation registration processing executed at the portable terminal 3 shown in FIG. 6.
Figure 24:
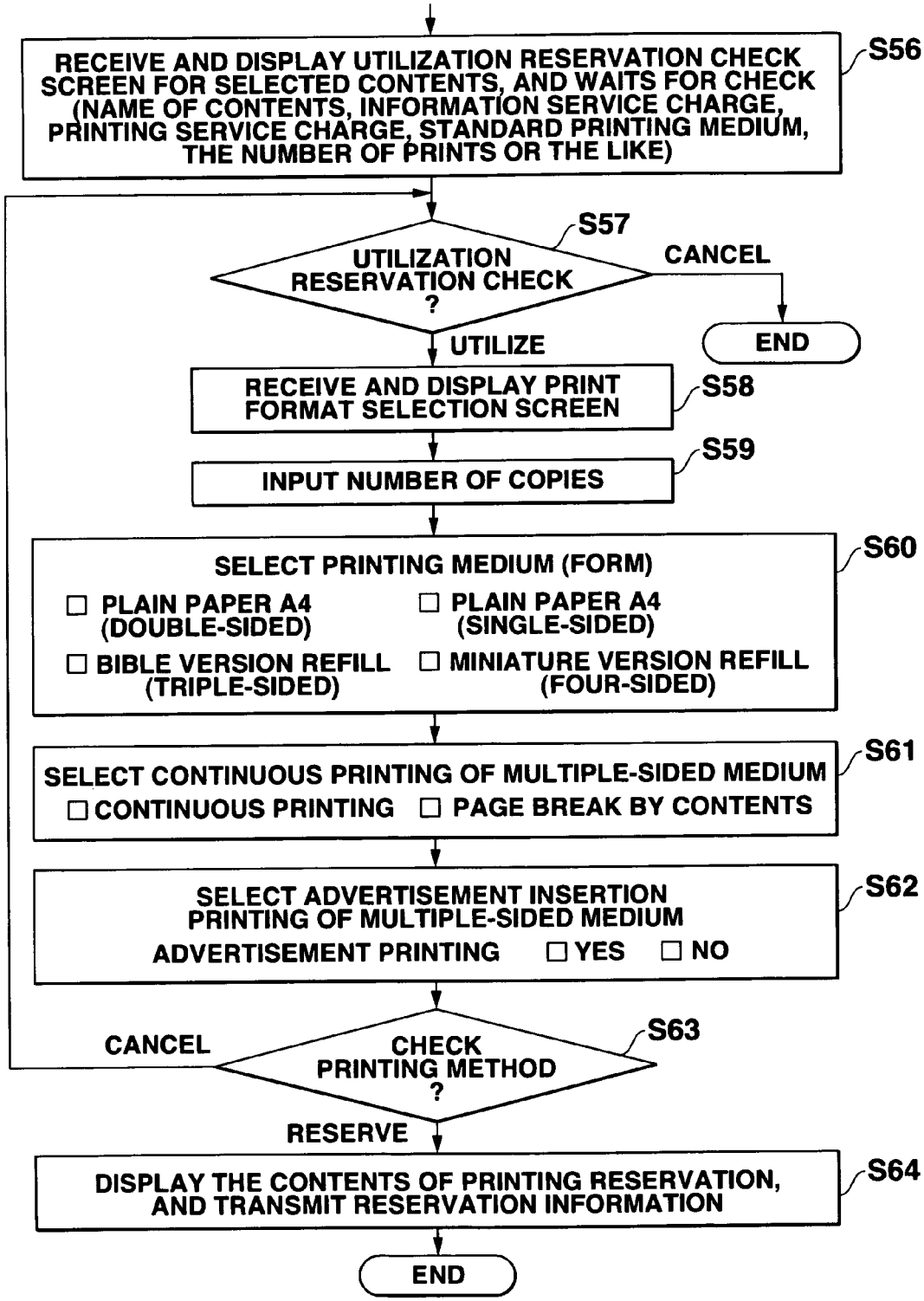
FIG. 24 is a flow chart showing a utilization reservation registration processing following that shown in FIG. 23.

At the portable terminal 3, when the user instructs an access to the site over the internet S, the CPU 31 accesses to a site instructed via the communications provider computer 1 through the communication network N wirelessly connected by means of the wireless communication control section 34, and starts utilization reservation registration processing shown in FIG. 23.

In FIG. 23, the CPU 31 first determines whether the type of site linked by providing an access over the internet S is a "portal site", a "communications provider's official site", or a "communications provider's general site" (step P31).

In the case where the portal site is linked, the CPU 31 receives a print utilization reservation information menu from the portal site computer 2 (step P32), and displays a print utilization reservation information menu screen (not shown).

Next, the CPU 31 receives from the portal site computer 2 the user authentication result obtained by the user ID (cellular telephone number) transmitted to the portal site computer 2 during linkage and checks the thus received result (step P33). If the user authentication result is NG, the CPU displays an error (step P34), and terminates this utilization reservation registration processing.

In the case where the user authentication result is OK, the CPU 31 receives from the portal site computer 2 the contents (information) corresponding to the menu item selected from the print utilization reservation information menu screen, and displays the contents selection screen (step P35).

An example of the contents selection screen display is shown in FIG. 16A. This example of the contents selection screen display indicates a case in which the "part-time job" information search screen is displayed.

Next, the CPU 31 determines whether or not the user's desired printing information has been selected from the displayed contents selection screen (step S36), and continues displaying the contents selection screen at the step S35 until such printing information has been selected. When the desired printing information is selected, the CPU 31 transmits the selected information to the portal site computer 2. After the CPU 31 has received the contents of utilization of printing service from the portal site computer 2 and has displayed them, the CPU 31 waits for the user to make a selecting operation for the print button (steps P37 and P38). In the case where a return button is selected instead of the print button, the contents selection screen at the step S35 is displayed again.

In the case where the print button is selected, the CPU 31 transmits the print command information to the portal site computer 2, receives a user authentication screen from the portal site computer 2, and displays the screen (step P39). Then, the CPU 31 goes to the step P56 shown in FIG. 24.

At the step P31, in the case where the "communication provider's official site" is linked after being accessed over the Internet S, the CPU 31 receives an official site information menu from the communication provider computer 1, displays the menu, and waits for menu item selection (step P40).

At this time, the communications provider computer 1 links with the portal site computer 2 that provides printing service via the internet S. Thus, the contents of the official site information menu comprises a printing service menu item.

When one makes such printing service menu selection, the CPU 31 transmits the selected menu item information to the communications provider computer 1.

Then, the CPU 31 receives the contents of the selected official site information menu (the contents of printing service) from the communications provider computer 1, and displays the contents selection screen (refer to FIG. 16A) (step P41).

At this time, the communications provider computer 1 transmits to the portable terminal 3 the contents of the official site information menu including the contents of printing service received from the linked portal site computer 2.

Next, the CPU 31 determines whether or not the user's desired printing information has been selected from the displayed contents selection screen (step P42), and continues displaying the contents selection screen at the step P41 until such desired printing information has been selected. When the desired printing information is selected, the CPU 31 transmits the selected information to the communication provider computer 1.

After the CPU 31 has received the contents of utilization of printing service from the portal site computer 2 linked with the communication provider computer 1, and has displayed them, the CPU 31 waits for the user to make a selecting operation for the print button (steps P43 and P44). In the case where the return button is selected instead of the print button, the official site information menu screen at the step P40 is displayed again, and the CPU 31 waits for menu item selection.

In the case where the print button is selected, the CPU 31 transmits the print command information to the communication provider computer 1. Then, the CPU 31 receives a user authentication screen from the portal site computer 2 linked with the communication provider computer 1, and displays the screen (step P45). The CPU 31 determines whether the user is the existing member or a new member through member check (step P46). When the user is a new member, the CPU 31 goes to the member registration processing (FIG. 21). When the member is the existing member, the CPU 31 goes to the step P56 shown in FIG. 24.

At the step P31, in the case where a "communications provider's general site" is linked after being accessed over the internet S, the CPU 31 receives the site information menu from the communication provider computer 1, displays the menu, and waits for menu item selection (step P47).

At this time, the communications provider computer 1 links with the portal site computer 2 that provides printing service via the internet S. Thus, the contents of the official site information menu comprises a printing service menu item.

When one makes such printing service menu selection, the CPU 31 transmits the selected menu information to the communication provider computer 1. Then, the CPU 31 receives from the communication provider computer 1 the contents of the selected official site information menu (the contents of printing service), and displays the contents selection screen (refer to FIG. 16A) (step P48).

At this time, the communication provider computer 1 transmits to the portable terminal 3 the contents of the official site information menu containing the contents of printing service received from the linked portal site computer 2.

Next, the CPU 31 determines whether or not the user desired printing information has been selected from the displayed contents selection screen (step P49), and continues displaying the contents selection screen at the step P48 until such desired printing information has been selected. When the desired printing information is selected, the CPU 31 transmits the selected information to the communication provider computer 1.

After the CPU 31 has received the contents of utilization of printing service from the portal site computer 2 linked with the communication provider computer 1, and has displayed them, the CPU 31 waits for the user to make a selecting operation for the print button (steps P50 and P51). In the case where the return button is selected instead of the print button, the general site information menu screen at the step P47 is displayed again.

In the case where the print button is selected, the CPU 31 transmits the print command information to the communication provider computer 1. Then, the CPU 31 receives a user authentication screen from the portal site computer 2 linked with the communications provider computer 1, and displays the screen (step P52). Then, the CPU 31 determines whether the user is the existing member or a new member through member check (step P53).

When the user is a new member, the CPU 31 goes to member registration processing (FIG. 21). When the user is the existing member, the CPU 31 further receives the user authentication result from the portal site computer 2, and checks the result (step S54). If the user authentication result is NG, the CPU displays an error (step P55). Then, the CPU 31 terminates the member registration processing (FIG. 21). When the user authentication result is OK, the CPU 31 goes to the step P56 shown in FIG. 24.

At the step P56, the CPU 31 displays the utilization reservation check screen of the selected contents transmitted from the portal site computer 2, and waits for check operation on the utilization reservation check screen.

An example of the utilization reservation screen display is shown in FIG. 16B. This utilization reservation check screen displays the following.

Name of contents: Part-time job information
    Information service charge: 200 yen
    Printing service charge: 60 yen
    Standard printing medium: Plain paper A4 (double-sided)
    Number of reserved prints: Three A "utilize" button is displayed as an operation button for checking such utilization reservation, and a "cancel" button is displayed as an operation button for canceling such utilization and reservation.

Then, the CPU 31 determines whether an operated button is the "utilize" button or "cancel" button (step P57). In the case where the "cancel" button is operated, the CPU 31 terminates this utilization reservation registration processing. In the case where the "utilize" button is operated, the CPU 31 transmits the utilization check information to the portal site computer 2.

Next, the CPU 31 receives a print format selection screen (refer to FIG. 16C) from the portal site computer 2, and displays the screen (step P58). The print format selection screen shown in FIG. 16C displays input items and selection items such as the number of copies, printing medium (form), multiple-side medium printing system, advertising print or the like.

Further, the print format selection screen shown in FIG. 16C displays a "reserve button" for confirming the contents of print format selection and a "cancel" button for canceling the contents of print format selection.

The CPU 31 causes the number of copies to be inputted in accordance with the display positions of the input items and selection items on the print format selection screen (step P59). The CPU 31 makes selection of printing medium (form) types that include plain paper A4 (double-sided), plain paper A4 (single-sided), bible version refill (tripe-sided), and miniature version refill (four-sided) or the like (step P60). Then, the CPU 31 makes a selection of continuous printing of multiple-sided media that comprises, for example, "continuous printing and page break by contents" (step P61). The CPU 31 makes a selection of whether advertisement insertion printing of the multiple-sided media is performed or not (step P62).

When all the contents of the above print format selections are inputted and selected, the CPU 31 checks a button operation for checking the contents of the print format selection (step P63). In the case where the "cancel button" is operated, the CPU 31 returns to the utilization reservation check processing at the step P57. In the case where the "reserve button" is operated, the CPU 31 displays the contents of the print reservation on the printing reservation check screen (refer to FIG. 16D). Then, the CPU 31 transmits the printing reservation information to the portal site computer 2 (step P64), and terminates utilization reservation registration processing.

Now, the user authentication processing executed by the CPU 21 of the portal site computer 2 according to the utilization reservation registration processing executed at the portable terminal 3 will be described with reference to the flow chart shown in FIG. 25.

Figure 25:
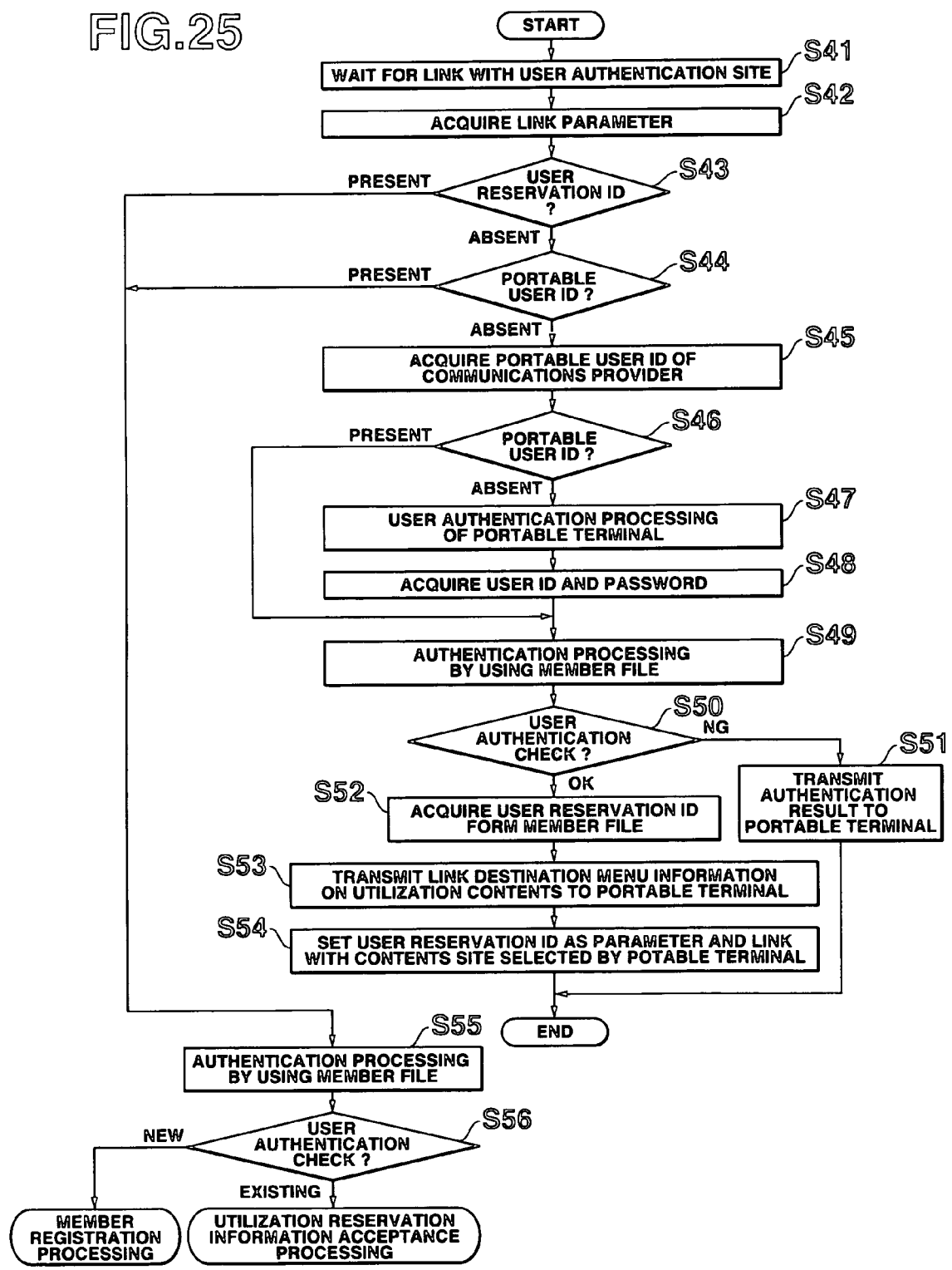
FIG. 25 is a flow chart showing a user authentication processing executed by the portal site computer 2 shown in FIG. 5.

In FIG. 25, the CPU 21 first waits for link with a user authentication site from the portable terminal 3 (step S41). When the CPU 21 receives a link parameter from the linked portable terminal 3 (step S42), the CPU 21 checks to see if the user reservation ID and the portable user ID are set in the link parameter (steps S43 and S44).

Figure 32:
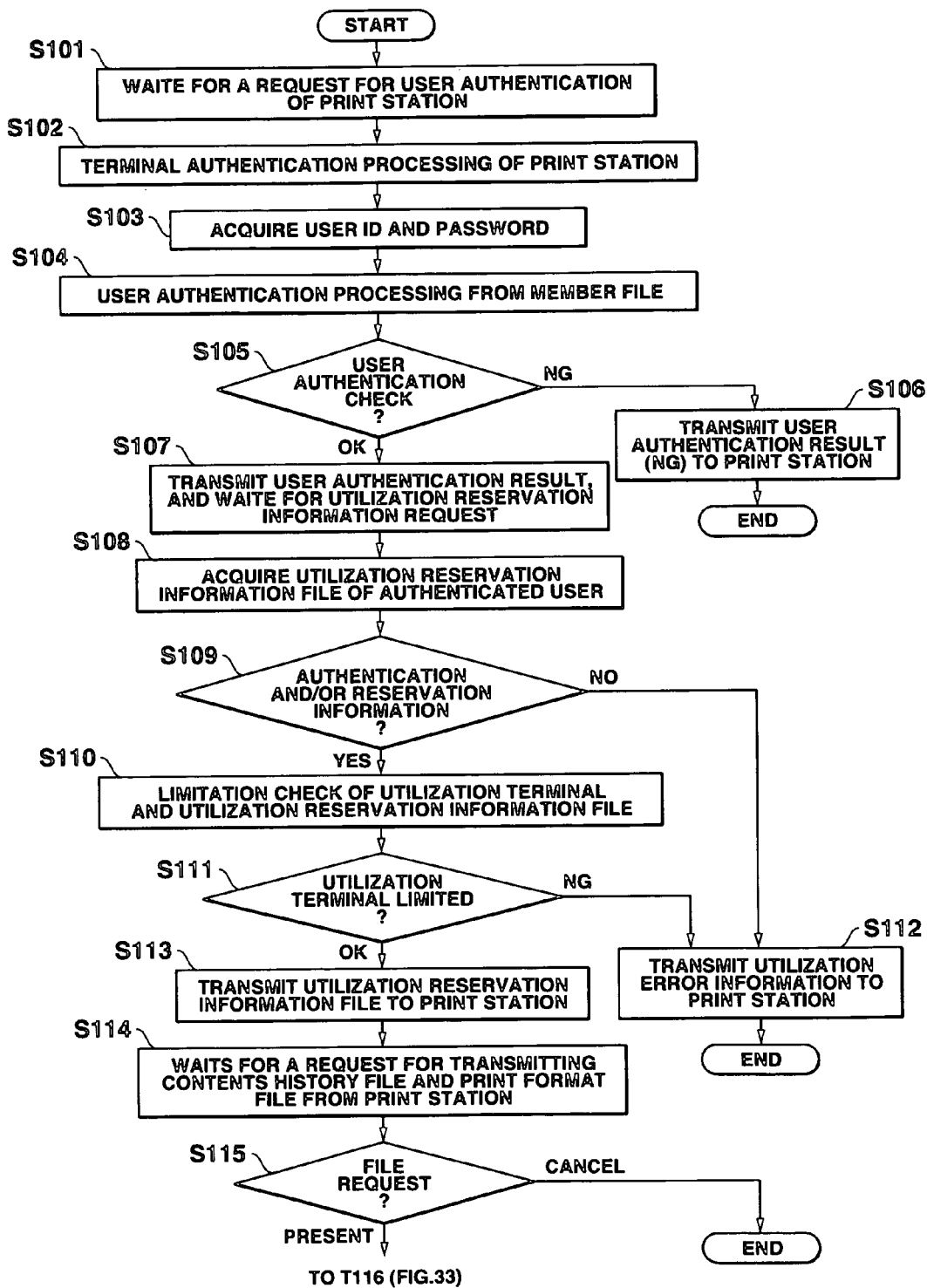
FIG. 32 is a flow chart showing a part of utilization reservation information print processing executed by the portal site computer 2 shown in FIG. 5.
Figure 33:
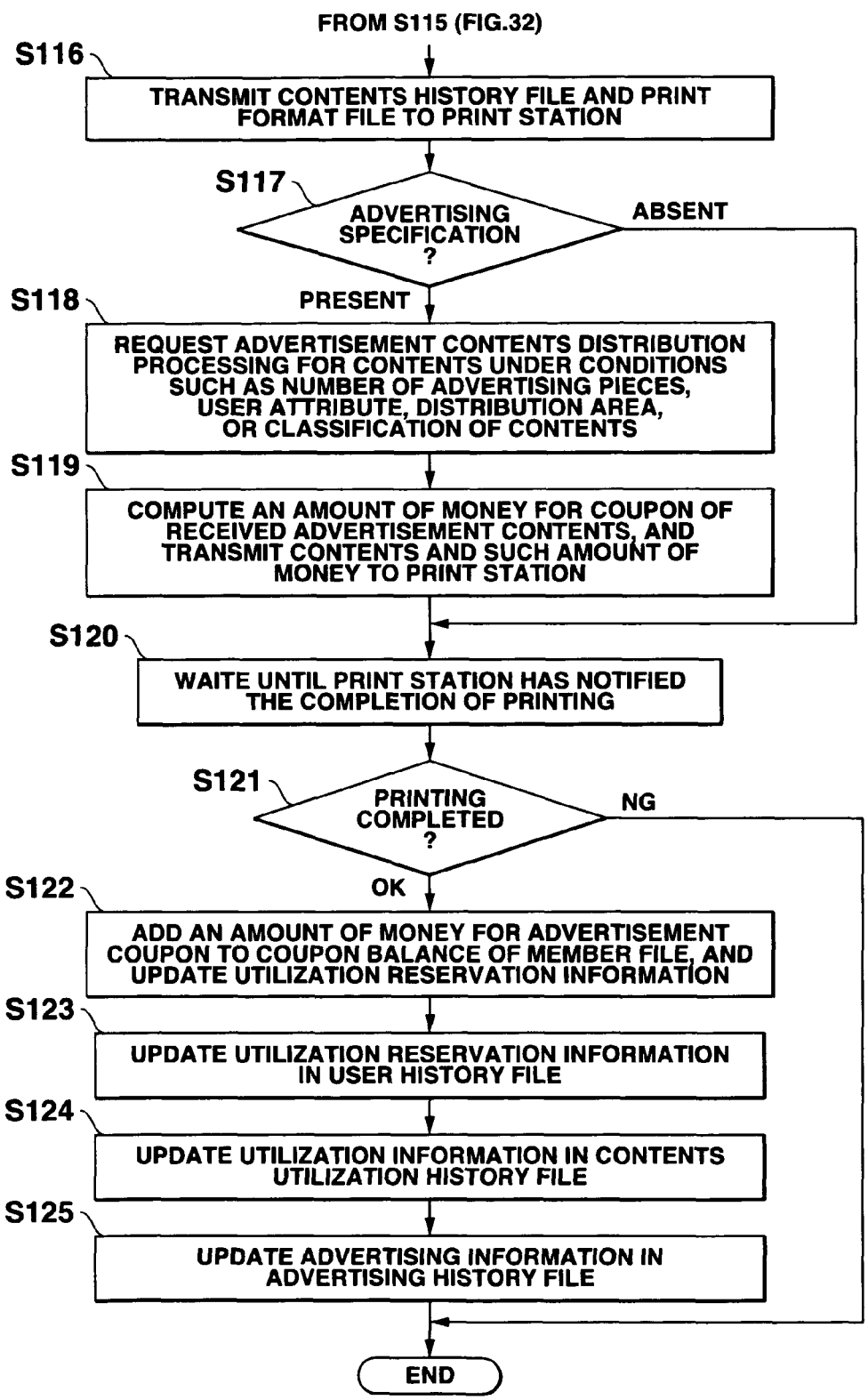
FIG. 33 is a flow chart showing a utilization reservation information print processing following that shown in FIG. 32.

When the user reservation ID and the portable user ID are set, the CPU 31 goes to the step S55 at which user authentication processing is performed by the member file 2B. If the user authentication check result is "new", the CPU goes to member registration processing (FIG. 21). When the corresponding member information is registered, the CPU 21 goes to utilization reservation information acceptance processing (FIG. 32 and FIG. 33).

If the user reservation ID and portable user ID are not set in the link parameter, the CPU 21 requests the communication provider computer 1 for acquisition of the portable user ID, and acquires the portable user ID transmitted from the communication provider computer 1 (step S45). Then, the CPU 21 checks to see if the portable user ID can be acquired (step S46).

When the portable user ID can be acquired successfully, the CPU 21 goes to the step S49. Then, the CPU 21 performs the user authentication processing on the portable user ID by referring to the member file 2B (refer to FIG. 8). If the portable user ID can not acquired, the CPU 21 requests the portable terminal 3 for user authentication processing (step S47), and acquires the portable user ID and password (step P48). Then, the CPU 21 executes user authentication processing by referring to the member file 2B (refer to FIG. 8) (step S49).

Next, the CPU 21 checks the user authentication result (step S50). If the user authentication result is NG, the CPU 21 transmits the fact to the portable terminal 3 (step S51). Then, the CPU 21 terminates user authentication processing. When the user authentication result is OK, the CPU 21 acquires the user reservation ID from the member file (step S52).

Next, the CPU 21 transmits link destination menu information on print service utilization contents (step S53), and receives contents selection information from the portable terminal 3. Then, the CPU 21 sets the user reservation ID as a parameter to link with the selected contents site (information provider computer 4) (step S54), and terminates the user authentication processing.

Now, the contents utilization guidance processing executed by the information provider computer 4 linked by user authentication processing at the portal site computer 2 will be described with reference to the flow chart shown in FIG. 26.

Figure 26:
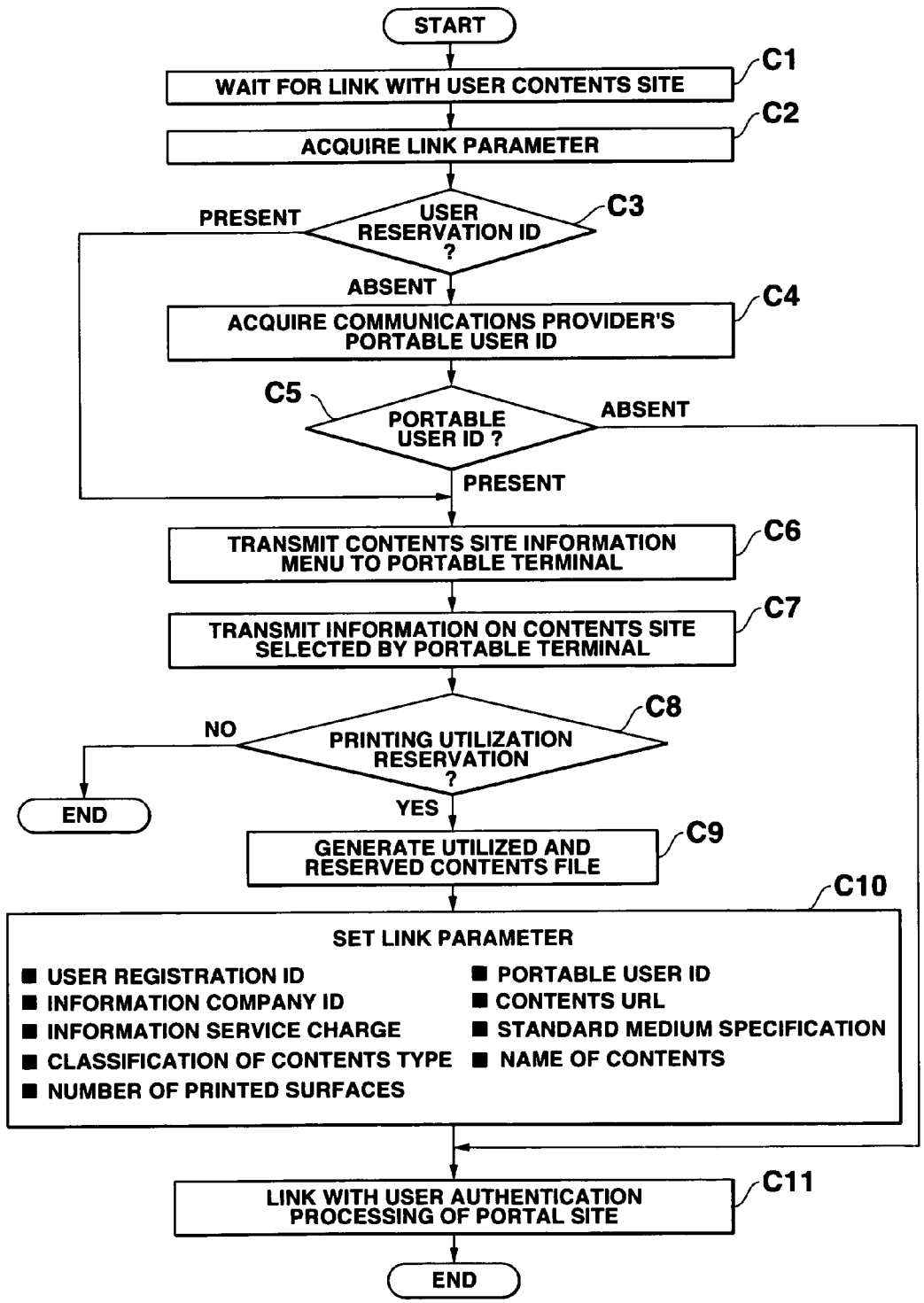
FIG. 26 is a flow chart showing a contents utilization guidance processing executed by an information provider computer 4 shown in FIG. 1.

In FIG. 26, when the information provider computer 4 waits for a link with the contents site from the portal site computer 2 or portable terminal 3 (step C1), and receives a link parameter from the linked portal site computer 2 or the portable terminal 3 (step C2), the computer checks to see if the user reservation ID is set in that link parameter (step C3).

When the user reservation ID is set, the information provider computer 4 goes to the step C6. If the user reservation ID is not set, the computer 4 requests the communications provider computer 1 for acquisition of the portable user ID (step C4), and checks to see if the portable user ID is present (step C5).

If the portable user ID can not be acquired, the information provider computer 4 goes to the step C11 to link with user authentication processing of the portal site computer 2. When the portable user ID can be acquired, the computer 4 transmits a contents site information menu to the portable terminal 3.

When contents selection information is received from the portable terminal 3, the information provider computer 4 transmits information on the selected contents site (step C7), and waits until print utilization reservation information has been transmitted from the portable terminal 3 (step C8). If the print utilization reservation information has not been received, the computer 4 terminates the contents utilization guidance processing. If the print utilization reservation information has been received, the computer 4 generates a contents file that has been utilized and reserved (step C9).

Then, the information provider computer 4 sets link parameters (user reservation ID, portable user ID, contents URL, information service charge, standard medium specification, classification of contents types, name of contents, the number of printed pieces or the like) in the contents file (step C10). Then, the computer 4 links with user authentication processing of the portal site computer 2 (step C11), and terminates the contents utilization guidance processing.

Now, the utilization reservation information acceptance processing executed after the user authentication processing at the CPU 21 of the portal site computer 2 will be described here with reference to the flow charts shown in FIG. 27 and FIG. 28.

Figure 27:
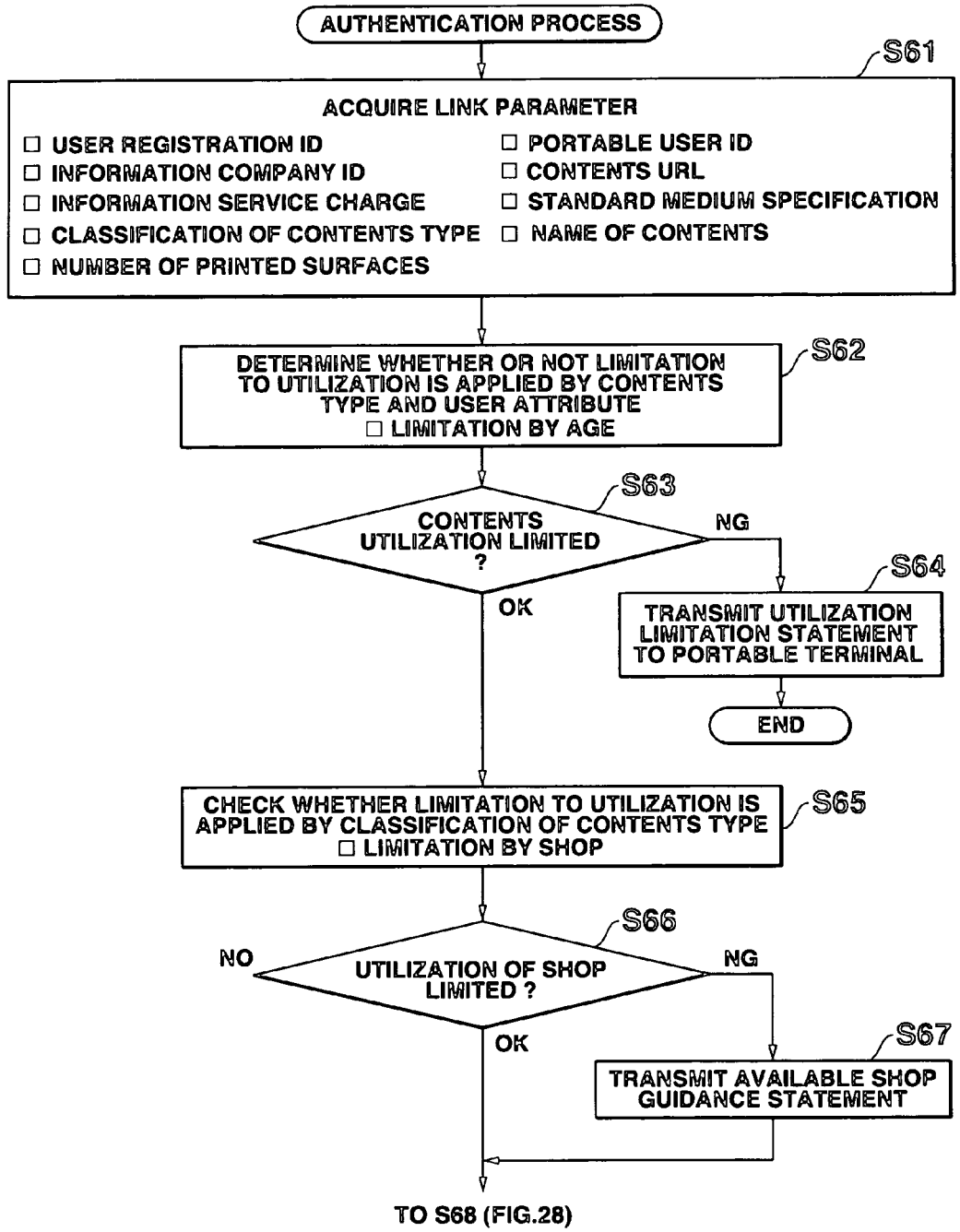
FIG. 27 is a flow chart showing a part of utilization reservation information acceptance processing executed by the portal site computer shown in FIG. 5.
Figure 28:
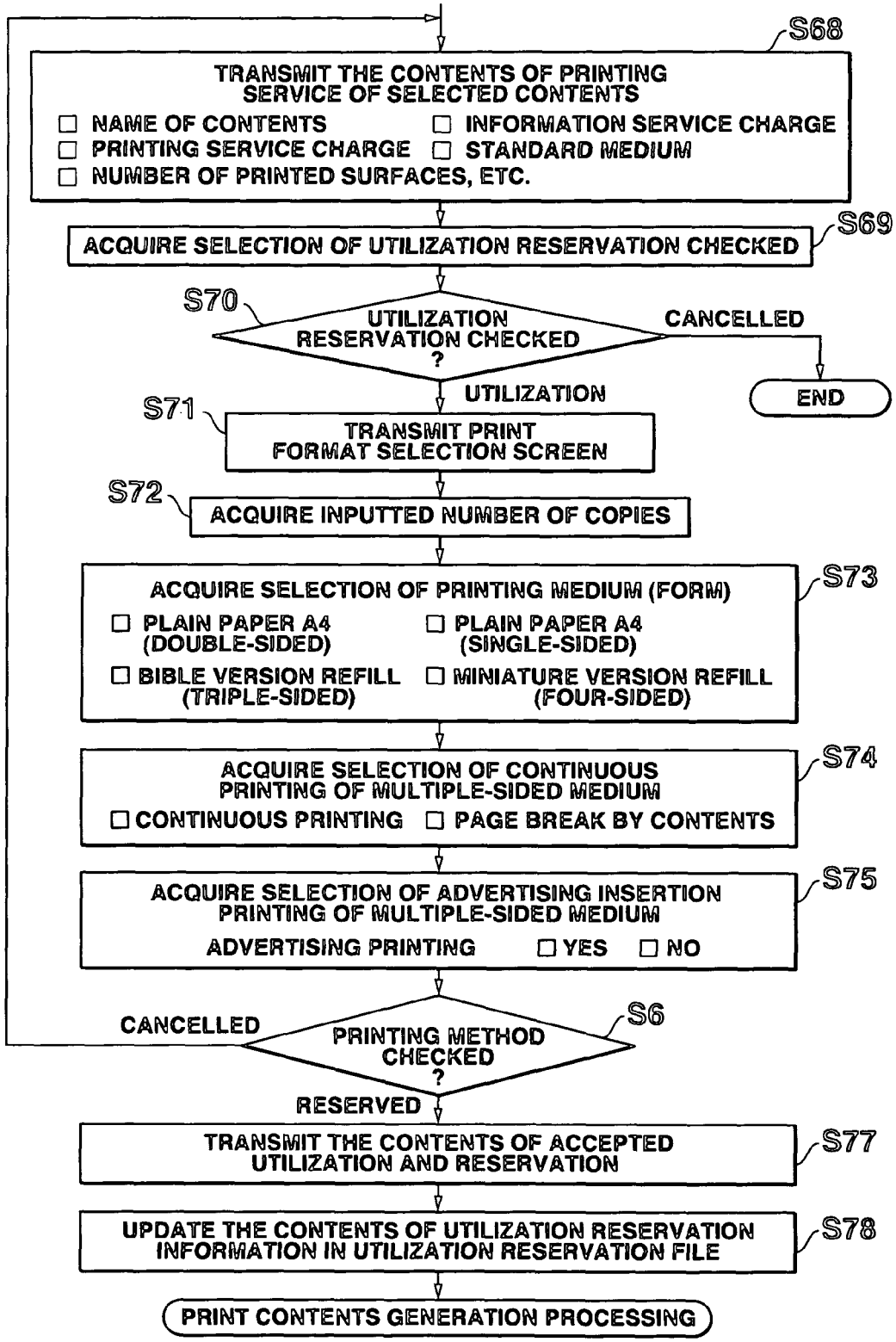
FIG. 28 is a flow chart showing a utilization reservation information acceptance processing following that shown in FIG. 27.

In FIG. 27, when the CPU 21 acquires link parameters (user reservation ID, portable user ID, contents URL, information service charge, standard medium specification, classification of contents types, name of contents, the number of printed pieces or the like) by means of user authentication processing (step S61), the CPU 21 checks to see if certain imitation (for example, utilization limitation based on age) applies to such utilization from the contents type and user attribute (age) (steps S62 and S63).

If the contents utilization limitation is NG, the CPU 21 transmits a utilization limitation statement to the portable terminal 3 (step S64), and terminates the utilization reservation information acceptance processing. When the contents utilization limitation is OK, the CPU 21 checks to see if limitation (limitation based on shop) applies to such utilization based on classification of contents types (steps S65 and S66).

If such utilization limitation based on shop is NG, the CPU 21 transmits an available shop guidance statement to the portable terminal 3 (step S67), and goes to the step S68. When the utilization limitation based on shop is OK, the CPU 21 goes to the step S68 shown in FIG. 28 immediately.

At the step S68, the CPU 21 transmits the printing service contents of the selected contents (name of contents, information service charge, printing service charge, standard medium, the number of printed pieces or the like) to the portable terminal 3.

Next, the CPU 21 acquires a selection (Utilize or Cancel) of utilization reservation transmitted from the portable terminal 3 according to the transmitted printing service contents (step S69), and performs utilization reservation checks based on such selection (step S70). In the case where "cancel" is selected, the CPU 21 terminals the utilization reservation information acceptance processing. In the case where "Utilize" is selected, the CPU 21 transmits a print format selection screen (refer to FIG. 16C) to the portable terminal 3 (step S71).

Then, the CPU 21 acquires the inputted number of copies transmitted from the portable terminal 3 according to the transmitted print format selection screen (step S72), and further, acquires selections of printing medium type (form) (plain paper A4 (double-sided), plain paper A4 (single-sided), bible version refill (triple-sided), or miniature version refill (four-sided) or the like) (step S73).

Further, the CPU 21 acquires selections of continuous printing of a multiple-side medium transmitted from the portable terminal 3 (step S74). Then, the CPU 21 acquires selections of advertisement insertion printing of multiple-side medium (advertisement printing: Yes or No) (step S75), acquires print format selections (Reserve or Cancel), and checks the print format (step S76).

In the case where "cancel" is selected, the CPU 21 returns to the step S68 at which printing service contents are transmitted. In the case where "Reserve" is selected, the CPU 21 transmits the contents of utilization reservation accepted at the steps S72 to S75 to the portable terminal 3 (step S77). Then, the CPU 21 updates the contents of utilization reservation information in the user file contained in the utilization reservation information file 2F (refer to FIG. 9A) (step S78), and goes to print contents generation processing.

Now, the print contents generation processing executed by the CPU 21 of the portal site computer 2 will be described here with reference to the flow chart shown in FIG. 29.

Figure 29:
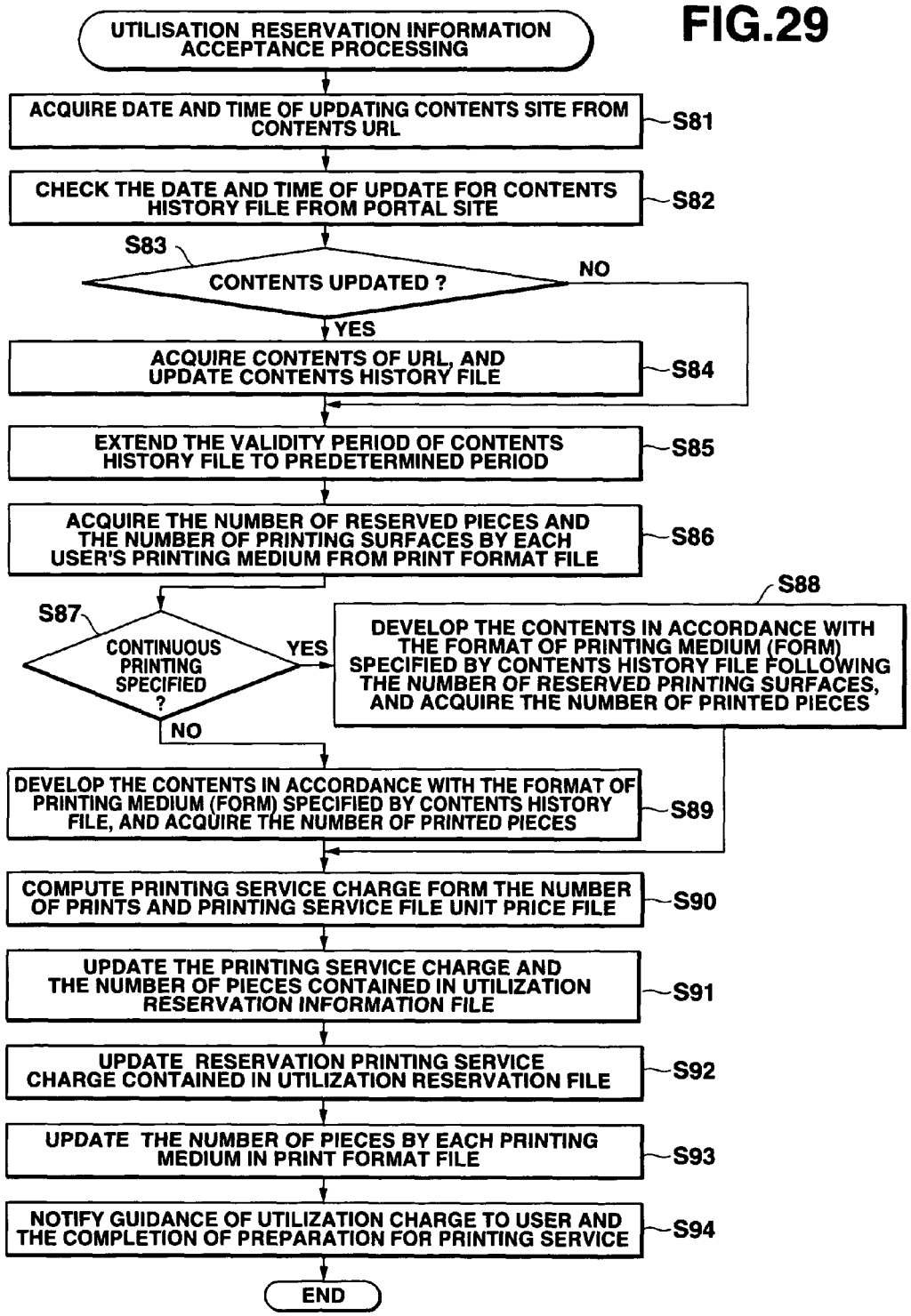
FIG. 29 is a flow chart showing a print contents generation processing executed by the portal site computer 2 shown in FIG. 5.

In FIG. 29, the CPU 21 acquires the date and time of contents site update from the contents URL that the information provider computer 4 provides (step S81); compares the acquired date and time of update with that of the contents in the contents history file 2I (refer to FIG. 10B) (step S82); and checks to see if contents update is performed (step S83).

If such contents update is not performed, the CPU 21 goes to the step S85. When the contents update is performed, the CPU 21 acquires the updated contents from the contents URL, and updates the contents history file 2I (step S84).

Next, the CPU 21 extends the validity period of the contents in the contents history file 2I by a predetermined period of time (step S85); acquires the number of utilized and/or reserved prints and the number of printing surfaces for the printing medium from the user's print format contained in the print format file 2H (refer to FIG. 10A); and checks to see if continuous printing is specified (step S87).

When continuous printing is specified, the CPU 21 first acquires the number of reserved printing surfaces. Then, the CPU 21 develops the contents in accordance with the format of printing medium (form) specified by the contents history file 2I, and acquires the number of prints (step S88).

If continuous printing is not specified, the CPU 21 develops the contents in accordance with the format of the print medium (form) specified by the contents history file 2I, and acquires the number of prints (step S89).

Next, the CPU 21 computes a printing service charge from the number of prints acquired at the step S88 or step S89 and the printing service unit price by each of the printing media (forms) contained in the printing service unit price file 2G (refer to FIG. 9B) (step S90).

Then, the CPU 21 updates data such as the information service charge, printing service charge, and the number of prints or the like for the utilization reservation information in the utilization reservation information file 2F (refer to FIG. 9A) (step S91). The CPU 21 updates the reservation printing service charge, reservation information service charge, an amount of money for coin entry during utilization, and an amount of money for the next transfer coupon of the member contained in the member file 2B (refer to FIG. 8) (step S92).

Further, the CPU 21 updates the number of prints by print medium (form) for the member contained in the print format file 2H (refer to FIG. 10A) (step S93). Then, the CPU 21 notifies a guidance of utilization charge and the completion of preparation for printing service to the user of the portable terminal 3 via an E-mail (step S94), and terminates the print contents generation processing.

FIG. 16E shows a display example of a guidance of utilization charge and the completion of preparation for printing service from the portal site computer 2 to the user of the portable terminal 3.

Now, the utilization reservation information print processing executed by the CPU 61 of the print station 6 will be described with reference to the flow chart shown in FIGS. 30 and 31.

Figure 30:
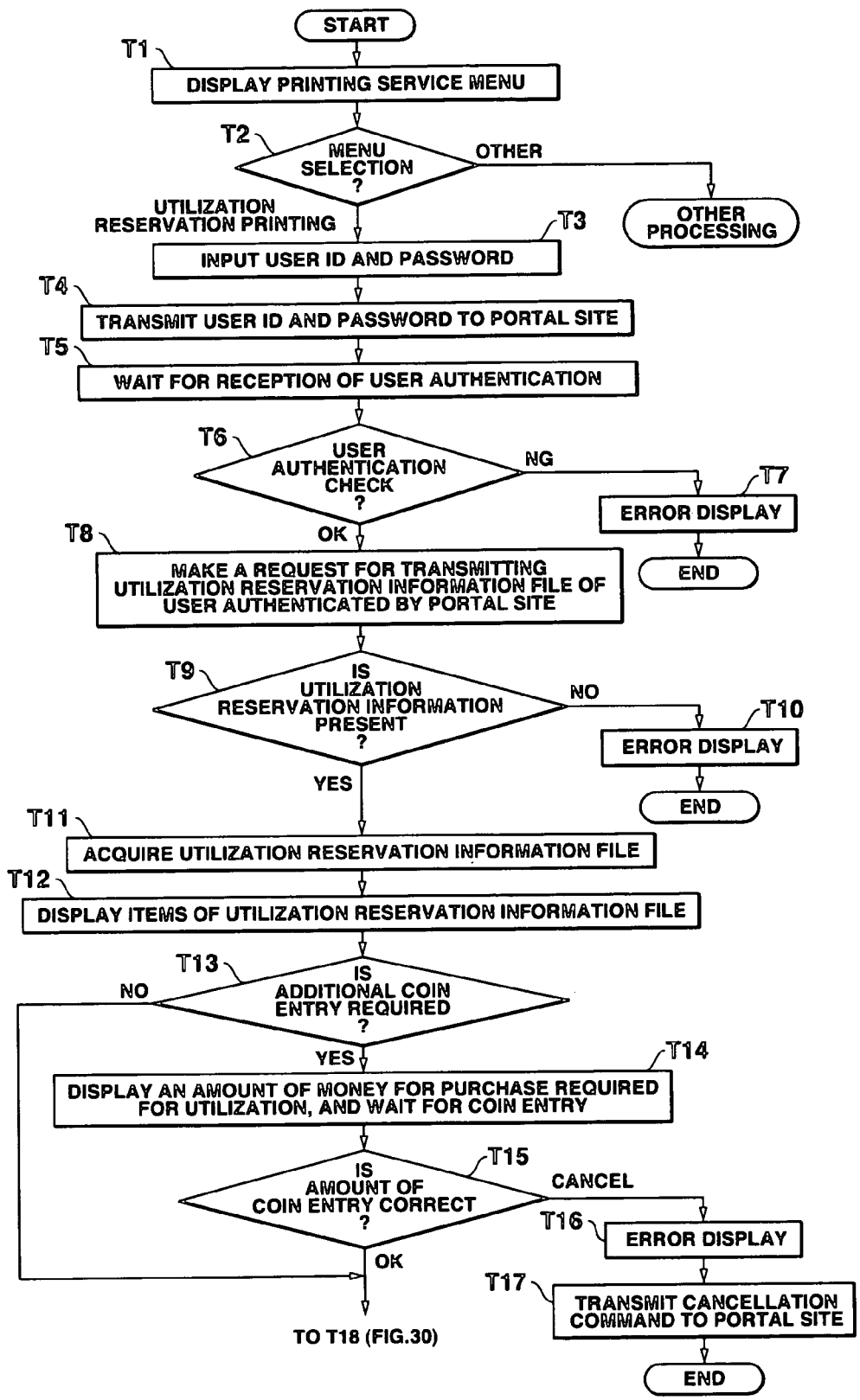
FIG. 30 is a flow chart showing a part of utilization reservation information print processing executed at the print station 6 shown in FIG. 7.
Figure 31:
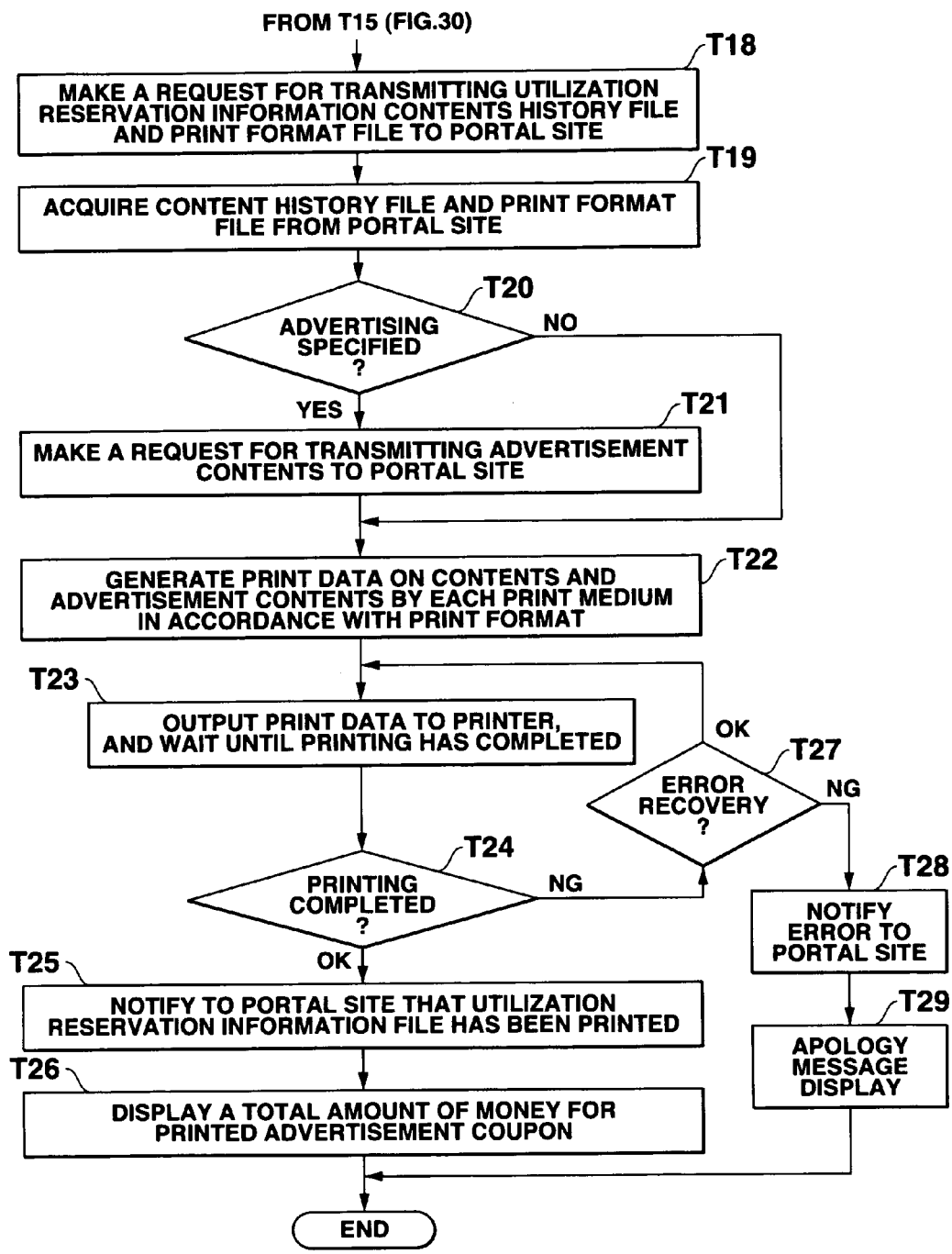
FIG. 31 is a flow chart showing utilization reservation information print processing following that shown in FIG. 30.

In FIG. 30, the CPU 61 first displays a printing service menu (refer to FIG. 17A) through an access from the user of the portable terminal 3 who has reserved printing service (step T1), and checks the selected menu item (step T2).

Figure 17A:
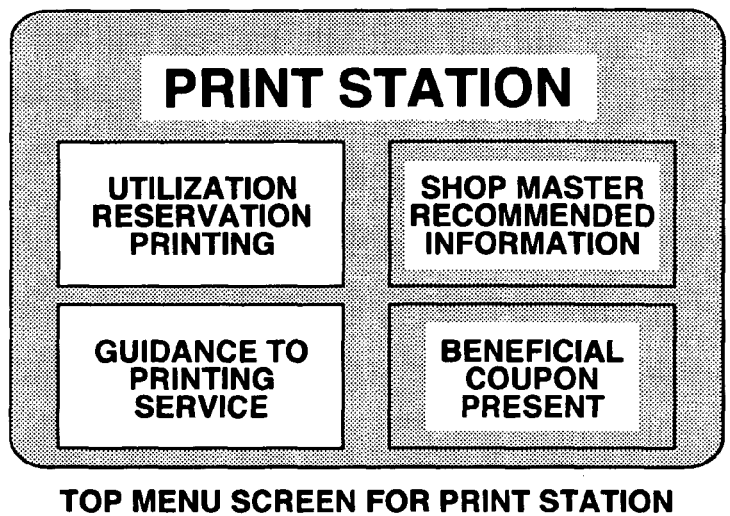
FIG. 17A and FIG. 17B are views each showing a transition state of a menu screen displayed at a print station 6 shown in FIG. 7.
Figure 17B:

If one has selected a menu item other than "utilization reservation printing", the CPU 61 goes to another processing corresponding to the selected item. If one has selected a menu item "utilization reservation printing", the CPU 61 displays the top menu screen of the utilization reservation printing service as shown in FIG. 17B. Then, the CPU 61 prompts the user to input the user ID and password, and acquires the inputted user ID and password (step T3). In this case, the user ID and password are inputted by keyboard operation of the input section 63 at the print station 6 or inputted by touch panel operation or the like.

When the user inputs the user ID and password, the CPU 61 transmits the inputted data to the portal site computer 2 (step T4), and waits until the user authentication result has been received (step T5).

When the CPU 61 receives the fact that the user authentication result is NG from the portal computer 2 (step T6), the CPU displays an error (step T7). When the CPU 61 receives the fact that the user authentication result is OK, the CPU 61 makes a request for transmitting a utilization reservation information file of the user authenticated for the portal site computer 2 (step T8), and waits until the utilization reservation information file has been received.

In the case where the CPU 61 has received from the portal site computer 2 a notification indicating that there exist no utilization reservation information file (step T9), the CPU 61 displays an error (step T10), and terminates this utilization reservation information print processing. In the case where the CPU 61 has received a notification indicating that there exists a utilization reservation information file (step T9), the CPU 61 acquires from the portal site computer 2 the utilization reservation information file and member file corresponding to the authenticated user (step T11).

Figure 17C:
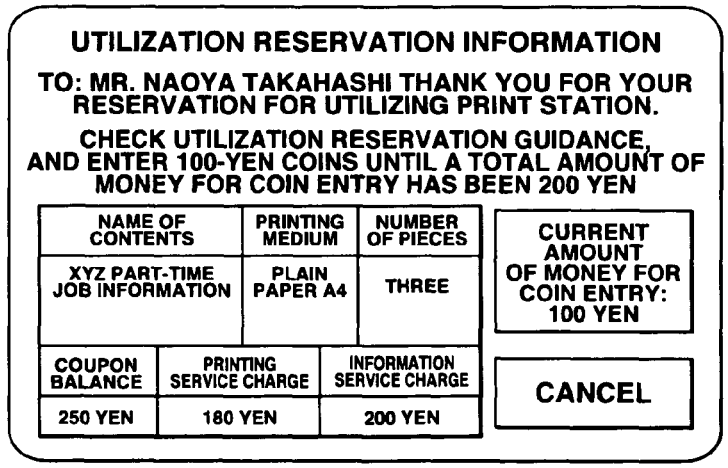
FIG. 17C is a view showing a screen for displaying a purchased amount of money.

Next, the CPU 61 displays an item of the utilization reservation information generated based on the contents of the acquired member file and utilization reservation information file on the screen for displaying an amount of money for purchase as shown in FIG. 17C (step T12). Then, the CPU 61 determines whether or not an amount of money for coin entry is required for the coupon balance that is the display item from a total of printing service charge and information service charge (step T13).

In the case of the screen for displaying an amount of money for purchase shown in FIG. 17C, the user's coupon balance is 250 yen, the printing service charge is 180 yen, and the information service charge is 200 yen. Thus, the coupon balance lacks 130 yen, requiring two 100-yen-coin entries.

Therefore, if coin entry is unnecessary, the CPU 61 goes to the step T18. At step T13, if additional coil entry is required as shown above, the CPU 61 displays an amount of money for coin entry required for the current printing service as shown in FIG. 17C, and waits for the user coin entry (step T14).

Then, the CPU 61 checks to see if there exists coin entry information from the coin entry device 69 and whether or not the "cancel" button is operated on the display screen in order to response to the user relevant to the displayed amount of money for coin entry (step T15). In the case where the "cancel" button is operated, the CPU 61 displays an error (step T16), transmits a "cancel" command to the portal site computer 2 (step T17), and terminates this utilization reservation information print processing. In the case where the CPU 61 checks an amount of money for coin entry is correct, it goes to the step T18 shown in FIG. 31.

Next, the CPU 61 makes a request for transmitting the contents history file and print format file corresponding to utilization reservation information to the portal site computer 2 (step T18). Then, the CPU 61 acquires a contents history file and a print format file that are transferred from the portal site computer 2 (step T19).

The CPU 61 checks to see if advertisement printing is specified in the utilization reservation information file (step T20). If such advertisement printing is not specified, the CPU 61 goes to the step T22. When the advertisement printing is specified, the CPU 61 makes a request for transmitting the advertisement contents to the portal site computer 2 (step T21).

Next, the CPU 61 generates print data in accordance with a print format in which the contents and advertisement contents are acquired by each of the specified printing media (forms) (step T22). Then, the CPU 61 outputs the print data to the printing device 68, and waits until printing has been completed (step T23).

At this time, the CPU 61 displays the screen for displaying an amount of money for purchase shown in FIG. 17C, and then, displays the contents printing screen as shown in FIG. 18A.

Then, the CPU 61 checks that the completion of printing has been notified from the printing device 68 (step T24). When the notification of the completion of printing is OK, the CPU 61 notifies to the portal site computer 2 that the utilization reservation information file has been printed (step T25). Then, the CPU 61 displays a total amount of money for the printed advertisement coupon on the screen (step T26), and terminates utilization reservation information print processing.

At this time, the CPU 61 displays the contents printing screen shown in FIG. 18A, and then, displays advertisement coupon guidance screen after the completion of contents printing as shown in FIG. 18B. This indicates that advertisement printing is not specified, an amount of money for advertisement coupon is 0 yen, and an amount of money for the next transfer coupon is 70 yen.

In the case of an amount of money for the above transfer coupon, when an amount of money for the coin entry is 200 yen, the change is not returned by cash, the balance of 70 yen is transferred as a coupon balance (a balance) that is available in the next printing service.

In this way, managing the balance as a coupon simplifies a cashing function at the print station 6, eliminates return of change (10-yen coins or the like), and reduces equipment cost.

In addition, in the case where the contents of a print error is received after NG has been notified from the printing device 68, the CPU 61 displays an error recovery command corresponding to the contents of such print error, instructs the user to arrange the shop for error recovery, and checks the result of the print error recovery (step T27).

When the print error recovery result is OK, the CPU 61 returns to the step T23 at which the CPU 61 outputs print data, and waits until printing has been completed. If the print error recovery result is NG, the CPU 61 transmits the notification of print error to the portal site computer 2 (step T28). Then, the CPU 61 displays an error message (for example, "print error has occurred.") at the display section 62 (step T29), and terminates the utilization reservation information print processing.

Figure 19:
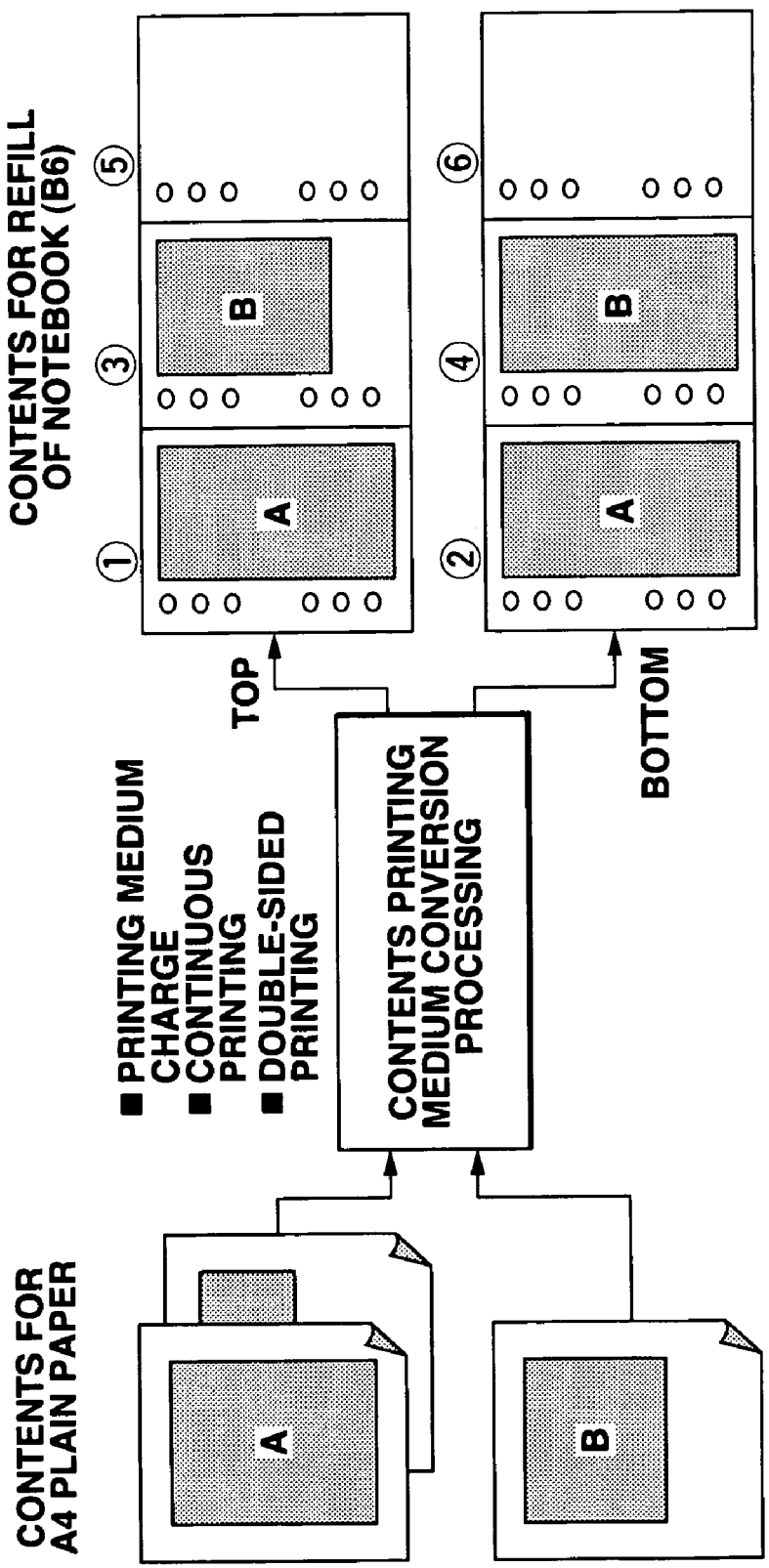
FIG. 19 is a view showing a specific example of conversion processing of a contents printing medium executed during utilization reservation information print processing of the print station 6 shown in FIG. 7.

FIG. 19 shows a modification example of a printing medium in the case where a print format has been changed in the above utilization reservation information printing processing. In FIG. 19, there is shown an example when the contents oriented to A4-size plain paper has been changed to those oriented to a refill of a notebook (B6). At the print station 6, contents printing medium conversion processing is executed according to a command for changing the printing method.

Now, the utilization reservation information print processing executed by the CPU 21 of the portal site computer 2 according to the utilization reservation information print processing at the print station 6 will be described below with reference to the flow charts shown in FIG. 32 and FIG. 33.

In FIG. 32, the CPU 21 first waits for a user authentication request from the print station 6 (step S101). When the CPU 21 receives the user authentication request from the print station 6, the CPU 21 performs terminal authentication processing of the print station 6 (step S102). That is, it is checked as to whether or not the print station 6 is registered as a printing service terminal.

Next, the CPU 21 acquires the user ID and password of the user of the portable terminal 3 transmitted from the print station 6 (step S103). Then, the CPU 21 executes user authentication processing by referring to the member file 2B (refer to FIG. 8) (step S104).

Next, the CPU 21 checks the user authentication result (step S105). If the user authentication result is NG, the CPU 21 transmits the fact to the print station 6 (step S106), and terminates the utilization reservation information print processing. If the user authentication result is OK, the CPU 21 transmits the fact to the print station 6, and waits until a request for transmitting the utilization reservation information has been received (step S107).

When the CPU 21 receives the request for transmitting the utilization reservation information from the print station 6, the CPU 21 checks to see if a utilization and/or reservation information file of the authenticated user is present by referring to the utilization reservation information file 2F (refer to FIG. 9A) (steps S108 and S109).

If the utilization reservation file of the authenticated user is absent, the CPU 21 transmits utilization error information to the print station 6 (step S112), and terminates the utilization reservation information print processing. When the utilization reservation information file of the authenticated user is present, the CPU 21 checks to see if the utilization terminal limitation information contained in a utilization reservation information file is present relevant to the print station 6 to be currently utilized by referring to the contents history file 2I (refer to "station shop utilization limitation" shown in FIG. 10B) (steps S110 and S111).

If the utilization terminal limitation has been already set, and if the check result is NG, the CPU 21 transmits the utilization error information to the print station 6 (step S112), and terminates the utilization reservation information print processing. Alternatively, if the utilization terminal limitation is not set, and if the check result is OK, the CPU 21 transmits the utilization reservation information file of the authenticated user and the member file to the print station 6 (step S113).

Next, the CPU 21 waits until the CPU 21 has received a request for transmitting the contents history file and print format file to be transmitted from the print station 6 (step S114). When the CPU 21 receives the transmission request, it determines whether the content of request is "OK" or "cancel" (step S115).

Then, when the content of request is OK, the CPU 121 transmits the contents history file and print format file to the print station 6 (step S116 shown in FIG. 33). If it is "cancel", the CPU 21 terminates utilization reservation information print processing.

Then, the CPU 21 determines whether or not advertisement printing is specified for the utilization reservation information file (step S117). If such advertisement printing is not specified, the CPU 21 goes to the step S120, and requests the advertisement contents distribution processing (refer to FIG. 34) for the advertisement contents by the number of advertising prints, user attribute, distribution area, or classification of contents (step S118).

The CPU 21 computes an amount of money for coupon of the advertisement contents received from the advertisement site proprietor computer 5 by means of advertisement contents distribution processing, and transmits an amount of money for such coupon and the advertisement contents to the print station 6 (step S119).

Next, the CPU 21 waits until the CPU 21 has received the notification of the completion of printing transmitted from the print station 6. When the CPU 21 receives the notification of the completion of printing, it determines whether the completion of printing is OK or NG (step S121). If the notification of the completion of printing is NG, the CPU 21 terminates the utilization reservation information print processing. When it is OK, the CPU 21 adds an amount of money for advertisement coupon to the coupon balance of the member contained in the member file 2B (refer to FIG. 8), and updates the utilization reservation information file (step S122).

The CPU 21 updates the user history information on the member in the user history 2K (refer to FIG. 11) (step S123). Then, the CPU 21 updates the utilization history information on the contents contained in the contents utilization history file 2L (refer to FIG. 12) (step S124). Further, the CPU 21 updates the advertising history information on the advertisement contents contained in the advertising history file 2M (refer to FIG. 13) (step S125), and terminates the utilization reservation information print processing.

Now, the advertisement contents distribution processing executed by the CPU 21 of the portal site computer 2 when a request for advertisement contents distribution processing is made during the utilization reservation information print processing will be described here with reference to the flow chart shown in FIG. 34.

Figure 34:
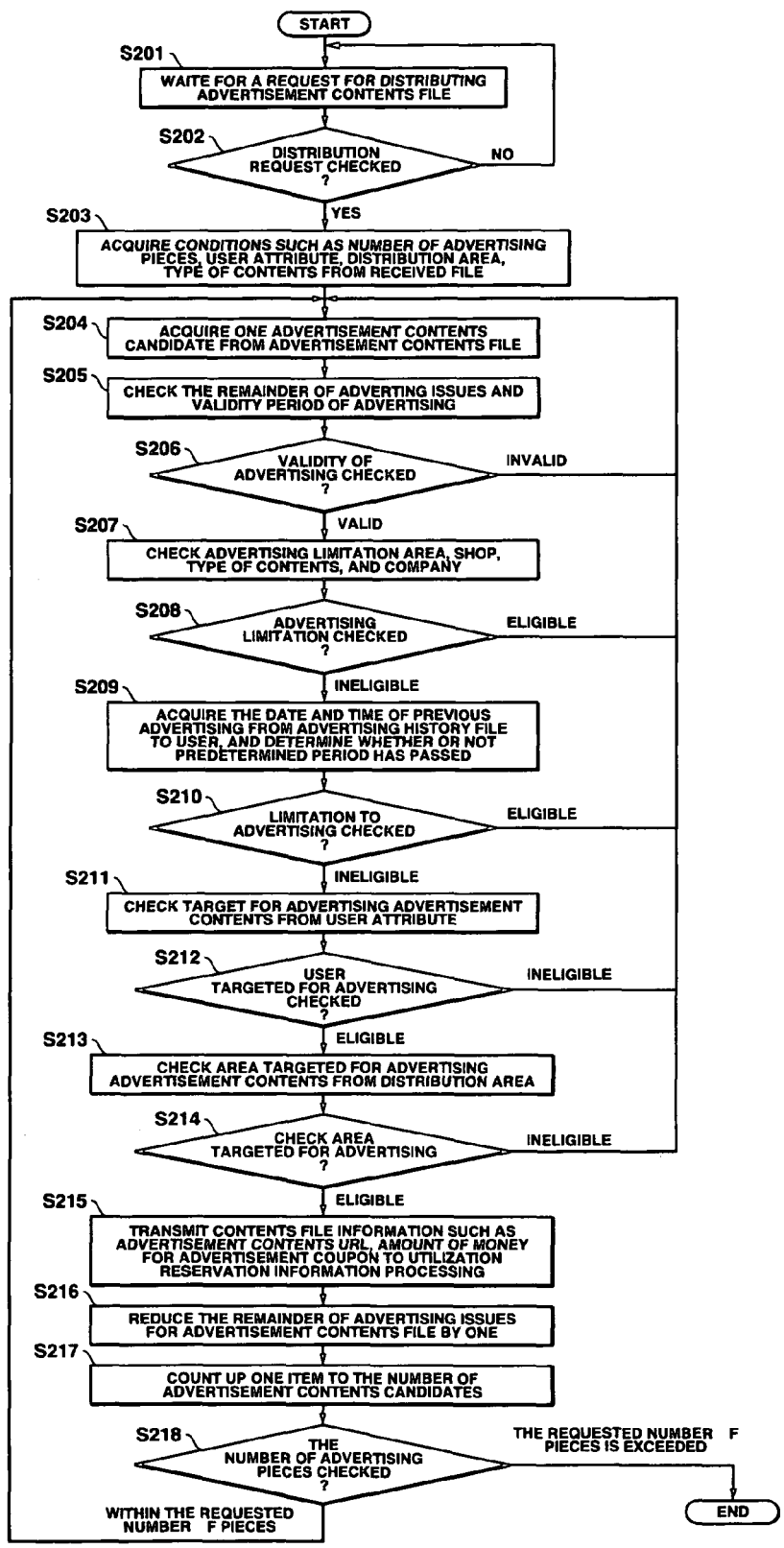
FIG. 34 is a flow chart showing an advertisement contents distribution processing executed by the portal site computer 2 shown in FIG. 5.

In FIG. 34, the CPU 21 first waits until a request for distributing an advertisement contents file has been made by the utilization reservation print processing (step S201). Then, the CPU 21 checks to see if such distribution request is present (step S202). When the distribution request is present, the CPU 21 acquires the advertisement contents conditions such as the number of advertisement contents pieces, user attribute, and classification of distribution area contents from the received information (step S203).

Next, the CPU 21 acquires one of the corresponding advertisement contents candidates from the advertisement contents file 2O (refer to FIG. 14) based on the acquired advertisement contents conditions (step S204). Then, the CPU 21 checks the remaining number of advertising issues and the validity period of advertising (step S205) and checks to see if the advertising is valid or invalid (step S206).

The number of advertising issues denotes a value obtained by subtracting the actual number of issues from the number of advertising issues to the print contents preset during registration of the advertisement contents. The validity period of advertising denotes a period preset during registration of the advertisement contents.

If the advertising is invalid, the CPU 21 returns to the step S204, and acquires another one of the advertisement contents candidates from the advertisement contents file 2O. When the advertising is valid, the CPU 21 checks the area, shop, classification of contents, and company that are subject to the limitation to putting an advertisement (step S207), and checks to see if the advertising is subject to limitation to putting an advertisement or not (step S208).

If the advertisement is subject to limitation to putting an advertisement, the CPU 21 returns to the step S204, and acquires another one of the advertisement contents candidates from the advertisement contents file 2O. If it is not subject to limitation to putting an advertisement, the CPU 21 acquires the previous date and time of advertising relevant to the user from the advertising history file 2M (refer to FIG. 13). Then, the CPU 21 checks to see if a predetermined period of time has passed from the previous advertising (step S209), and checks to see if the predetermined period of time is within the range of advertising history limitation or not (step S210).

When a predetermined period of time has not passed from the previous advertising and is within the range of advertising history limitation, the CPU 21 returns to the step S204, and acquires another one of the advertisement contents candidates from the advertisement contents file 2O. If the predetermined period of time has passed and is within the range of advertising history limitation, the CPU 21 checks the advertisement contents advertiser contained in the advertisement contents file 2O from the user attribute (step S211), and checks to see if the user is out of the advertising target or not (step S212).

If the user is out of the advertising target, the CPU 21 returns to the step S204, and acquires another one of the advertisement contents candidates from the advertisement contents file 2O. Otherwise, the CPU 21 checks the areas targeted for advertising the advertisement contents contained in the advertisement contents file 2O from types of the distribution area contents (step S213), and checks to see if the area is out of the advertising target or not (step S214).

When the area is out of the above areas targeted for advertising, the CPU 21 returns to the step S204, and acquires another one of the advertisement contents candidates from the advertisement contents file 2O. Otherwise, the CPU 21 transmits contents file information such as advertisement contents URL or an amount of money for advertisement coupon to the utilization reservation information print processing (FIG. 32 and FIG. 33) (step S215).

Next, the CPU 21 reduces one advertising issue of the advertisement contents contained in the advertisement contents file 2O (step S216). Then, the CPU 21 adds one to the number of advertisement contents candidates (the number of advertising issues) (step S217), and checks to see if the number of pieces requested for advertising is exceeded or not based on the number of the advertisement contents pieces (step S218).

If the requested number of advertising pieces is not exceeded, the CPU 21 returns to the step S204, and acquires another one of the advertisement contents candidates from the advertisement contents file 2O. Otherwise, the CPU 21 terminates the advertisement contents distribution processing.

A description of a series of processings that achieves printing service in the present embodiment with reference to FIG. 20 to FIG. 34 has now been completed.

In the printing service system 100, therefore, the user of the portable terminal 3 can reserve the contents of printing service by linking with the portal site computer 2 over the internet S. Further, the user can acquires the contents of the reserved printing service as a printing medium specified by the print station 6 placed at the nearest shop.

Now, the advertisement contents update processing from the advertisement site proprietor computer 5 to the portal site computer 2 will be described here with reference to the flow charts shown in FIG. 35 and FIG. 36.

First, the advertisement contents update processing at the advertisement site proprietor computer 5 will be described hereinafter with reference to the flow chart shown in FIG. 35.

Figure 35:
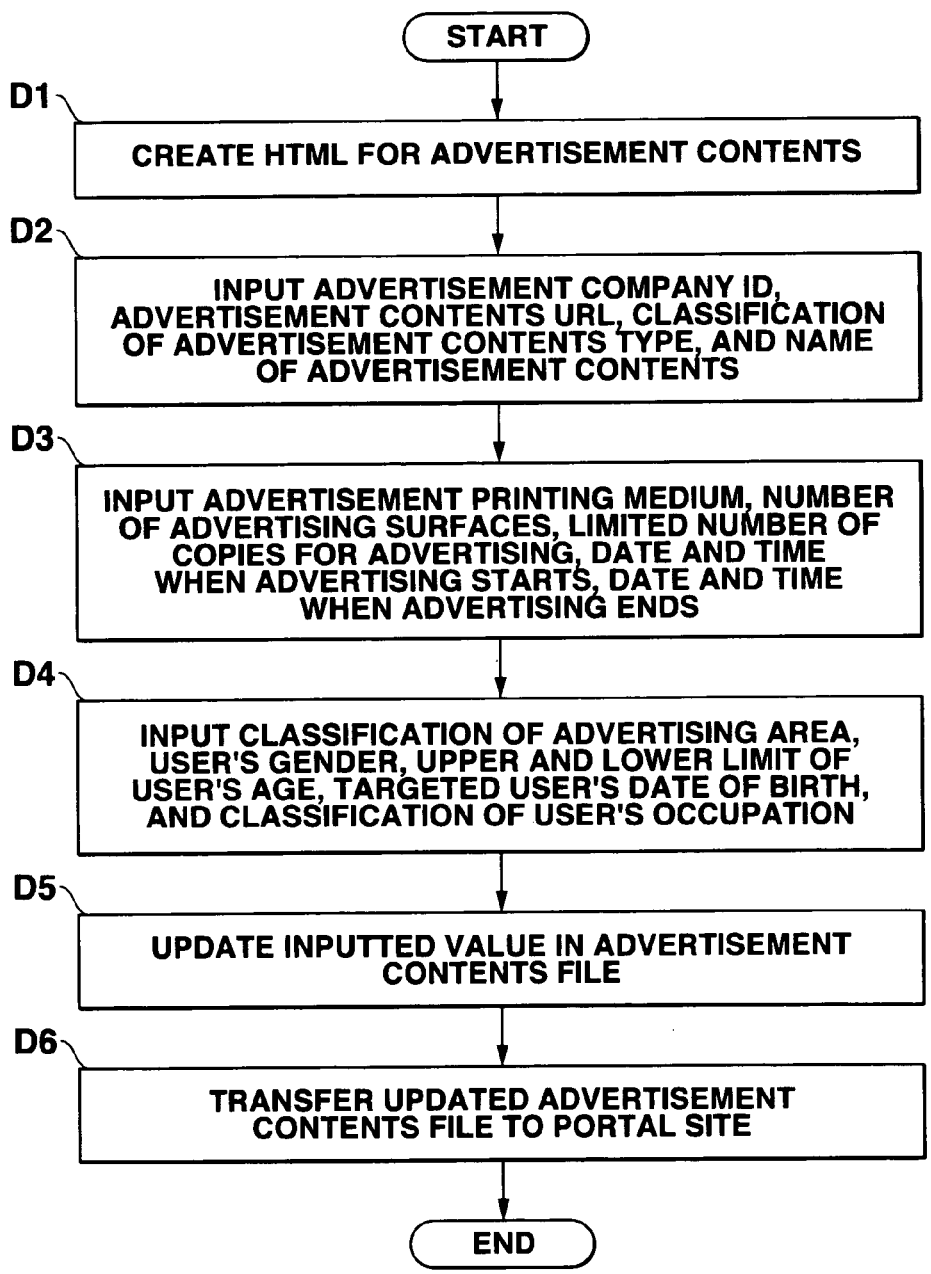
FIG. 35 is a flow chart showing an advertisement contents update processing executed by the advertisement site proprietor computer 5 shown in FIG. 1.

In FIG. 35, the advertisement site proprietor computer 5 first creates an HTML (Hyper Text Markup Language) file for advertisement contents targeted for update (step D1) and inputs advertisement company ID, advertisement contents URL, classification of advertisement contents types, and the name of advertisement contents (step D2).

Next, the advertisement site proprietor computer 5 inputs an advertisement printing medium (form), the number of advertising surfaces, the limited number of advertising copies, starting date and time of advertising, ending date and time (step D3). Then, the computer 5 inputs classification of advertising areas, user's gender, the upper and lower limits of the user's age, the date of the user's birth, and classification of the user's occupation (step D4). Further, the computer 5 updates the advertisement contents file based on the inputted values (step D5), transfers the updated advertisement contents file to the portal site computer 2 (step D6), and terminates the advertisement contents update processing.

Now, the advertisement contents update processing executed by the CPU 21 of the portal site computer 2 according to the advertisement contents update processing at the advertisement site proprietor computer 5 will be described here with reference to the flow chart shown in FIG. 36.

Figure 36:
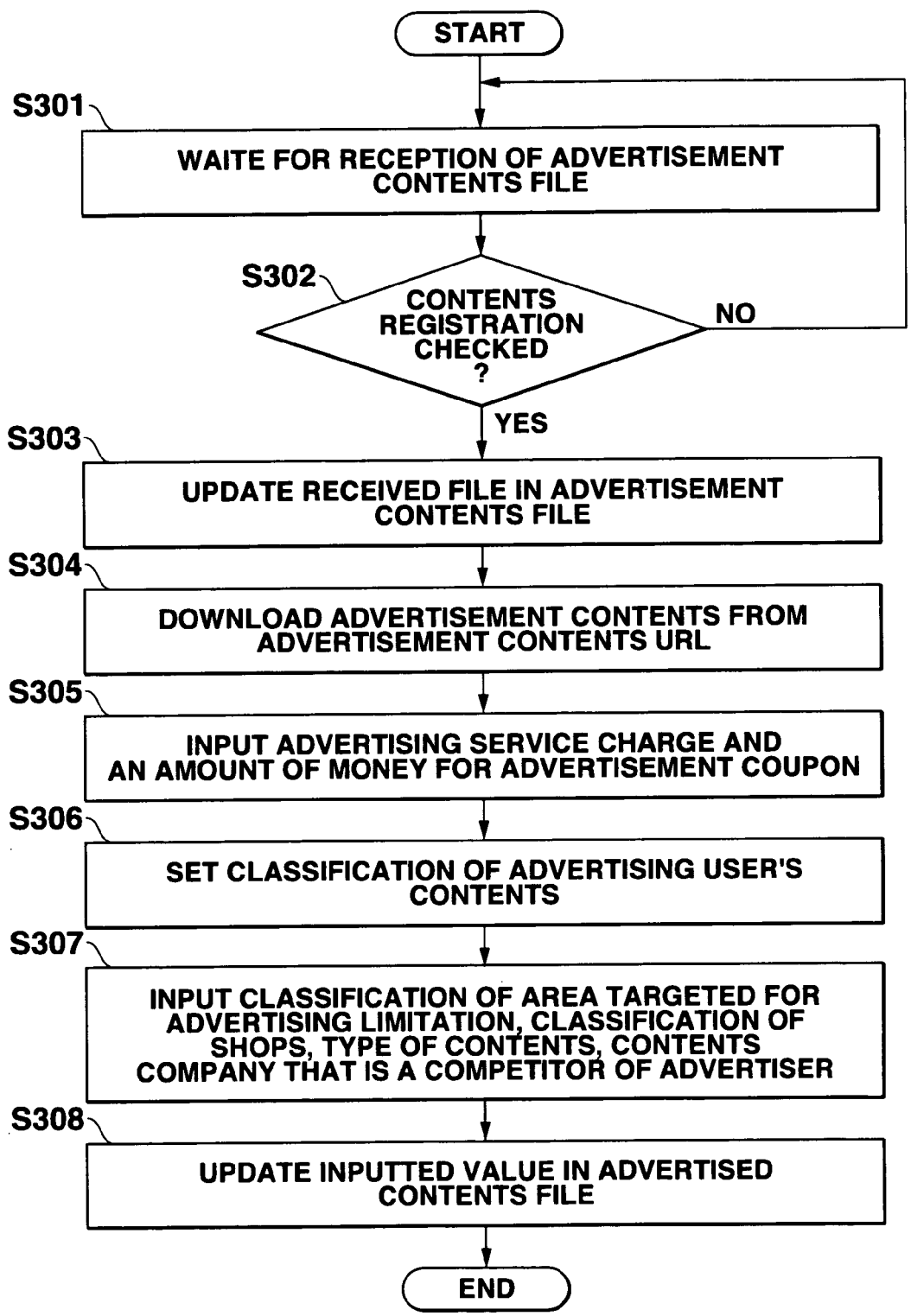
FIG. 36 is a flow chart showing an advertisement contents update processing executed by the portal site computer 2 shown in FIG. 5.

In FIG. 36, the CPU 21 first waits for the reception of an advertisement contents file to be transmitted from the advertisement site proprietor computer 5 (step S301). When the CPU 21 receives the advertisement contents file targeted for update, the CPU 21 checks to see if advertisement contents are registered or not by referring to the advertisement contents file 2O (step S302).

If the advertisement contents are not registered, the CPU 21 returns to the step S301. When the advertisement contents are registered, the CPU 21 updates the advertisement contents file 2O by using the received advertisement contents file (step S303).

Then, the CPU 21 downloads advertisement contents from the advertisement contents URL (step S304); inputs advertising service charge and an amount of money for advertisement coupon (step S305), and sets the advertiser's contents classification of the advertisement contents (step S306).

Further, the CPU 21 inputs the area classification of limitation to putting an advertisement, classification of shops, contents type, and contents company that is a competitor of an advertiser (step S307). Then, the CPU 21 updates the advertisement contents file 2O based on the inputted values (step S308), and terminates the advertisement contents update processing.

As described above, in the printing service system 100 according to the present embodiment, there is employed a charging system for coupon based printing service. Thus, electronic utilization coupons can be easily provided to members in order to promote the utilization of printing service. For example, there can be easily provided a utilization coupon for questionnaire or a utilization coup for the advertising and the like.

In addition, the print station 6 employs a function for fare-adjusting the utilization coupon balance and 100-yen coin based charge. For example, there is employed a method for fare-adjusting the changes of 10 to 90 yen included in the membership registered utilization coupon as the next coupon balance. Thus, the change returning function can be eliminated, and service deterioration due to the shortage of changes can be prevented.

Further, in the printing service system 100 according to the present embodiment, a printing service utilization reservation limiting function can be set by the contents history file 2I (refer to FIG. 10B) during contents distribution. Thus, there can be provided the following utilization reservation limiting function that reflects the information provider's preference or the preference of a shop that places the print station 6.

(1) As a function for limiting the utilization reservation based on the contents user attribute, for example, there can be provided a function for limiting the utilization and reservation for the contents having an age limit based on the date of the member's birth.

(2) As a function for limiting the utilization reservation based on the preference of the shop that places a print station, for example, there can be provided a function for limiting the utilization reservation that is not suitable to visitors such as information on horserace prediction based on the preference of the fast food shop.

In addition, in the printing service system 100 according to the present embodiment, a function of advertising printing service based on contents distribution can be set. Thus, the following advertising services can be provided.

(1) As a function for advertising a pin-point advertisement for the advertiser's target based on the user attribute or locality, for example, there can be provided a function for putting an advertisement of commodities mainly targeted for high school girls only in the case where the users are such high school girls.

(2) As a function for properly changing the contents of advertisement based on the user attribute or the locality or time intervals for printing service, for example, there can be provided a function for putting a commodity advertisement or coupon according to the user's gender by providing a men- or women-oriented advertisement.

(3) As a function for instantiating a need through an advertisement meeting the next presumed potential need from the classification of print service contents, for example, there can be provided a function for putting an advertisement of housings or transport companies and the like according to the attribute of the user who has received rental information printing service.

Further, in the printing service system 100 according to the present embodiment, a function for applying limitation to putting an advertisement of printing service can be set during contents distribution by the advertisement contents file 2O (refer to FIG. 14). Thus, the following functions for applying limitation to putting an advertisement can be provided.

(1) As a function for applying limiting to putting advertisement contents against the reference of the shop that places a printing station, for example, there can be provided a function for applying limitation to putting an advertisement such as associates or teashops in the case where a fast food shop places a printing station.

(2) As a function for applying limitation to putting advertisement contents against the contents provider's preference, for example, there can be provided a function for applying limitation to putting an advertisement of competitors to the contents provider or advertisement contents whose contents compete with each other.

(3) As a function for applying limitation to putting advertisement contents based on the user attribute, for example, there can be provided a function for applying limitation to putting an advertisement of tobacco shop, bottle shop or pachinko shop which legally limits purchase or utilization.

(4) A function for applying limitation to putting the same advertisement contents to the same user for a predetermined period of time can be provided.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, if the print station 6 provides means for acquiring a cellular telephone number defined at the portable terminal 3 by utilizing wireless communication or infrared-ray communication such as IrDA, the user of the portable terminal 3 can eliminate an input of the cellular telephone number.

In addition, a system configuration of the printing service system 100 shown in the present embodiment is provided as an only example, and the types and number of portable terminals, the number of print stations, or setting locations can be changed arbitrarily.

According to the present invention, there is provided contents distribution type printing service via a network in which there is no limitation to a place at which contents are requested and a place at which the contents printout are received.

What is claimed is:

1. A printing information distribution apparatus which is adapted to be operably connected to portable information terminals and printers, the apparatus comprising:

communication means for, when one of the portable information terminals accesses the apparatus through a wireless communication network, reading a content selection screen image and a print format selection screen image which are stored in a memory, and for transmitting the read content selection screen image and the read print format selection screen image to the one of the portable information terminals which accesses the apparatus;

reception means for receiving a content name and print format information transmitted from the one of the portable information terminals which accesses the apparatus, the print format information comprising at least sheet selection information indicating a type of a printing sheet, and for storing the received content name, the received print format information, and a user identification of the one of the portable information terminals in a reservation information storage means with the received content name, the received print format information, and the user identification being associated with each other;

generation means for reading the content name and the print format information from the reservation information storage means, for generating a print content based on the read content name and the read print format information, and for transmitting via an electronic mail a print preparation complete notification to the one of the portable information terminals which accesses the apparatus;

distribution means for, when one of the printers accesses the apparatus through the wireless communication network, reading a user identification input screen image stored in the memory, for transmitting the user identification input screen image to the one of the printers which accesses the apparatus, for receiving a user identification of a portable information terminal transmitted from the one of the printers which accesses the apparatus, and for transmitting the print content generated by the generation means and the print format information which are associated with the received user identification to the one of the printers which accesses the apparatus, and at least one of:

printing service utilization reservation limiting means for limiting the subject matter of the print content which can be printed based upon preferences of an operator of the one of the printers being utilized by the user; and advertising application limiting means for limiting a type of advertisement placed with the content being printed based upon preferences of a provider of the print content.

2. A printing information distribution apparatus which is adapted to be operably connected to portable information terminals and printers, the apparatus comprising:

a communication unit configured to, when one of the portable information terminals accesses the apparatus through a wireless communication network, read a content selection screen image and a print format selection screen image which are stored in a memory, and to transmit the content selection screen image and the read print format selection screen image to the one of the portable information terminals which accesses the apparatus;

a reception unit configured to receive a content name and print format information transmitted from the one of the portable information terminals which accesses the apparatus, the print format information comprising at least sheet selection information indicting a type of a printing sheet, and configured to store the received content name, the received print format information, and a user identification of the one of the portable information terminals in a reservation information storage unit with the received content name, the received print format information, and the user identification being associated with each other;

a generation unit configured to read the content name and the print format information from the reservation information storage unit, to generate a print content based on the read content name and the read print format information, and to transmit via an electronic mail a print preparation complete notification to the one of the portable information terminals which accesses the apparatus;

a distribution unit configured to, when one of the printers accesses the apparatus through the wireless communication network, read a user identification input screen image stored in the memory, to transmit the user identification input screen image to the one of the printers which accesses the apparatus, to receive a user identification of a portable information terminal transmitted from the one of the printers which accesses the apparatus, and to transmit the print content generated by the generation unit and the print format information which are associated with the received user identification to the one of the printers which accesses the apparatus, and at least one of:

printing service utilization reservation limiting unit for limiting the subject matter of the print content which can be printed based upon preferences of an operator of the one of the printers being utilized by the user; and advertising application limiting unit for limiting a type of advertisement placed with the print content being printed based upon preferences of a provider of the print content.

3. A computer readable storage medium having a computer program stored thereon that is executable by a computer to control a printing information distribution apparatus which is adapted to be operably connected to portable information terminals and printers to perform a process comprising:

when one of the portable information terminals accesses the printing information distribution apparatus through a wireless communication network, reading a content selection screen image and a print format selection screen image which are stored in a memory, and transmitting the read content selection screen image and the read print format selection screen image to the one of the portable information terminals which accesses the apparatus;

receiving a content name and print format information transmitted from the one of the portable information terminals which accesses the apparatus, the print format information comprising at least sheet selection information indicating a type of a printing sheet;

storing the received content name, the received print format information, and a user identification of the one of the portable information terminals in a reservation information storage means with the received content name, the received print format information, and the user identification being associated with each other;

reading the content name and the print format information from the reservation information storage means;

generating a print content based on the read content name and the read print format information;

transmitting via an electronic mail a print preparation complete notification to the one of the portable information terminals which accesses the apparatus;

when one of the printers accesses the apparatus through the wireless communication network, transmitting the user identification input screen image to the one of the printers which accesses the apparatus;

receiving a user identification of a portable information terminal transmitted from the one of the printers which accesses the apparatus;

transmitting the generated print content and the print format information which are associated with the received user identification to the one of the printers which accesses the apparatus, the process further consisting of at least one of:

limiting the subject matter of the print content which can be printed based upon preferences of an operator of the one of the printers being utilized by the user; and limiting a type of advertisement placed with the print content being printed based upon preferences provider of the print content.

* * * * *